(12) United States Patent
Oh et al.

(10) Patent No.: US 11,095,926 B2
(45) Date of Patent: *Aug. 17, 2021

(54) BROADCASTING SIGNAL TRANSMITTING DEVICE, BROADCASTING SIGNAL RECEIVING DEVICE, BROADCASTING SIGNAL TRANSMITTING METHOD, AND BROADCASTING SIGNAL RECEIVING METHOD

(71) Applicant: LG ELECTRONICS INC., Seoul (KR)

(72) Inventors: Sejin Oh, Seoul (KR); Minsung Kwak, Seoul (KR); Woosuk Kwon, Seoul (KR); Kyoungsoo Moon, Seoul (KR); Jangwon Lee, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,255

(22) Filed: Aug. 2, 2019

(65) Prior Publication Data

US 2019/0356933 A1   Nov. 21, 2019

Related U.S. Application Data

(63) Continuation of application No. 15/468,408, filed on Mar. 24, 2017, now Pat. No. 10,419,792, which is a (Continued)

(51) Int. Cl.
*H04N 21/2362* (2011.01)
*H04N 21/2343* (2011.01)
(Continued)

(52) U.S. Cl.
CPC ........ *H04N 21/2362* (2013.01); *H04H 60/07* (2013.01); *H04H 60/73* (2013.01);
(Continued)

(58) Field of Classification Search
CPC ............. H04N 21/2362; H04N 21/234; H04N 21/2343; H04N 21/236; H04N 21/2383;
(Continued)

(56) References Cited

U.S. PATENT DOCUMENTS 8,537,746 B2 * 9/2013 Song ....................... H04L 67/06
370/328
10,123,079 B2   11/2018 Oh et al.
(Continued)

FOREIGN PATENT DOCUMENTS

JP   2005-110322 A   4/2005
JP   2007-208875 A   8/2007
(Continued)

*Primary Examiner* — Nathan J Flynn
*Assistant Examiner* — Caroline Somera
(74) *Attorney, Agent, or Firm* — Birch, Stewart, Kolasch & Birch, LLP

(57) ABSTRACT

A method of processing data in a receiving apparatus is discussed. The method includes receiving a broadcast signal including low level signaling data; parsing the low level signaling data included in the broadcast signal; obtaining the bootstrap information from the parsed low level signaling data; and discovering the service layer signaling information based on the obtained bootstrap information included in the parsed low level signaling data.

6 Claims, 52 Drawing Sheets

Related U.S. Application Data continuation of application No. PCT/KR2015/010205, filed on Sep. 25, 2015.

(60) Provisional application No. 62/055,618, filed on Sep. 25, 2014.

(51) Int. Cl.

| | | |
|---|---|---|
| *H04H 60/07* | (2008.01) | |
| *H04H 60/73* | (2008.01) | |
| *H04N 21/234* | (2011.01) | |
| *H04N 21/236* | (2011.01) | |
| *H04N 21/2383* | (2011.01) | |
| *H04N 21/6332* | (2011.01) | |
| *H04L 29/12* | (2006.01) | |
| *H04L 29/06* | (2006.01) | |
| *H04N 21/643* | (2011.01) | |
| *H04N 21/858* | (2011.01) | |

(52) U.S. Cl.
CPC .......... *H04L 61/2007* (2013.01); *H04L 69/16* (2013.01); *H04N 21/234* (2013.01); *H04N 21/236* (2013.01); *H04N 21/2343* (2013.01); *H04N 21/2383* (2013.01); *H04N 21/6332* (2013.01); *H04N 21/64322* (2013.01); *H04N 21/8586* (2013.01)

(58) Field of Classification Search
CPC ......... H04N 21/6332; H04N 21/64322; H04N 21/8586; H04H 60/07; H04H 60/73; H04L 61/2007; H04L 69/16

USPC ......................................................... 725/116
See application file for complete search history.

(56) References Cited

U.S. PATENT DOCUMENTS

| | | | |
|---|---|---|---|
| 10,306,278 B2* | 5/2019 | Kwak | ..................... H04N 21/45 |
| 2010/0002696 A1* | 1/2010 | Vare | ..................... H04L 69/164 |
| | | | 370/390 |
| 2010/0162307 A1 | 6/2010 | Suh et al. | |
| 2012/0051320 A1 | 3/2012 | Väre et al. | |
| 2012/0331508 A1* | 12/2012 | Vare | ..................... H04L 65/4076 |
| | | | 725/50 |
| 2013/0034032 A1* | 2/2013 | Vare | ..................... H04N 21/2362 |
| | | | 370/310 |
| 2013/0155186 A1 | 6/2013 | Lee et al. | |
| 2014/0149545 A1* | 5/2014 | Bouazizi | ............... H04L 65/607 |
| | | | 709/217 |
| 2016/0173945 A1 | 6/2016 | Oh et al. | |

FOREIGN PATENT DOCUMENTS

| | | |
|---|---|---|
| KR | 10-2008-0089383 A | 10/2008 |
| KR | 10-2009-0031319 A | 3/2009 |
| KR | 10-2010-0105314 A | 9/2010 |
| KR | 10-2013-0117778 A | 10/2013 |
| KR | 10-2013-0120416 A | 11/2013 |
| KR | 10-2013-0135742 A | 12/2013 |
| KR | 10-2016-0102957 A | 8/2016 |
| KR | 10-2012-0139520 A | 12/2018 |

* cited by examiner

FIG. 8
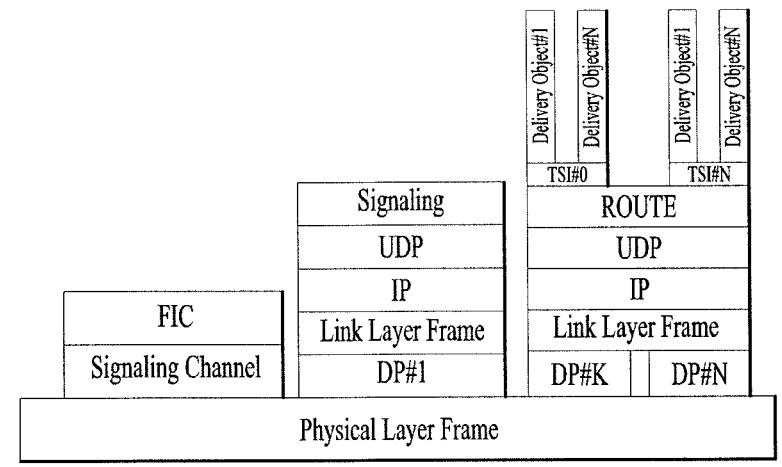
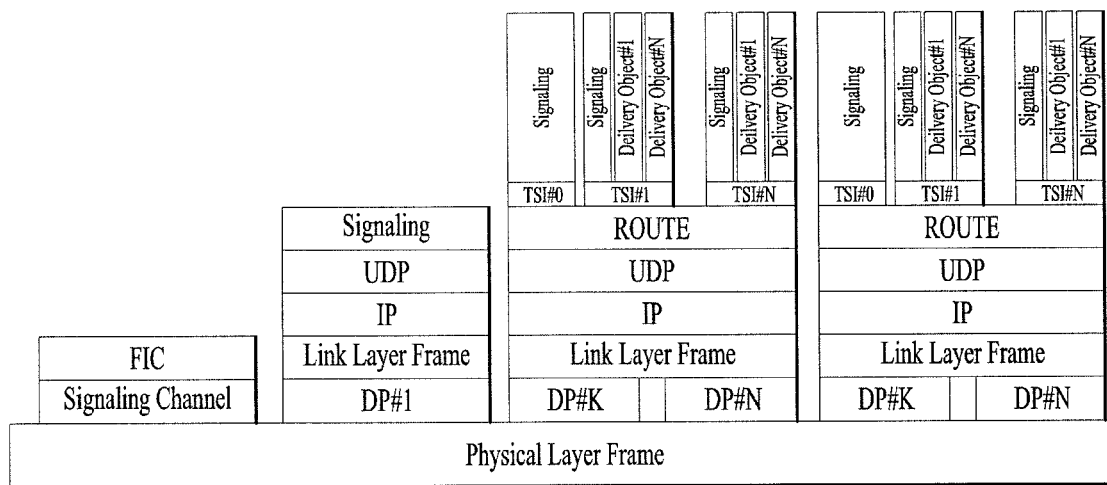
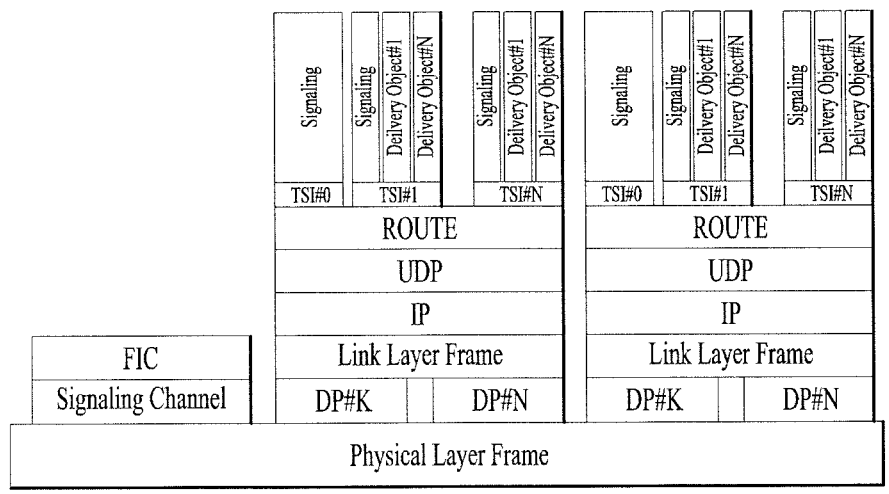

FIG. 9

| Syntax | No. Bits | Format |
|---|---|---|
| FIC(){ | | |
|     FIC_protocol_version | 8 | uimsbf |
|     TSID | 16 | uimsbf |
|     FIC_data_version | 8 | uimsbf |
|     num_partitions | 8 | uimsbf |
|     for (i-0; i<num_partitions ; i++) { | | |
|         partition_protocol_version | 8 | uimsbf |
|         base_DP_ID | 8 | uimsbf |
|         base_DP_version | 8 | uimsbf |
|         num_services | 8 | uimsbf |
|         For (j=0 ; j< num_services ; j++) { | | |
|             service_id | 16 | uimsbf |
|             channel_number | 16 | uimsbf |
|             service_category | 5 | uimsbf |
|             short_service_name _length /*m*/ | 3 | uimsbf |
|             short_service_name | 16*m | var |
|             service_status | 2 | uimsbf |
|             service_distribution | 2 | uimsbf |
|             sp_indicator | 1 | uimsbf |
|             reserved | 3 | '111' |
|         } | | |
|     } | | |
| } | | |

FIG. 10

| Syntax | No. Bits | Format |
|---|---|---|
| FIC(){ | | |
|     FIC_protocol_version | 8 | uimsbf |
|     transport_stream_ID | 16 | uimsbf |
|     FIC_data_version | 8 | uimsbf |
|     num_partitions | 8 | uimsbf |
|     for (i-0 ; i<num_partitions ; i++) { | | |
|         partition_id | 8 | uimsbf |
|         partition_protocol_version | 8 | uimsbf |
|         num_services | 8 | uimsbf |
|         For (j=0 ; j<num_services ; j++) { | | |
|             service_id | 16 | uimsbf |
|             service_data_version | 8 | uimsbf |
|             channel_number | 16 | uimsbf |
|             service_category | 5 | uimsbf |
|             short_service_name_length /*m*/ | 3 | uimsbf |
|             short_service_name | 16*m | var |
|             service_status | 3 | uimsbf |
|             service_distribution | 2 | uimsbf |
|             sp_indicator | 1 | uimsbf |
|             IP_version_flag | 1 | bslbf |
|             source_IP_address_flag | 1 | bslbf |
|             num_transport_sessions | 8 | uimsbf |
|             for ( int k=0; k< num_transport_sessions;k ++){ | | |
|                 if( source_IP_address_flag ) | | |
|                     source_IP_addr | 32 or 128 | uimsbf |
|                 dest_IP_addr | 32 or 128 | uimsbf |
|                 dest_UDP_port | 16 | uimsbf |
|                 LSID_DP | 8 | uimsbf |
|                 service_signaling_flag | 8 | uimsbf |
|             [transport_session_descriptors] | | |
|             } | | |
|         [service_descriptors] | | |
|         } | | |
|     [partition_descriptors] | | |
|     } | | |
|     [FIC_descriptors] | | |
| } | | |

FIG. 12

| Syntax | No. Bits | Format |
|---|---|---|
| FIC(){ | | |
|     FIC_protocol_version | 8 | uimsbf |
|     transport_stream_ID | 16 | uimsbf |
|     FIC_data_version | 8 | uimsbf |
|     num_partitions | 8 | uimsbf |
|     for (i-0 ; i<num_partitions ; i++) { | | |
|         partition_id | 8 | uimsbf |
|         partition_protocol_version | 8 | uimsbf |
|         num_services | 8 | uimsbf |
|         For (j=0 ; j<num_services ; j++) { | | |
|             service_id | 16 | uimsbf |
|             service_data_version | 8 | uimsbf |
|             channel_number | 16 | uimsbf |
|             service_category | 5 | uimsbf |
|             short_service_name _ length /*m*/ | 3 | uimsbf |
|             short_service_name | 16*m | var |
|             service_status | 3 | uimsbf |
|             service_distribution | 2 | uimsbf |
|             sp_indicator | 1 | uimsbf |
|             IP_version_flag | 1 | bslbf |
|             source_IP_address_flag | 1 | bslbf |
|             num_transport_sessions | | |
|             for ( int k=0; k< num_transport_sessions;k ++){ | 8 | uimsbf |
|                 if( source_IP_address_flag ) | | |
|                     source_IP_addr | | |
|                 dest_IP_addr | | |
|                 dest_UDP_port | 32 or 128 | uimsbf |
|                 LSID_DP | 32 or 128 | uimsbf |
|                 service_signaling_flag | 16 | uimsbf |
|                 if( service_signaling_flag == TRUE){ | 8 | uimsbf |
|                     signaling_data_version | 8 | uimsbf |
|                     signaling_DP | | |
|                 } | 8 | uimsbf |
|                 [transport_session_descriptors] | 8 | uimsbf |
|             } | | |
|             [service_descriptors] | | |
|         } | | |
|         [partition_descriptors] | | |
|     } | | |
|     [FIC_descriptors] | | |
| } | | |

FIG. 14

LCT Session Instance Dscription Semantics

| Element or Attribute Name | | | Use | Description |
|---|---|---|---|---|
| LSID | | | | LCT Session Instance Description |
| | @version | | O | Version of this LCT Session Instance Description. The version is inc reased by one when the descriptor is updated. The received LSID with highest version number is the currently valid version. |
| | @validFrom | | O | The date and time from which the LSID is valid. The validFrom attr ibute may or may not be present. If not present, the receiver can assume the LSID version is valid immediately. |
| | @expiration | | O | The date and time when the LSID expires. The expiration attribute may or may not be present. If not present the receiver can assum e the LSID is valid for all time, or until it receives a newer LSID wit h an associated expiration value. |
| | TransportSession | | 1...N | Provides information about LCT transport sessions |
| | | @ tsi | M | Specifies the transport session identifier. The session identifiers m ust not be 0. |
| | | SourceFlow | 0 ... 1 | Provides information of a source flow carried on this tsi |
| | | RepairFlow | 0 ... 1 | Provides information of a repair flow carried on the tsi. |

Legend:

For attributes: M=Mandatory, O=Optional, OD=Optional with Default Value, CM=Conditionally Mandatory.

For elements: < minOccurs >...< maxOccurs > (N=unbounded)

Note that the conditions only holds without using xlink:href . If linking is used, then all attributes are "optional" and < minOccurs = 0 >

Elements are bold; attributes are non bold and preceded with an @.

FIG. 15

| Element or Attribute Name | | | Use | Description |
|---|---|---|---|---|
| SourceFlow | | | | defines a source flow in session |
| | EFDT | | 0 ... 1 | If provided, it specifies the details of the file delivery data. This is the extended File Delivery Table(FDT) instance.<br>The EFDT may either be embedded or may be provided as a reference. If provided as a reference the EFDT may be updated independently of the LSID. |
| | | @idRef | 0? | Identification of the EFDT, it can be represented as a URI by the corresponding Transport Session. |
| | | @realtime | OD<br>default: false | If not present it is false. If present and set to true, LCT packets contain extension headers including timestamps that express the presentation time of the included delivery object. |
| | | @ minBufferSize | 0 | Defines the maximum amount of data that needs to be stored in the receiver. This value may be present if @ realtime is set to true. |
| | ApplicationIdentifier | | 0 ... 1 | May provide additional information that can be mapped to the application that is carried in this transport session, e.g. Representation ID of a DASH content or the Adaptation Set parameters of a DASH Representation in order to select the LCT transport session for rendering. |
| | PayloadFormat | | 1 ... N | Defines payload formats of ROUTE packets carrying the objects of the source flow |
| | | @codePoint | OD<br>default=0 | Defines what CodePoint value is used for this payload. This is the value of the CP field in the LCT header. When signalling this this value, the delivery of the object can follow the rules below. |
| | | @deliveryObjectFormat | M | Specifies the payload format of the delivery object |
| | | @fragmentation | OD<br>default=0 | Specifies the type of fragmentation<br>0 : arbitrary<br>1: application specific (sample based)<br>2 : application specific (e.g., a collection of boxes) |
| | | @deliveryOrder | OD<br>default=0 | Specifies the ordering of delivery of objects<br>0 : arbitrary<br>1: in -order delivery<br>2: in -order delivery of media samples and prior to movie fragment box |
| | | @ sourceFecPayloadID | OD<br>default=1 | Defines the format of the Source FEC Payload ID. The following values can be defined :<br>- 0: the source FEC payload ID is absent and the entire delivery object is contained in this packet.<br>- 1: the source FEC payload ID is 32 bit and expresses the start offset in the object.<br>- 2: FECParameters defines the Format of the Source FEC Payload ID. |
| | | FECParameters | 0 ... 1 | Defines the FEC parameters . This includes the FEC-encoding -id , the instance -id , etc. It is specifically used to signal the applied Source FEC Payload ID. |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional"
and < minOccurs = 0 >
Elements are bold; attributes are non bold and preceded with an @.

FIG. 16

| Element or Attribute Name | Use | Description |
|---|---|---|
| EFDT | | extended FDT instance descriptor |
| @ idRef | 0...1 | Identification of the EFDT, |
| @version | O | Version of this extended FDT instance descriptor. The version if increased by one when the descriptor is updated. The received EFDT with highest version number is the currently valid version. |
| @ maxExpiresDelta | O | The maximum expiry time for an object in the Transport Session after sending the first packet associated to this object. |
| @ maxTransportSize | O | The maximum transport size of any object described by this EFDT. |
| FileTemplate | 0...1 | Specifies the file URL or file template in the body |

Legend:

For attributes: M=Mandatory, O=Optional, OD=Optional with Default Value, CM=Conditionally Mandatory.

For elements: <minOccurs>...< maxOccurs > (N=unbounded)

Note that the conditions only holds without using xlink:href . If linking is used, then all attributes are "optional" and < minOccurs = 0 >

Elements are bold ; attributes are non-bold and preceded with an @ .

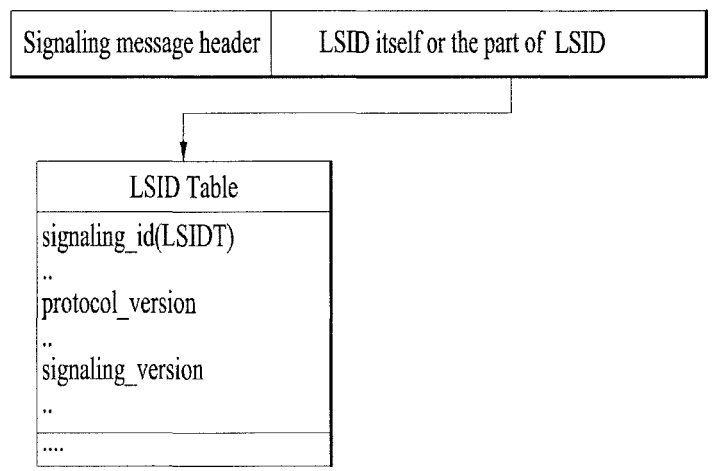

FIG. 18
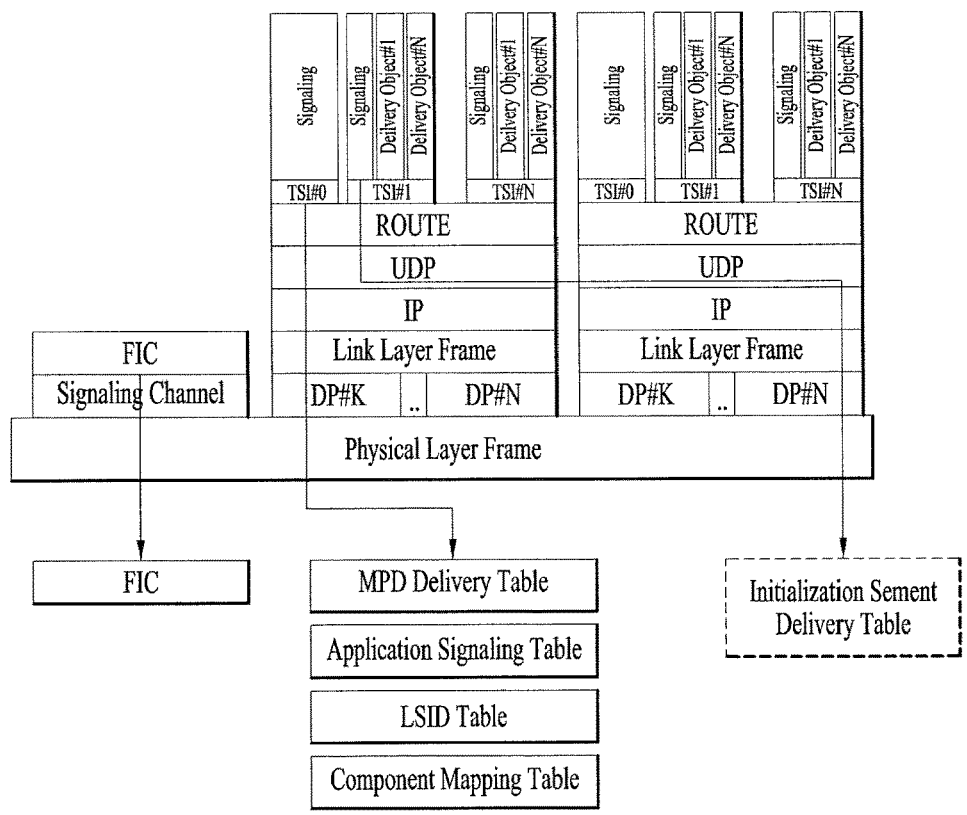
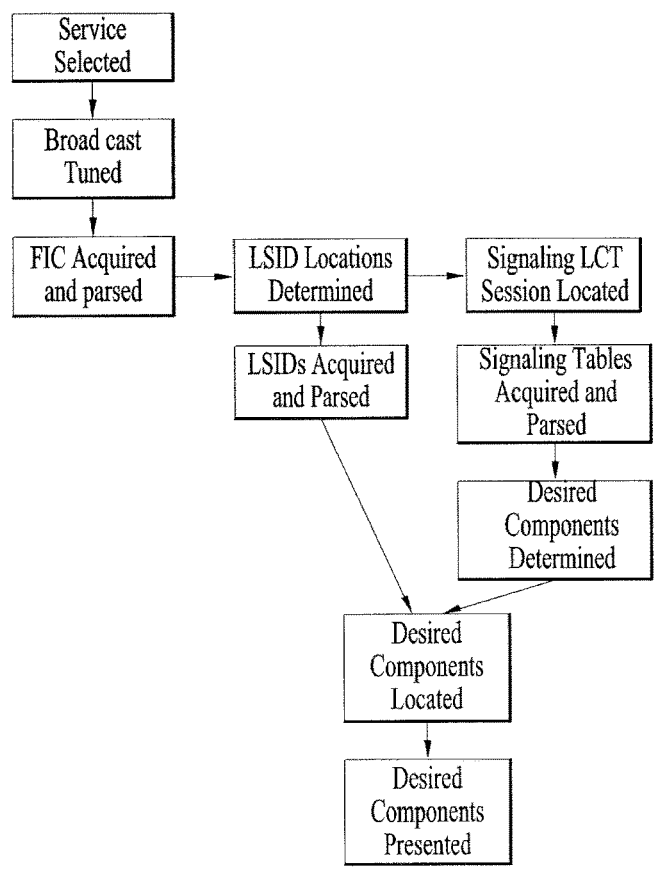

FIG. 19

| Syntax | No. Bits | Format |
|---|---|---|
| FIC(){ | | |
|     FIC_protocol_version | 8 | uimsbf |
|     transport_stream_ID | 16 | uimsbf |
|     FIC_data_version | 8 | uimsbf |
|     num_partitions | 8 | uimsbf |
|     for (i-0; i<num_partitions; i++) { | | |
|         partition_id | 8 | uimsbf |
|         partition_protocol_version | 8 | uimsbf |
|         num_services | 8 | uimsbf |
|         For (j=0; j<num_services; j++) { | | |
|             service_id | 16 | uimsbf |
|             service_data_version | 8 | uimsbf |
|             channel_number | 16 | uimsbf |
|             service_category | 5 | uimsbf |
|             short_service_name_length /*m*/ | 3 | uimsbf |
|             short_service_name | 16*m | var |
|             service_status | 3 | uimsbf |
|             service_distribution | 2 | uimsbf |
|             sp_indicator | 1 | uimsbf |
|             IP_version_flag | 1 | bslbf |
|             source_IP_address_flag | 1 | bslbf |
|             num_transport_sessions | 8 | uimsbf |
|             for ( int k=0; k< num_transport_sessions;k ++){ | | |
|                 if( source_IP_address_flag ) | | |
|                     source_IP_addr | 32 or 128 | uimsbf |
|                 dest_IP_addr | 32 or 128 | uimsbf |
|                 dest_UDP_port | 16 | uimsbf |
|                 LSID_DP | 8 | uimsbf |
|                 LSID_tsi | 16 | uimsbf |
|                 service_signaling_flag | 8 | uimsbf |
|                 if( service_signaling_flag ){ | | |
|                     signaling_data_version | 8 | uimsbf |
|                     signaling_DP | 8 | uimsbf |
|                     signaling_tsi | 16 | uimsbf |
|                 } | | |
|             [transport_session_descriptors] | | |
|             } | | |
|         [service_descriptors] | | |
|         } | | |
|     [partition_descriptors] | | |
|     } | | |
|     [FIC_descriptors] | | |
| } | | |

FIG. 20

| Field | # Bits |
|---|---|
| FIC(){ | |
|   FIC_protocol_version | 8 |
|   transport_stream_ID | 16 |
|   num_partitions | 8 |
|   for i=0..num_partitions-1 | |
|     partition_id | 8 |
|     partition_protocol_version | 8 |
|     num_services | 8 |
|     for j=0..num_services -1 | |
|       service_id | 16 |
|       service_data_version | 8 |
|       service_channel_number | 16 |
|       service_category | 5 |
|       service_short_name_length /*m*/ | 3 |
|       service_short_name | m*16 |
|       service_status | 3 |
|       service_distribution | 2 |
|       sp_indicator | 1 |
|       IP_version_flag | 1 |
|       reserved | 1 |
|       num_ROUTE_sessions | 8 |
|       for k=0..num_ROUTE_sessions -1 | |
|         source_IP_addr | 32 or 128 |
|         dest_IP_addr | 32 or 128 |
|         dest_UDP_port | 16 |
|         LSID_DP | 8 |
|         LSID_tsi | 16 |
|         component_signaling_flag | 8 |
|       [ROUTE_session_descriptors] | |
|     [service_descriptors] | |
|   [partition_descriptors] | |
| [FIC_descriptors] | |
| } | |

FIG. 21

Component Mapping Table Description Semantics

| Element/Attribute | | | Cardinality | Description |
|---|---|---|---|---|
| Component Mapping Table Description | | | | |
| | @ service_id | | 1 | Associated broadcast service identifier |
| | Broadcast Comp | | 0..N | Component transmitted through the same broadcast stream |
| | | @ mpdID | O | Associated dash mpd identifier |
| | | @ perID | O | Associated period identifier in corresponding mpd |
| | | @ reptnID | O | Dash representation identifier associated with corresponding component |
| | | @ baseURL | O | This indicates base url of segments included in dash representation associated with corresponding component |
| | | @ datapipe ID | 1 | Identifier of data pipe for transmitting corresponding component data in broadcast stream |
| | BBComp | | 0..N | Component transmitted through broadband network |
| | | @ mpdID | O | Associated dash mpd identifier |
| | | @ perID | O | Associated period identifier in corresponding mpd |
| | | @ reptnID | O | Dash representation identifier associated with corresponding component |
| | | @ baseURL | O | This indicates base url of segments included in dash representation associated with corresponding component. |
| | ForeignComp | | 0..N | Component transmitted through other broadcast streams |
| | | @mpdID | O | Associated dash mpd identifier |
| | | @ perID | O | Associated period identifier in corresponding mpd |
| | | @ reptnID | O | Dash representation identifier associated with corresponding component |
| | | @ baseURL | O | This indicates base url of segments included in dash representation associated with corresponding component. |
| | | @ transportStreamID | 1 | Identifier of broadcast stream including corresponding component data |
| | | @ sourceIPAddr | O | Source ip address of ip datagram including corresponding component data |
| | | @ destIPAddr | O | Destination ip address of ip datagram including corresponding component data |
| | | @ destUDPPort | O | Destination udp port number of ip datagram including corresponding component data |
| | | @ datapipe ID | O | Identifier of data pipe for transmitting corresponding component data in corresponding broadcast stream |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold ; attributes are non-bold and preceded with an @.

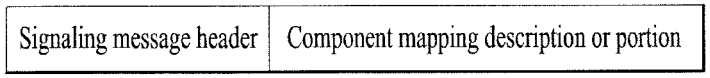

FIG. 22

Component Mapping Table Description Semantics

| Element/Attribute | | Cardinality | Description |
|---|---|---|---|
| Component Mapping Table Description | | | |
| | @ service_id | 1 | Associated broadcast service identifier |
| Broadcast Comp | | 0..N | Component transmitted through the same broadcast stream |
| | @ mpdID | O | Associated dash mpd identifier |
| | @ perID | O | Associated period identifier in corresponding mpd |
| | @ reptnID | O | Dash representation identifier associated with corresponding component |
| | @ baseURL | O | This indicates base url of segments included in dash representation associated with corresponding component. |
| | @ tsi | O | This indicates identifier of transfer session for transmitting corresponding component data in broadcast stream |
| | @ datapipe ID | 1 | Identifier of data pipe for transmitting corresponding component data in broadcast stream |
| BBComp | | 0..N | Component transmitted through broadband network |
| | @ mpdID | O | Associated dash mpd identifier |
| | @ perID | O | Associated period identifier in corresponding mpd |
| | @ reptnID | O | Dash representation identifier associated with corresponding component |
| | @ baseURL | O | This indicates base url of segments included in dash representation associated with corresponding component. |
| ForeignComp | | 0..N | Component transmitted through other broadcast streams |
| | @mpdID | O | Associated dash mpd identifier |
| | @ perID | O | Associated period identifier in corresponding mpd |
| | @ reptnID | O | Dash representation identifier associated with corresponding component |
| | @ baseURL | O | Dash representation identifier associated with corresponding component |
| | @ transportStreamID | 1 | Identifier of broadcast stream including corresponding component data |
| | @ sourceIPAddr | O | Source ip address of ip datagram including corresponding component data |
| | @ destIPAddr | O | Destination ip address of ip datagram including corresponding component data |
| | @ destUDPPort | O | Destination udp port number of ip datagram including corresponding component data |
| | @ tsi | O | This indicates identifier of transfer session for transmitting corresponding component data in corresponding broadcast stream |
| | @ datapipe ID | O | Identifier of data pipe for transmitting corresponding component data in corresponding broadcast stream |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold ; attributes are non-bold and preceded with an @.

| Signaling message header | Component mapping description or portion |
|---|---|

FIG. 23

Component Mapping Table Description Semantics

| Element/Attribute | | | Cardinality | Description |
|---|---|---|---|---|
| Component Mapping Table Description | | | | |
| | @ service_id | | 1 | Associated broadcast service identifier |
| | Component | | 0..N | Component in corresponding broadcast service |
| | | @ mpdID | O | Associated dash mpd identifier |
| | | @perID | O | Associated period identifier in corresponding mpd |
| | | @ reptnID | M | Dash representation identifier associated with corresponding component |
| | | @ baseURL | O | This indicates base url of segments included in dash representation associated with corresponding component. |
| | | DeliveryParameter | 0..N | Including detailed information on path, etc. for transmitting corresponding component |
| | | PayloadFormat | 0..N | |
| Legend: <br>     For attributes: M=Mandatory, O=Optional, OD=Optional with Default Value, CM=Conditionally Mandatory. <br>     For elements: < minOccurs >...< maxOccurs > (N=unbounded) <br>     Note that the conditions only holds without using xlink:href . If linking is used, then all attributes are "optional" and < minOccurs = 0 > <br> Elements are bold ; attributes are non -bold and preceded with an @. | | | | |

FIG. 24

| Element/Attribute | | Cardinality | Description |
|---|---|---|---|
| DeliveryParameter | | | |
| | @ transportStreamID | 0 | Identifier of broadcast stream including component data |
| | @ sourceIPAddr | 0 | Source ip address of ip datagram including component data |
| | @ destIPAddr | 0 | Destination ip address of ip datagram including component data |
| | @ destUDPPort | 0 | Destination udp port number of ip datagram including component data UDP port number |
| | @ tsi | 0 | This indicates identifier of transfer session for transmitting corresponding component data in broadcast stream. |
| | @ datapipe ID | 0 | Identifier of physical layer data pipe for transmitting corresponding component data in broadcast stream |
| | @URL | 0 | This indicates url information for acquiring corresponding component data through internet, etc. |

| Element/Attribute | | Cardinality | Description |
|---|---|---|---|
| PayloadFormat | | 1 ... N | Defines payload formats of packets carrying the component data |
| | @ codePoint | OD default=0 | Defines what CodePoint value is used for this payload. This is the value of the CP field in the LCT header. When signalling this this value, the delivery of the object can follow the rules below. |
| | @ deliveryObjectFormat | M | Specifies the payload format of the delivery object |
| | @fragmentation | OD default=0 | Specifies the type of fragmentation 0: arbitrary 1: application specific (sample based) 2: application specific (e.g., a collection of boxes) |
| | @deliveryOrder | OD default=0 | Specifies the ordering of delivery of objects 0: arbitrary 1: in -order delivery 2: in -order delivery of media samples and prior to movie fragment box |
| | @ sourceFecPayloadID | OD default=1 | Defines the format of the Source FEC Payload ID. The following values can be defined : · 0: the source FEC payload ID is absent and the entire delivery object is contained in this packet. · 1: the source FEC payload ID is 32 bit and expresses the start offset in the object. · 2: FECParameters defines the Format of the Source FEC Payload ID. |
| FECParameters | | 0 ... 1 | Defines the FEC parameters. This includes the FEC-encoding id, the -instance -id, etc. It is specifically used to signal the applied Source FEC Payload ID . |

FIG. 25

Component Mapping Table Description Semantics

| Element/Attribute | | Cardinality | Description |
|---|---|---|---|
| Component Mapping Table Description | | | |
| | @ service_id | 1 | identifier associated with component |
| | @mpdID | 0..1 | associated dash mpd identifier |
| | @ perID | 0..1 | Associated period identifier in corresponding mpd |
| | Broadcast Comp | 0..N | Component transmitted through the same broadcast stream |
| | @ reptnID | 0 | Dash representation identifier associated with corresponding component |
| | @ baseURL | 0 | This indicates base url of segments included in dash representation associated with corresponding component. |
| | @ tsi | 0 | This indicates identifier of transfer session for transmitting corresponding component data in broadcast stream |
| | @ datapipe ID | 1 | Identifier of data pipe for transmitting corresponding component data in broadcast stream |
| BBComp | | 0..N | Component transmitted through broadcast network |
| | @ reptnID | 0 | Dash representation identifier associated with corresponding component |
| | @ baseURL | 0 | This indicates base url of segments included in dash representation associated with corresponding component. |
| | ForeignComp | 0..N | Component transmitted through other broadcast streams |
| | @ reptnID | 0 | Dash representation identifier associated with corresponding component |
| | @ baseURL | 0 | This indicates base url of segments included in dash representation associated with corresponding component. |
| | @ transportStreamID | 1 | Identifier of broadcast stream including corresponding component data |
| | @ sourceIPAddr | 0 | Source ip address of ip datagram including corresponding component data |
| | @ destIPAddr | 0 | Destination ip address of ip datagram including corresponding component data |
| | @ destUDPPort | 0 | Destination udp port number of ip datagram including corresponding component data |
| | @ tsi | 0 | This indicates identifier of transfer session for transmitting corresponding component data in corresponding broadcast stream |
| | @ datapipe ID | 0 | Identifier of data pipe for transmitting corresponding component data in corresponding broadcast stream |
| Legend: For attributes: M=Mandatory, O=Optional, OD=Optional with Default Value, CM=Conditionally Mandatory. For elements: < minOccurs >...< maxOccurs > (N=unbounded) Note that the conditions only holds without using xlink:href . If linking is used, then all attributes are "optional" and < minOccurs = 0 > | | | |
| Elements are bold ; attributes are non bold and preceded with an @. | | | |

(1)BBComp means a broadband component.
(2)ForeignComp means component is another broadcast stream.
(3)The mpdID, perID and reptnID of each component identify the service component; the URLs of the component Segments can be determined from the current MPD for the service.
(4)The mpdID, perID and reptnID of a foreign component identify the service component. The precise location of the service component can be determined from the signaling in the other broadcast stream.

FIG. 26

| Element/Attribute | Cardinality | Description |
|---|---|---|
| Common attributes and elements | | |
| @profiles | O | specifies the profiles which the associated Representation( s ) conform to of the list of Media Presentation |
| @width | O | specifies the horizontal visual presentation size of the video media type on a grid determined by the @ sar attribute |
| @height | O | specifies the vertical visual presentation size of the video media type, on a grid determined by the @sar attribute. |
| @ sar | O | specifies the sample aspect ratio of the video media component type, |
| @ frameRate | O | specifies the output frame rate of the video media type in the Representation. |
| @ audioSamplingRate | O | Either a single decimal integer value specifying the sampling rate or a whitespace separated pair of decimal integer values specifying the minimum and maximum sampling rate of the audio media component type |
| @ mimeType | O | specifies the MIME type of the concatenation of the Initialization Segment, if present, and all consecutive Media Segments in the Representation. |
| @ segmentProfiles | O | specifies the profiles of Segments that are essential to process the Representation. The detailed semantics depend on the value of the @ mimeType attribute. |
| @codecs | O | specifies the codecs present within the Representation. |
| @ maximumSAPPeriod | O | when present, specifies the maximum SAP interval in seconds of all contained media streams |
| @ startWithSAP | O | specifies that in the associated Representations, each Media Segment starts with a SAP of type less than or equal to the value of this attribute value in each media stream. |
| @ maxPlayoutRate | O | specifies the maximum playout rate |
| @ codingDependency | O | When present and ?rue? for all contained media streams, specifies that there is at least one access unit that depends on one or more other access units for decoding. |
| @ scanType | O | specifies the scan type of the source material of the video media component type. |
| FramePacking | 0...N | specifies frame-packing arrangement information of the video media component type. |
| AudioChannelConfiguration | 0...N | specifies the audio channel configuration of the audio media component type. |
| ContentProtection | 0...N | specifies information about content protection schemes used for the associated Representations. |
| EssentialProperty | 0...N | specifies information about the containing element that is considered essential by the Media Presentation author for processing the containing element. |
| SupplementalProperty | 0...N | specifies supplemental information about the containing element that may be used by the DASH client optimizing the processing. |
| InbandEventStream | 0...N | specifies the presence of an inband event stream in the associated Representations. |
| Location | 0...N | specifies a location at which the associated Representation(s) are available, for example, it can indicate a broadcast stream, or the physical layer data pipe(s) carrying the associated Representation(s) |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and <minOccurs = 0 >
Elements are bold ; attributes are non -bold and preceded with an @.

FIG. 27

LCT Session Instance Description Semantics

| Element or Attribute Name | | | Use | Description |
|---|---|---|---|---|
| LSID | | | | LCT Session Instance Description |
| | @version | | O | Version of this LCT Session Instance Description. The version is increased by one when the descriptor is updated. The received LSID with highest version number is the currently valid version. |
| | @ validFrom | | O | The date and time from which the LSID is valid. The validFrom attribute may or may not be present. If not present, the receiver can assume the LSID version is valid immediately. |
| | @expiration | | O | The date and time when the LSID expires. The expiration attribute may or may not be present. If not present the receiver can assume the LSID is valid for all time, or until it receives a newer LSID with an associated expiration value. |
| | TransportSession | | 1...N | Provides information about LCT transport sessions |
| | | @ tsi | M | Specifies the transport session identifier. The session identifiers must not be 0. |
| | | SourceFlow | 0 ... 1 | Provides information of a source flow carried on this tsi |
| | | RepairFlow | 0 ... 1 | Provides information of a repair flow carried on the tsi . |
| | | TransportSessionProperty | 0...N | provides additional property information about this transport session |

Legend:
    For attributes: M=Mandatory, O=Optional, OD=Optional with Default Value, CM=Conditionally Mandatory.
    For elements: < minOccurs >...< maxOccurs > (N=unbounded)
    Note that the conditions only holds without using xlink:href . If linking is used, then all attributes are "optional" and < minOccurs = 0 >

Elements are bold; attributes are non-bold and preceded with an @.

FIG. 28

| Element or Attribute Name | | | Use | Description |
|---|---|---|---|---|
| SourceFlow | | | | defines a source flow in session |
| | EFDT | | 0 ... 1 | If provided, it specifies the details of the file delivery data. This is the extended File Delivery Table(FDT) instance.<br>The EFDT may either be embedded or may be provided as a reference. If provided as a reference the EFDT may be updated independently of the LSID. |
| | | @idRef | 0? | Identification of the EFDT, it can be represented as a URI by the corresponding Transport Session. |
| | | @ realtime | OD<br>default: false | If not present it is false. If present and set to true, LCT packets contain extension headers including timestamps that express the presentation time of the included delivery object. |
| | | @ minBufferSize | 0 | Defines the maximum amount of data that needs to be stored in the receiver. This value may be present if @ realtime is set to true. |
| | ApplicationIdentifier | | 0 ... 1 | May provide additional information that can be mapped to the application that is carried in this transport session, e.g. Representation ID of a DASH content or the Adaptation Set parameters of a DASH Representation in order to select the LCT transport session for rendering. |
| | PayloadFormat | | 1 ... N | Defines payload formats of ROUTE packets carrying the objects of the source flow |
| | | @ codePoint | OD<br>default=0 | Defines what CodePoint value is used for this payload. This is the value of the CP field in the LCT header. When signalling this this value, the delivery of the object can follow the rules below. |
| | | @ deliveryObjectFormat | M | Specifies the payload format of the delivery object |
| | | @fragmentation | OD<br>default=0 | Specifies the type of fragmentation<br>0 : arbitrary<br>1: application specific (sample based)<br>2 : application specific (e.g., a collection of boxes) |
| | | @deliveryOrder | OD<br>default=0 | Specifies the ordering of delivery of objects<br>0 : arbitrary<br>1: in -order delivery<br>2: in -order delivery of media samples and prior to movie fragment box |
| | | @ sourceFecPayloadID | OD<br>default=1 | Defines the format of the Source FEC Payload ID. The following values can be defined :<br>• 0: the source FEC payload ID is absent and the entire delivery object is contained in this packet.<br>• 1: the source FEC payload ID is 32 bit and expresses the start offset in the object.<br>• 2: FECParameters defines the Format of the Source FEC Payload ID. |
| | FECParameters | | 0 ... 1 | Defines the FEC parameters . This includes the FEC-encoding - id, the instance -id, etc. It is specifically used to signal the applied Source FEC Payload ID. |
| | SourceFlowProperty | | 0 ... N | provides property information about this source flow, e.g., broadcast location (e.g., data pipe within the broadcast stream) carrying this source flow data. |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold; attributes are non -bold and preceded with an @.

FIG. 29

| Syntax | No. Bits | Format |
|---|---|---|
| FIC(){ | | |
|   FIC_protocol_version | 8 | uimsbf |
|   transport_stream_ID | 16 | uimsbf |
|   FIC_data_version | 8 | uimsbf |
|   num_partitions | 8 | uimsbf |
|   for (i-0; i<num_partitions; i++) { | | |
|     partition_id | 8 | uimsbf |
|     partition_protocol_version | 8 | uimsbf |
|     num_services | 8 | uimsbf |
|     For (j=0; j<num_services; j++) { | | |
|       service_id | 16 | uimsbf |
|       service_data_version | 8 | uimsbf |
|       channel_number | 16 | uimsbf |
|       service_category | 5 | uimsbf |
|       short_service_name_length /*m*/ | 3 | uimsbf |
|       short_service_name | 16*m | var |
|       service_status | 3 | uimsbf |
|       service_distribution | 2 | uimsbf |
|       sp_indicator | 1 | uimsbf |
|       IP_version_flag | 1 | bslbf |
|       source_IP_address_flag | 1 | bslbf |
|       num_transport_sessions | 8 | uimsbf |
|       for (int k=0; k<num_transport_sessions;k++){ | | |
|         if(source_IP_address_flag) | | |
|           source_IP_addr | 32 or 128 | uimsbf |
|         dest_IP_addr | 32 or 128 | uimsbf |
|         dest_UDP_port | 16 | uimsbf |
|         LSID_DP | 8 | uimsbf |
|         LSID_tsi | 16 | uimsbf |
|         service_signaling_flag | 8 | uimsbf |
|         if(service_signaling_flag=='1'){ | | |
|           signaling_data_version | 8 | uimsbf |
|           signaling_DP | 8 | uimsbf |
|           signaling_tsi | 16 | uimsbf |
|         } | | |
|         link_layer_signaling_flag | 8 | uimsbf |
|         if(link_layer_signaling_flag=='1'){ | | |
|           link_layer_signaling_data_version | 8 | uimsbf |
|           link_layer_signaling_DP | 8 | uimsbf |
|         } | | |
|         [transport_session_descriptors] | | |
|       } | | |
|       [service_descriptors] | | |
|     } | | |
|     [partition_descriptors] | | |
|   } | | |
|   [FIC_descriptors] | | |
| } | | |

FIG. 30

| Field | # Bits | format |
|---|---|---|
| FIC(){ | | |
|   FIC_protocol_version | 8 | uimsbf |
|   transport_stream_ID | 16 | uimsbf |
|   num_partitions | 8 | uimsbf |
|   for i=0..num_partitions-1 | | |
|     partition_id | 8 | uimsbf |
|     partition_protocol_version | 8 | uimsbf |
|     num_services | 8 | uimsbf |
|     for j=0..num_services-1 | | |
|       service_id | 16 | uimsbf |
|       service_data_version | 8 | uimsbf |
|       service_channel_number | 16 | uimsbf |
|       service_category | 5 | uimsbf |
|       service_short_name_length /*m*/ | 3 | uimsbf |
|       service_short_name | m*16 | var |
|       service_status | 3 | uimsbf |
|       service_distribution | 2 | uimsbf |
|       sp_indicator | 1 | bslbf |
|       IP_version_flag | 1 | bslbf |
|       reserved | 1 | '1' |
|       num_ROUTE_sessions | 8 | uimsbf |
|       for k=0..num_ROUTE_sessions-1 | | |
|         source_IP_addr | 32 or 128 | uimsbf |
|         dest_IP_addr | 32 or 128 | uimsbf |
|         dest_UDP_port | 16 | uimsbf |
|         LSID_DP | 8 | uimsbf |
|         LSID_tsi | 16 | uimsbf |
|         reserved | 6 | '111111' |
|         component_signaling_flag | 1 | bslbf |
|         link_layer_signaling_flag | 1 | bslbf |
|         if(link_layer_signaling_flag=='1'){ | | |
|           link_layer_signaling_data_version | 8 | uimsbf |
|           link_layer_signaling_DP | 8 | uimsbf |
|         } | | |
|       [ROUTE_session_descriptors] | | |
|     [service_descriptors] | | |
|   [partition_descriptors] | | |
|   [FIC_descriptors] | | |
| } | | |

FIG. 31

| Syntax | No. Bits | Format |
|---|---|---|
| signaling_message_header ( ){ | | |
|     signaling_id | 8 | uimsbf |
|     signaling_length | 16 | uimsbf |
|     signaling_id_extension | 16 | uimsbf |
|     version_number | 4 | uimsbf |
|     current_next_indicator | 1 | uimsbf |
|     reserved | 3 | '111' |
|     indicator_flags { | | |
|         fragmentation_indicator | 1 | bslbf |
|         payload_format_indicator | 1 | bslbf |
|         expiration _indicator | 1 | bslbf |
|         validfrom_indicator | 1 | bslbf |
|     } | | |
|     reserved | 4 | '1111' |
|     if( fragmentation_indicator ){ | | |
|         fragment_number | 4 | uimsbf |
|         last_fragment_number | 4 | uimsbf |
|     } | | |
|     if( payload_format_indicator ){ | | |
|         payload_format | 8 | uimsbf |
|     } | | |
|     if( validfrom_indicator ){ | | |
|         validfrom | 32 | uimsbf |
|     } | | |
|     if( expiration _indicator ){ | | |
|         expiration | 32 | uimsbf |
|     } | | |
| } | | |

FIG. 33

| PayloadFormat | 1 ... N | Defines payload formats of ROUTE packets carrying the objects of the source flow |
|---|---|---|
| @codePoint | OD<br>default=0 | Defines what CodePoint value is used for this payload. This is is the value of the CP field in the LCT header. When signalling this this value, the delivery of the object can follow the rules below. |
| @deliveryObjectFormat | M | Specifies the payload format of the delivery object<br>0: Signalling Message Format<br>1: File Mode<br>2: Entity Mode<br>3: Package<br>4: metadata including Initialization Segment<br>5...: Reserved |
| @fragmentation | OD<br>default=0 | Specifies the type of fragmentation<br>0: arbitrary<br>1: application specific (sample based)<br>2: application specific (e.g., a collection of boxes) |
| @deliveryOrder | OD<br>default=0 | Specifies the ordering of delivery of objects<br>0: arbitrary<br>1: in-order delivery<br>2: in-order delivery of media samples and prior to movie fragment box |
| @sourceFecPayloadID | OD<br>default=1 | Defines the format of the Source FEC Payload ID. The following values can be defined:<br>· 0: the source FEC payload ID is absent and the entire delivery object is contained in this packet.<br>· 1: the source FEC payload ID is 32 bit and expresses the start offset in the object.<br>· 2: FECParameters defines the Format of the Source FEC Payload ID. |

FIG. 34

| Element or Attribute Name | Use | Description |
|---|---|---|
| SOD | | Signaling Object Description |
| @ protocolVersion | O | Specifies the version of Signaling Object Description. |
| @ dataVersion | O | Specifies the version of the current SOD instance.<br>@dataVersion can be changed when the contents of SOD are changed |
| @ validFrom | O | Specifies availability start time of the current SOD instance. A receiver can recognize availability start time of SOD using this and use SOD information from the time |
| @expiration | O | Specifies availability expiration time of the current SOD instance. The receiver can recognize availability expiration of SOD and manage SOD information using the same. |
| Signaling Object | 1...N | |
| @ toi | M | Map to a TOI of a TOI LCT packet allocated to a signaling object to identify the following information such as the type and version of a signaling message carried by each object. |
| @type | M | Type of a signaling message included in an object. For example, values such as 0: LSID (LCT Session Instance Description), 1: CMD (Component Mapping Description), 2: ASD (Application Signaling Dscription), 3: MPD (Media Presentation Description), 4: USD (URL Signaling Description) and 5: IS (Initialization Segment) are allocated to each signaling message to specify the type thereof. |
| @version | M | Specifies the version of a signaling message. A change of the signaling message can be indicated through a change of this field value. |
| @instance Id | O | Specifies an instance of a signaling message. This can be used to discriminate instances of signaling messages that may be present in one service such as an initialization segment. |
| @ validFrom | O | Specifies availability start time of a signaling message included in an object. The receiver can recognize availability start time of signaling included in the object using this and use the signaling included in the object from the start time. |
| @expiration | O | Specifies validity time of a signaling message included in an object. The receiver can recognize availability expiration time of signaling included in the object and manage the signaling message using the same. |
| @ payloadFormat | O | Specifies the format of signaling message data included in an object. For example, this specifies the binary or XML format. |

Legend:
    For attributes: M=Mandatory, O=Optional, OD=Optional with Default Value, CM=Conditionally Mandatory.
    For elements: < minOccurs >...< maxOccurs > (N=unbounded)
    Note that the conditions only holds without using xlink:href . If linking is used, then all attributes are "optional" and < minOccurs = 0 >
Elements are bold; attributes are non-bold and preceded with an @.

FIG. 35

| 0 | | 7 | | | | | | | 15 | | 23 | 31 |
|---|---|---|---|---|---|---|---|---|---|---|---|---|
| V | C | PSI | S | O | H | Res | A | B | HDR_LEN | | Codepoint (CP) | |
| Congestion Control Information (CCI) ||||||||||||||
| Transport Session Identifier (TSI) ||||||||||||||
| Type |||||||| Version |||||
| Header Extensions ||||||||||||||
| FEC Payload ID ||||||||||||||
| Encoding Symbol (s) ||||||||||||||

FIG. 36

| Element or Attribute Name | Use | Description |
|---|---|---|
| TCD | | TOI Configuration Description |
| @protocolVersion | O | Specifies the version of TOI Configuration Description. |
| @dataVersion | O | Specifies the version of the current TCD instance. When the contents of the TCD are changed, @dataVersion can be changed |
| @validFrom | O | Specifies availability start time of the current TCD instance. A receiver can recognize availability start time of TCD using this and use TCD information from the start time. |
| @expiration | O | Specifies availability expiration time of the current TCD instance. The receiver can recognize availability expiration time of TCD and manage TCD information using the same. |
| @typeBits | M | Indicates the length of the type field in the TOI field as a bit number. |
| @versionBits | M | Indicates the length of the version field in the TOI field as a bit number. |
| @instanceIdBits | O | Indicates the length of the instanceId field in the TOI field as a bit number. |
| @validFromBits | O | Indicates the length of the validFrom field in the TOI field as a bit number. |
| @expirationBits | O | Indicates the length of the expiration field in the TOI field as a bit number. |
| @payloadFormatBits | O | Indicates the length of the payloadFormat field in the TOI field as a bit number. |

FIG. 37

| PayloadFormat | 1 ... N | Defines payload formats of ROUTE packets carrying the objects of the source flow |
|---|---|---|
| @codePoint | OD default=0 | Defines what CodePoint value is used for this payload. This is the value of the CP field in the LCT header. When signalling this this value, the delivery of the object can follow the rules below. |
| @deliveryObjectFormat | M | Specifies the payload format of the delivery object<br>0: Signalling Message Format<br>1: File Mode<br>2: Entity Mode<br>3: Package<br>4: metadata including Initialization Segment<br>5?: Reserved |
| @fragmentation | OD default=0 | Specifies the type of fragmentation<br>0: arbitrary<br>1: application specific (sample based)<br>2: application specific (e.g., a collection of boxes) |
| @deliveryOrder | OD default=0 | Specifies the ordering of delivery of objects<br>0: arbitrary<br>1: in-order delivery<br>2: in-order delivery of media samples and prior to movie fragment box |
| @sourceFecPayloadID | OD default=1 | Defines the format of the Source FEC Payload ID. The following values can be defined:<br>• 0: the source FEC payload ID is absent and the entire delivery object is contained in this packet.<br>• 1: the source FEC payload ID is 32 bit and expresses the start offset in the object.<br>• 2: FECParameters defines the Format of the Source FEC Payload ID. |
| TCID | 0...1 | TOI Configuration Instance Description |

FIG. 38

| Element or Attribute Name | Use | Description |
|---|---|---|
| TCID | | TOI Configuration Instance Description |
| @ typeBits | M | Indicates the length of the type field in the TOI field as a bit number. |
| @ versionBits | M | Indicates the length of the version field in the TOI field as a bit number. |
| @ instanceIdBits | O | Indicates the length of the instanceId field in the TOI field as a bit number. |
| @ validFromBits | O | Indicates the length of the validFrom field in the TOI field as a bit number. |
| @ expirationBits | O | Indicates the length of the expiration field in the TOI field as a bit number. |
| @ payloadFormatBits | O | Indicates the length of the payloadFormat field in the TOI field as a bit number. |

FIG. 40

| Syntax | No. of Bits | Format |
|---|---|---|
| FIC_payload( ) { | | |
|     FIC_protocol_version | 8 | uimsbf |
|     transport_stream_id | 16 | uimsbf |
|     num_partitions | 8 | uimsbf |
|     for (i=0; i<num_partitions; i++) { | | |
|         partition_id | | |
|         partition_protocol_version | 8 | uimsbf |
|         num_services | 8 | uimsbf |
|         for (j=0; j<num_services; j++) { | 8 | uimsbf |
|             service_id | | |
|             service_data_version | 16 | uimsbf |
|             service_channel_number | 8 | uimsbf |
|             service_category | | |
|             short_service_name_length /*m*/ | 16 | uimsbf |
|             short_service_name | 5 | uimsbf |
|             service_status | 3 | uimsbf |
|             service_distribution | 16*m | bslbf |
|             sp_indicator | 3 | uimsbf |
|             IP_version_flag | 2 | uimsbf |
|             reserved | 1 | bslbf |
|             SSC_delivery_type | 1 | bslbf |
|             reserved | | |
|             if( SSC_delivery_type == 0x01 ){ | 1 | '1' |
|                 reserved | 4 | uimsbf |
|                 SSC_source_IP_address_flag | 4 | '1111' |
|                 if( SSC_source_IP_address_flag ){ | | |
|                     SSC_source_IP_address | | |
|                 } | 7 | '1111111' |
|                 SSC_destination_IP_address | 1 | bslbf |
|                 SSC_destination_UDP_port | | |
|                 SSC_TSI | | |
|                 SSC_DP_ID | 32 or 128 | uimsbf |
|             } | | |
|             } | 32 or 128 | uimsbf |
|             else if ( SSC_delivery_type == 0x02 ){ | 16 | uimsbf |
|                 SSC_URL_length /*K*/ | 16 | uimsbf |
|                 SSC_URL_data | 8 | uimsbf |
|             } | | |
|         } | 16 | bslbf |
|         num_partition_level_descriptors | 8*K | |
|         for (k=0; k<num_partition_level_descriptors; k++) | 8 | |
|             partition_level_descriptor( ) | var | uimsbf |
|     } | | |
|     num_FIC_level_descriptors | 8 | |
|     for (n=0; n<num_FIC_level_descriptors; n++) | | uimsbf |
|         FIC_level_descriptor( ) | var | |
| } | | |

FIG. 41

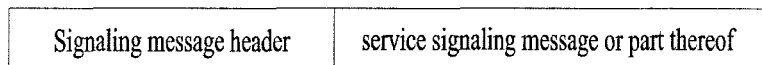

| Element/Attribute | | | Cardinality | Description |
|---|---|---|---|---|
| Service | | | | |
| | @service_id | | 1 | Service identifier |
| | @service_category | | 1 | Service type |
| | @service_name | | 1 | Service name |
| | @channel_number | | 0..1 | Service related channel information |
| | @service_status | | 0..1 | Service status |
| | @service_distribution | | 0..1 | |
| | @SP_indicator | | 0..1 | Presence or absence of service protection |
| | ROUTE Session | | 0..N | ROUTE session information |
| | | @sourceIPAddr | 0..1 | the source address of the IP datagrams carrying ROUTE packets |
| | | @destIPAddr | 1 | the destination address of the IP datagrams carrying ROUTE packets |
| | | @destUDPPort | 1 | the destination port number of the IP datagrams carrying ROUTE packets |
| | | @LSID_DP | 1 | Identifier of a data pipe delivering LSID including information such as transport parameters of each Route session |
| | Targeting | | 0..1 | Targeting parameter for the service |
| | Content Advisory | | 0..1 | Service related content advisory information |
| | Right Issuer Service | | 0..1 | Includes information about a service related right issuer |
| | Current Program | | 0..1 | Includes information about a current program |
| | Original Service Identification | | 0..1 | Includes ID information about the original service |
| | Content Labeling | | 0..1 | Includes content labeling related information |
| | Genre | | 0..1 | Includes service related genre information |
| | Caption | | 0..1 | Includes service caption related information |
| | Protection | | 0..1 | Includes service protection related information |

FIG. 42

| Element/Attribute | | Cardinality | Description |
|---|---|---|---|
| Component Mapping Description | | | |
| @ service_id | | 1 | Identifier related to a component |
| @mpdID | | 0..1 | Associated DASH MPD identifier |
| @ perID | | 0..1 | Associated period identifier in corresponding MPD |
| Broadcast Comp | | 0..N | Component delivered through the same broadcast stream |
| | @ reptnID | 0 | DASH Representation identifier associated with the corresponding component |
| | @ baseURL | 0 | Indicates base URL of segments constituting DASH representation associated with the corresponding component |
| | @ tsi | 0 | Indicates the identifier of a transport session delivering corresponding component data in a broadcast stream |
| | @ datapipe ID | 1 | Identifier of a data pipe delivering corresponding component data in a broadcast stream |
| BBComp | | 0..N | Component transmitted through a broadband network |
| | @ reptnID | 0 | DASH Representation identifier associated with the corresponding component |
| | @ baseURL | 0 | Indicates base URL of segments constituting DASH representation associated with the corresponding component |
| ForeignComp | | 0..N | Components transmitted through other broadcast streams |
| | @ reptnID | 0 | DASH Representation identifier associated with the corresponding component |
| | @ baseURL | 0 | Indicates base URL of segments constituting DASH representation associated with the corresponding component |
| | @ transportStreamID | 1 | Identifier of a broadcast stream including corresponding component data |
| | @ partitionID | 0 | Identifier of a partition indicating a broadcaster in the corresponding broadcast stream |
| | @ sourceIPAddr | 0 | Source IP address of IP datagram including corresponding component data |
| | @ destIPAddr | 0 | Destination IP address of IP datagram including corresponding component data |
| | @ destUDPPort | 0 | Destination UDP port number of IP datagram including corresponding component data |
| | @ tsi | 0 | Indicates the identifier of a transport session delivering corresponding component data in a broadcast stream |
| | @ datapipe ID | 0 | Identifier of a data pipe delivering corresponding component data in the corresponding broadcast stream |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold ; attributes are non-bold and preceded with an @.

FIG. 43

| Element/Attribute | Cardinality | Description |
|---|---|---|
| URL Signaling Description | | |
| @service_id | 1 | service identifier |
| @smtURL | 0..1 | URL of broadband SMT (service map table) |
| @mpdURL | 0..1 | URL of broadband MPD |
| @cmtURL | 0..1 | URL of broadband CMT (component mapping table) |
| @astURL | 0..1 | URL of broadband AST (application signaling table) |
| @gatURL | 0..1 | URL of broadband GAT (guide access table) |
| @eatURL | 0..1 | URL of broadband EAT (emergency alert table) |

FIG. 44

| Element or Attribute Name | Use | Description |
|---|---|---|
| SourceFlow | | defines a source flow in session |
| EFDT | 0...1 | If provided, it specifies the details of the file delivery data. This is the extended File Delivery Table(FDT) instance.<br>The EFDT may either be embedded or may be provided as a reference. If provided as a reference the EFDT may be updated independently of the LSID. |
| @ idRef | 0...1 | Identification of the EFDT, it can be represented as a URI by the corresponding Transport Session. |
| @ realtime | OD<br>default: false | If not present it is false. If present and set to true, LCT packets contain extension headers including timestamps that express the presentation time of the included delivery object. |
| @ minBufferSize | O | Defines the maximum amount of data that needs to be stored in the receiver. This value may be present if @ realtime is set to true. |
| ApplicationIdentifier | 0...1 | May provide additional information that can be mapped to the application that is carried in this transport session, e.g. Representation ID of a DASH content or the Adaptation Set parameters of a DASH Representation in order to select the LCT transport session for rendering. |
| @location | O | location (e.g., data pipe within the broadcast stream) carrying this source flow data. |
| PayloadFormat | 1...N | Defines payload formats of ROUTE packets carrying the objects of the source flow |
| @ codePoint | OD<br>default=0 | Defines what CodePoint value is used for this payload. This is the value of the CP field in the LCT header. When signalling this this value, the delivery of the object can follow the rules below. |
| @ deliveryObjectFormat | M | Specifies the payload format of the delivery object |
| @fragmentation | OD<br>default=0 | Specifies the type of fragmentation<br>0 : arbitrary<br>1: application specific (sample based)<br>2 : application specific (e.g., a collection of boxes) |
| @ deliveryOrder | OD<br>default=0 | Specifies the ordering of delivery of objects<br>0 : arbitrary<br>1: in -order delivery<br>2: in -order delivery of media samples and prior to movie fragment box |
| @ sourceFecPayloadID | OD<br>default=1 | Defines the format of the Source FEC Payload ID. The following values can be defined :<br>· 0: the source FEC payload ID is absent and the entire delivery object is contained in this packet.<br>· 1: the source FEC payload ID is 32 bit and expresses the start offset in the object.<br>· 2: FECParameters defines the Format of the Source FEC Payload ID. |
| FECParameters | 0...1 | Defines the FEC parameters . This includes the FEC-encoding -id, the instance -id, etc. It is specifically used to signal the applied Source FEC Payload ID. |
| SourceFlowProperty | 0...N | provides property information about this source flow, e.g., broadcast location (e.g., data pipe within the broadcast stream) carrying this source flow data. |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold; attributes are non -bold and preceded with an @.

BROADCASTING SIGNAL TRANSMITTING DEVICE, BROADCASTING SIGNAL RECEIVING DEVICE, BROADCASTING SIGNAL TRANSMITTING METHOD, AND BROADCASTING SIGNAL RECEIVING METHOD

CROSS-REFERENCE TO RELATED APPLICATIONS

This Application is a Continuation of co-pending U.S. patent application Ser. No. 15/468,408 filed on Mar. 24, 2017, which is the National Phase of PCT International Application No. PCT/KR2015/010205 filed on Sep. 25, 2015, which claims the priority benefit under 35 U.S.C. § 119(e) to U.S. Provisional Application No. 62/055,618 filed on Sep. 25, 2014, all of which are hereby expressly incorporated by reference into the present application.

BACKGROUND OF THE INVENTION

Field of the Invention

The present invention relates to a broadcast signal transmitting device, a broadcast signal receiving device, and broadcast transceiving methods

Discussion of the Related Art

As analog broadcast signal transmission is terminated, various technologies for transmitting and receiving a digital broadcast signal have been developed. A digital broadcast signal is capable of containing a larger amount of video/audio data than an analog broadcast signal and further containing various types of additional data as well as video/audio data.

SUMMARY OF THE INVENTION

That is, a digital broadcast system may provide a high definition (HD) image, multi-channel audio, and various additional services. However, for digital broadcast, network flexibility obtained by considering data transmission efficiency for a large amount of data transmission, robustness of a transceiving network, and a mobile receiving apparatus needs to be enhanced.

To solve the aforementioned problems, a broadcast signal transmission processing method according to an embodiment of the present invention includes: generating one or more first layer data units including first level signaling data and broadcast data for a broadcast service; generating one or more second layer data units including the one or more first layer data units and second level signaling data; and generating a broadcast signal including the one or more second layer data units.

The first level signaling data may include information describing the broadcast service, and the second level signaling data may include information necessary for channel scan and acquisition of the first level signaling data.

The first level signaling data may include transport session data including information about a transport session delivering the broadcast data.

The second level signaling data may include destination IP address information indicating a destination IP address of packets delivering the first level signaling data, destination UDP port number information indicating a UDP port number of the packets delivering the first level signaling data, and source IP address information indicating a source IP address of the packets delivering the first level signaling data.

The second level signaling data may further include transport type information identifying whether the first level signaling data is transmitted over broadband and URL information indicating a URL of a server providing the first level signaling data.

The second level signaling data may further include data pipe identification information identifying a data pipe delivering the first level signaling data.

The broadcast service may include one or more components, and the first level signaling data may include broadcaster identification information identifying a broadcaster providing each component.

To solve the aforementioned problems, a broadcast signal transmission processing device according to an embodiment of the present invention includes: a first layer encoder for generating one or more first layer data units including first level signaling data and broadcast data for a broadcast service; a second layer encoder for generating one or more second layer data units including the one or more first layer data units and second level signaling data; and a broadcast signal generator for generating a broadcast signal including the one or more second layer data units.

The first level signaling data may include information describing the broadcast service, and the second level signaling data may include information necessary for channel scan and acquisition of the first level signaling data.

The first level signaling data may include transport session data including information about a transport session delivering the broadcast data.

The second level signaling data may include destination IP address information indicating a destination IP address of packets delivering the first level signaling data, destination UDP port number information indicating a UDP port number of the packets delivering the first level signaling data, and source IP address information indicating a source IP address of the packets delivering the first level signaling data.

The second level signaling data may further include transport type information identifying whether the first level signaling data is transmitted over broadband and URL information indicating a URL of a server providing the first level signaling data.

The second level signaling data may further include data pipe identification information identifying a data pipe delivering the first level signaling data.

The broadcast service may include one or more components, and the first level signaling data may include broadcaster identification information identifying a broadcaster providing each component.

Advantageous Effects

According to the present invention, various broadcast services may be provided by processing data according to service properties and controlling quality of service (QoS) of each service or service component.

According to the present invention, transmission flexibility may be achieved by transmitting various broadcast services through the same radio frequency (RF) signal bandwidth.

According to the present invention, data transmission efficiency and transceiving robustness of a broadcast signal may be enhanced using a multiple-input multiple-output (MIMO) system.

According to the present invention, rapid service scan and service acquisition may be provided.

According to the present invention, location information on an associated component may be provided.

According to the present invention, service layer signaling may be selectively parsed using filtering information.

BRIEF DESCRIPTION OF THE DRAWINGS

FIG. 8 illustrates a method of transmitting signaling data in a next generation broadcast system according to an embodiment of the present invention.

FIG. 9 shows signaling data transmitted by a next generation broadcast system according to an embodiment of the present invention for rapid broadcast service scan of a receiver.

FIG. 10 shows signaling data transmitted by a next generation broadcast system according to an embodiment of the present invention for rapid broadcast service scan of a receiver.

FIG. 12 shows signaling data transmitted by a next generation broadcast system according to an embodiment of the present invention for rapid broadcast service scan of a receiver.

FIG. 14 shows a description of a transmission session instance of a next generation broadcast system according to an embodiment of the present invention.

FIG. 15 shows a SourceFlow element of a next generation broadcast system according to an embodiment of the present invention.

FIG. 16 shows an EFDT of a next generation broadcast system according to an embodiment of the present invention.

FIG. 18 shows a delivery structure of a signaling message of a next generation broadcast system according to an embodiment of the present invention.

FIG. 19 illustrates signaling data transmitted for rapidly scanning a broadcast service of a receiver of a next-generation broadcast system according to an embodiment of the present invention.

FIG. 20 illustrates signaling data transmitted for rapidly scanning a broadcast service of a receiver of a next-generation broadcast system according to an embodiment of the present invention.

FIG. 21 illustrates component mapping table description according to an embodiment of the present invention.

FIG. 22 illustrates component mapping table description according to an embodiment of the present invention.

FIGS. 23 and 24 illustrate component mapping table description according to an embodiment of the present invention.

FIG. 25 illustrates component mapping table description according to an embodiment of the present invention.

FIG. 26 is a diagram illustrating common attributes and elements of MPD according to an embodiment of the present invention.

FIG. 27 is a diagram illustrating a transfer session instance description according to an embodiment of the present invention.

FIG. 28 illustrates SourceFlow element of another next-generation broadcast system according to an embodiment of the present invention.

FIG. 29 illustrates signaling data transmitted to rapidly scan a broadcast service by a receiver in a next-generation broadcast system according to another embodiment of the present invention.

FIG. 30 illustrates signaling data transmitted for rapid scan of a broadcast service of a receiver by a next-generation broadcast system according to another embodiment of the present invention.

FIG. 31 is a diagram illustrating a syntax of a header of a signaling message according to another embodiment of the present invention.

FIG. 33 is a diagram illustrating part of a layered coding transport (LCT) session instance description (LSID) according to an embodiment of the present invention.

FIG. 34 is a diagram illustrating a signaling object description (SOD) providing information for filtering a service signaling message according to an embodiment of the present invention.

FIG. 35 is a diagram illustrating an object including a signaling message according to an embodiment of the present invention.

FIG. 36 is a diagram illustrating a TOI configuration description (TCD) according to an embodiment of the present invention.

FIG. 37 is a diagram illustrating a payload format element of a transport packet according to an embodiment of the present invention.

FIG. 38 is a diagram illustrating a TOI configuration instance description (TCID) according to an embodiment of the present invention.

FIG. 40 is a diagram illustrating a syntax of a payload of an FIC according to another embodiment of the present invention.

FIG. 41 is a diagram illustrating a syntax of service level signaling according to another embodiment of the present invention.

FIG. 42 is a diagram illustrating component mapping description according to another embodiment of the present invention.

FIG. 43 is a diagram illustrating a syntax of URI signaling description according to another embodiment of the present invention.

FIG. 44 is a diagram illustrating a SourceFlow element according to another embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

In the specification, "signaling" refers to transmission/ reception of service information (SI) provided by broadcast systems, Internet broadcast systems and/or broadcast/Internet convergence systems. The service information includes broadcast service information (e.g., ATSC-SI and/or DVB-SI) provided by existing broadcast systems.

In the specification, a "broadcast signal" is a concept including signals and/or data provided through interactive broadcast such as Internet broadcast, broadband broadcast, communication broadcast, data broadcast and/or video on demand (VOD) in addition to terrestrial broadcast, cable broadcast, satellite broadcast and/or mobile broadcast.

In the specification, a "PLP" refers to a specific unit carrying data belonging to a physical layer. Accordingly, "PLP" may be replaced by "data unit" or "data pipe" in the specification.

A hybrid broadcast service implemented through interoperation between broadcast networks and the Internet may be considered as one of powerful applications to be used in DTV services. The hybrid broadcast service transmits enhancement data associated with broadcast audio/video (A/V) content transmitted through terrestrial broadcast networks or part of the broadcast A/V content in real time such that a user can enjoy various types of content.

Figure 1:
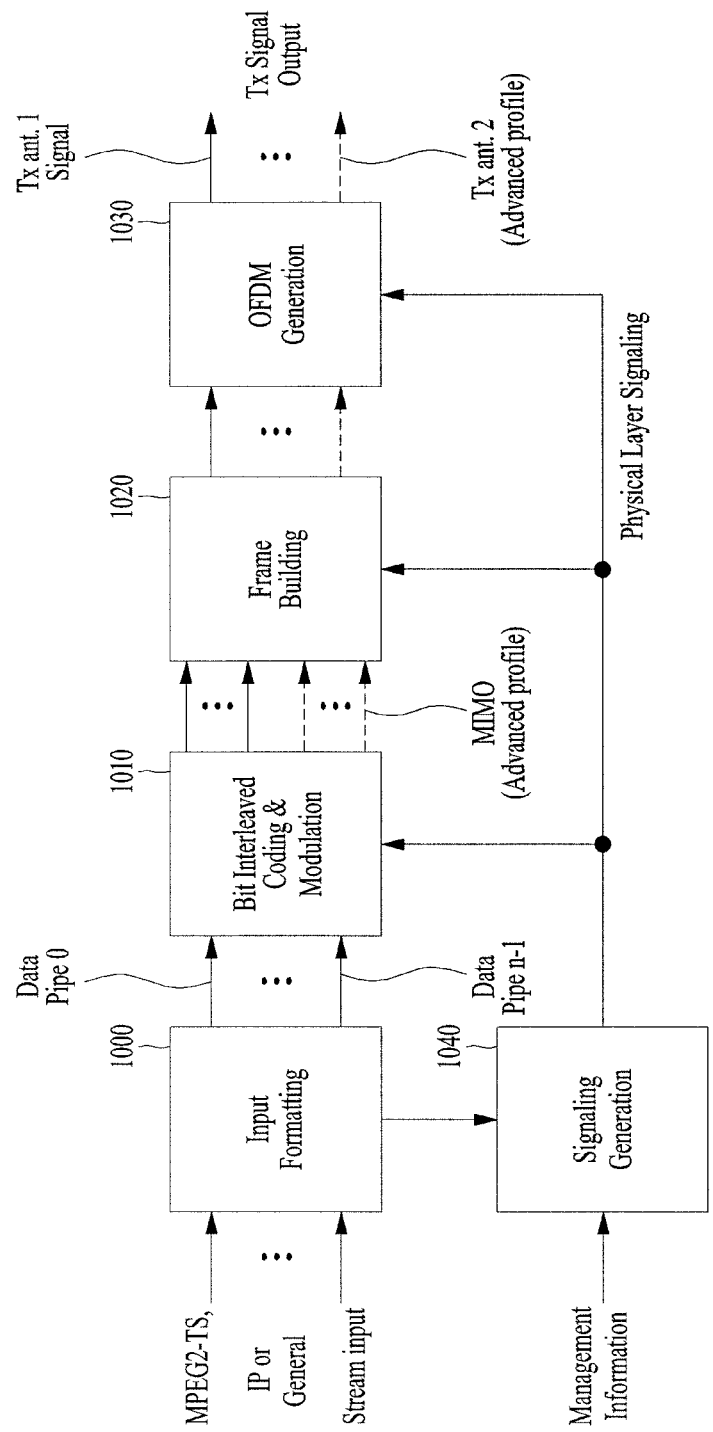
FIG. 1 illustrates a structure of an apparatus for transmitting broadcast signals for future broadcast services according to an embodiment of the present invention.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
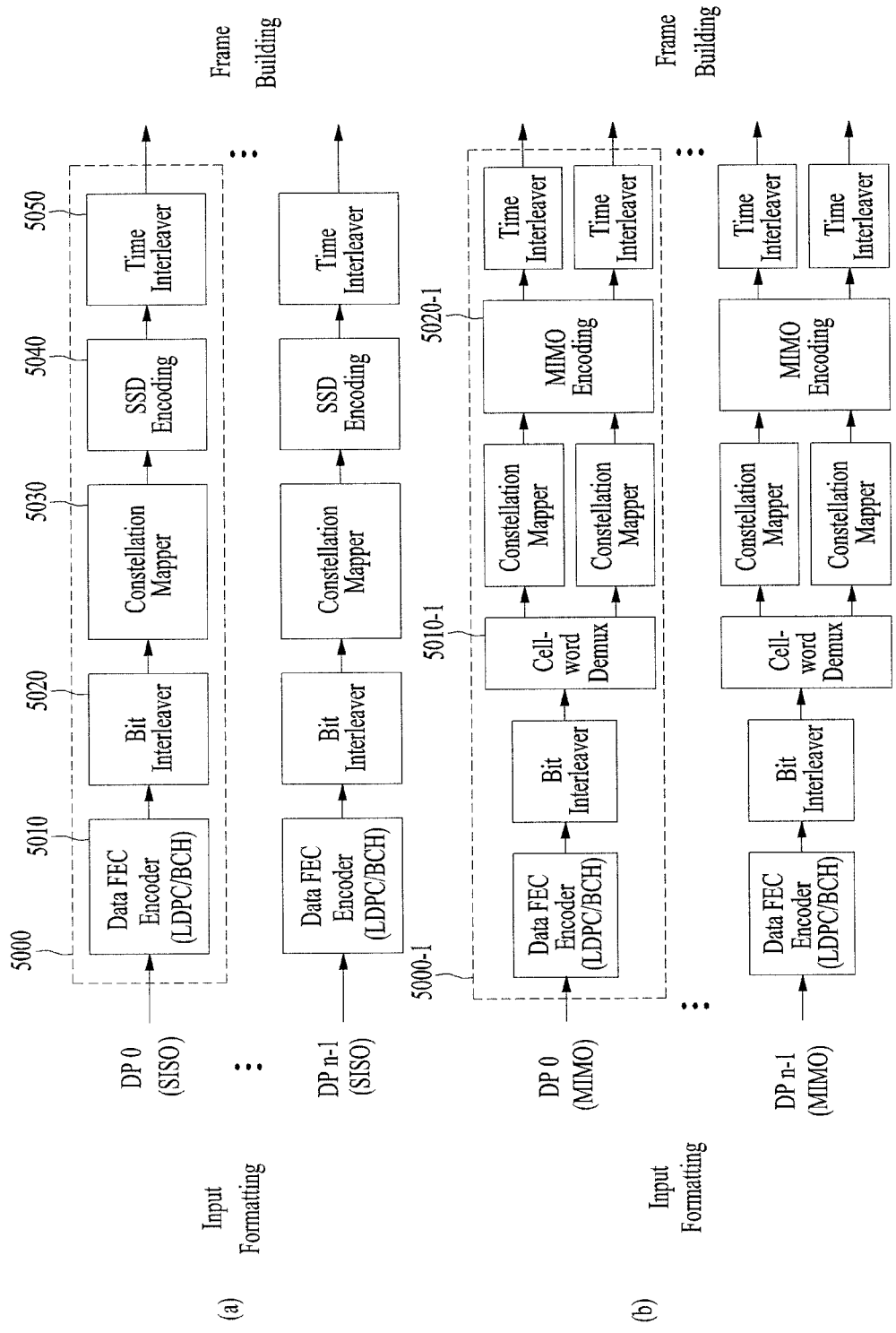
FIG. 2 illustrates a BICM block according to an embodiment of the present invention.

FIG. 2 illustrates a BICM block according to an embodiment of the present invention.

The BICM block illustrated in FIG. 2 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver.

However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

Figure 3:
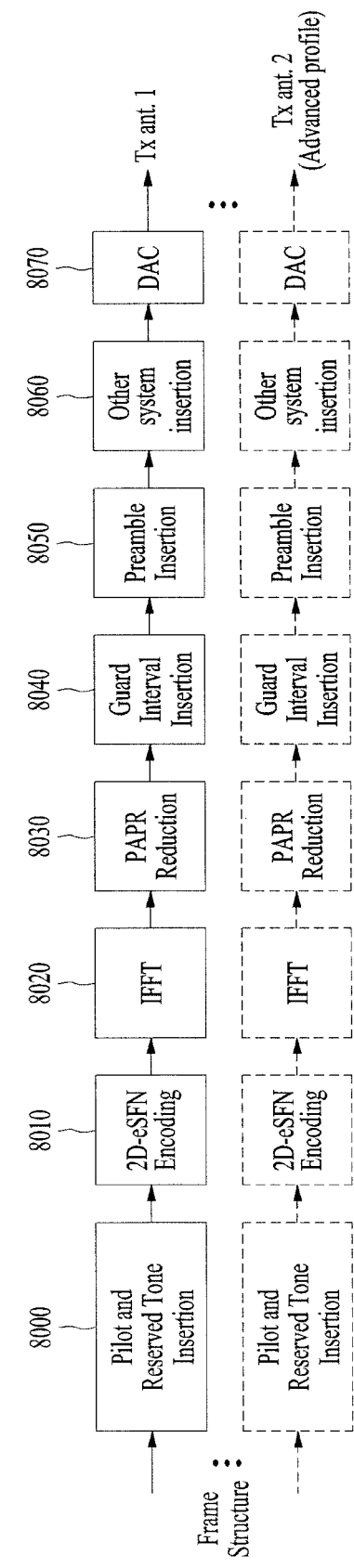
FIG. 3 illustrates an orthogonal frequency division multiplexing (OFDM) generation block according to an embodiment of the present invention.

FIG. 3 illustrates an OFDM generation block according to an embodiment of the present invention.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 3, the OFDM generation block can include a pilot and reserved tone insertion block 8000, a 2D-eSFN encoding block 8010, an IFFT (Inverse Quick Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

Figure 4:
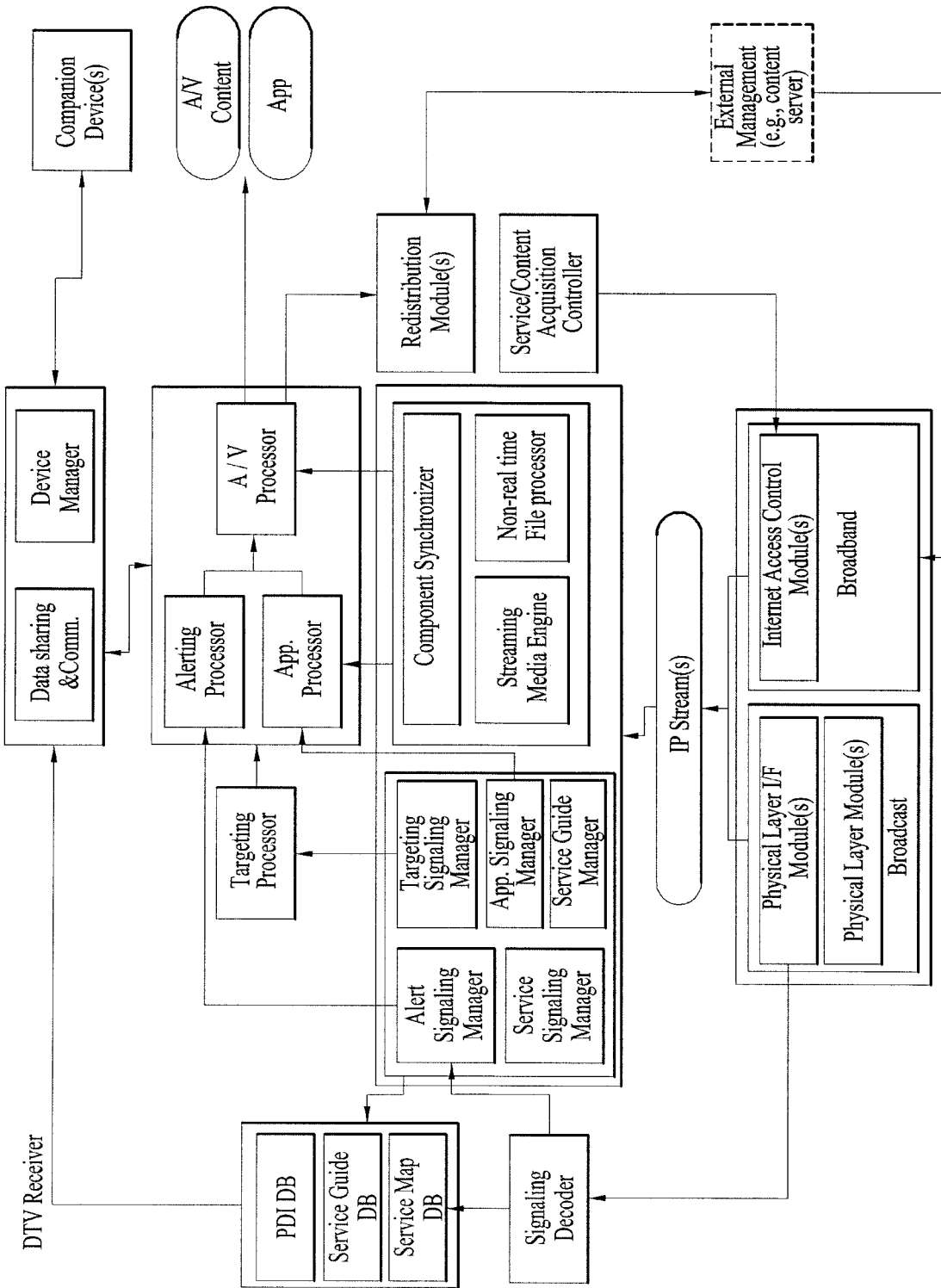
FIG. 4 illustrates a hybrid broadcast reception device according to an embodiment of the present invention.

FIG. 4 illustrates a hybrid broadcast reception device according to an embodiment of the present invention. The hybrid broadcast system may transmit a broadcast signal in conjunction with a terrestrial broadcast network and an Internet network. The hybrid broadcast reception device may receive a broadcast signal through a terrestrial broadcast network (broadcast) and an Internet network (broadband). The hybrid broadcast reception device may include a physical layer module, a physical layer I/F module, a service/content acquisition controller, an Internet access control module, a signaling decoder, a service signaling manager, a service guide manager, an App signaling manager, an alert signal manager, an alert signal parser, a targeting signal parser, a streaming media engine, a non-real-time file processor, a component synchronizer, a targeting processor, an application processor, an A/V processor, a device manager, a data sharing and communication unit, a redistribution module, a companion device and/or an external module.

The physical layer module(s) may receive and process broadcast-related signals through a terrestrial broadcast channel, convert the same into appropriate forms, and transmit the converted signals to the physical layer I/F module.

The physical layer I/F module(s) may acquire IP datagrams from the information obtained from the physical layer module. In addition, the physical layer I/F module may convert the acquired IP datagram or the like into a specific frame (for example, RS frame, GSE).

The service/content acquisition controller may perform control operations for acquiring services, content and signaling data associated therewith over a broadcast and/or broadband channel.

The Internet access control module(s) may control receiver operations to acquire services, content, and the like over a broadband channel.

The signaling decoder may decode the signaling information acquired over a broadcast channel or the like.

The service signaling manager may extract, parse, and manage signaling information related to service scan and services/content from the IP datagram and the like.

The service guide manager may extract announcement information from IP datagrams, manage an SG (Service Guide) database, and provide a service guide.

The App signaling manager may extract, parse, and manage signaling information related to application acquisition and the like from IP datagrams and the like.

The alert signal parser may extract, parse, and manage alerting related signaling information from IP datagrams and the like.

The targeting signal parser may extract, parse, and manage signaling information related to service/content personalization or targeting from IP datagrams and the like. The targeting signal parser may also deliver the parsed signaling information to the targeting processor.

The streaming media engine may extract and decode audio/video data for A/V streaming from IP datagrams and the like.

The non-real time file processor may extract, decode, and manage NRT data and file type data such as applications from IP datagrams and the like.

The component synchronizer may synchronize services and content such as streaming audio/video data and NRT data.

The targeting processor may process operations related to personalization of the service/content based on the targeting signaling data received from the targeting signal parser.

The application processor (App processor) may process application-related information, the status of a downloaded application and display parameters.

The A/V processor may perform audio/video rendering related operations based on decoded audio and video data, application data, and the like.

The device manager may perform connection and data exchange with an external device. The device manager may also perform management of external devices such as addition/deletion/update of operatively connectable external devices.

The data sharing and communication unit (Data Sharing & Comm.) may process information related to data transmission and exchange between the hybrid broadcast receiver and an external device. Here, the data that may be transmitted and exchanged may be signaling, A/V data, and the like.

The redistribution module(s) may acquire related information about the next generation broadcast service and content when the broadcast receiver cannot directly receive the terrestrial broadcast signal. The redistribution module may also support acquisition of broadcast services and content by the next generation broadcast system when the broadcast receiver cannot directly receive the terrestrial broadcast signal.

The companion device(s) may be coupled to the broadcast receiver of the present invention to share audio, video, or signaling-containing data. The companion device may refer to an external device connected to the broadcast receiver.

An external management module (External Management) may refer to a module for providing broadcast service/content, for example, a next generation broadcast service/content server. The external module may refer to an external device connected to the broadcast receiver.

Figure 5:
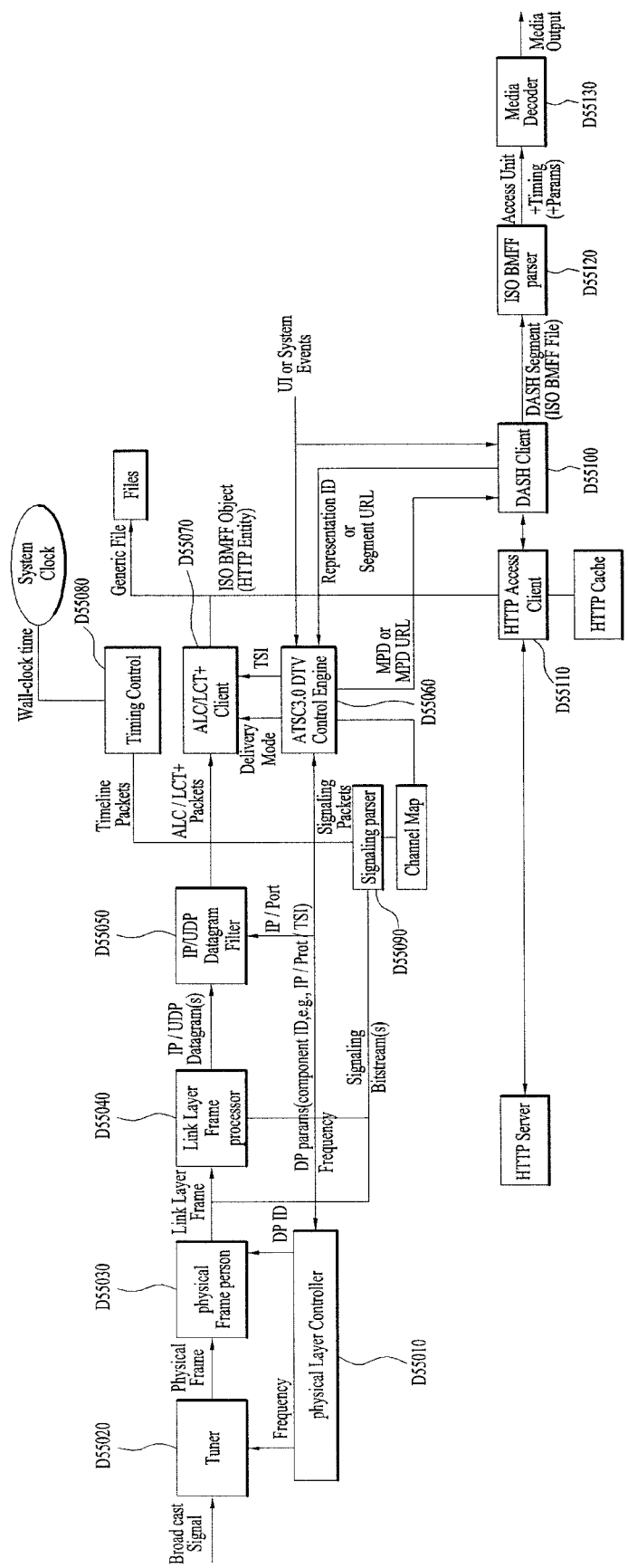
FIG. 5 is a block diagram illustrating a hybrid broadcast receiver according to an embodiment of the present invention.

FIG. 5 is a block diagram illustrating a hybrid broadcast receiver according to an embodiment of the present invention.

The hybrid broadcast receiver may receive the hybrid broadcast service through operative connection of terrestrial broadcast and broadband in the DTV service of the next generation broadcast system. The hybrid broadcast receiver may receive broadcast audio/video (A/V) content transmitted through a terrestrial broadcast and receive part of enhancement data or broadcast A/V content associated therewith in real time through broadband. In this specification, the broadcast audio/video (A/V) content may be referred to as media content.

The hybrid broadcast receiver may include a physical layer controller D55010, a tuner D55020, a physical frame parser D55030, a link layer frame parser D55040, an IP/UDP datagram filter D55050, an ATSC 3.0 DTV (Digital Television) Control Engine D55060, an ALC/LCT+ Client D55070, a timing control D55080, a signaling parser D55090, a DASH (Dynamic Adaptive Streaming over HTTP) client D55100, an HTTP access client D55110, an ISO BMFF parser D55120, and/or a media decoder D55130.

The physical layer controller D55010 may control operations of the tuner D55020, the physical frame parser D55030, and the like using radio frequency (RF) information about a terrestrial broadcast channel to be received by the hybrid broadcast receiver.

The tuner D55020 may receive and process broadcast related signals through a terrestrial broadcast channel and convert the same into an appropriate form. For example, the tuner D55020 may convert a received terrestrial broadcast signal into a physical frame.

The physical frame parser D55030 may parse the received physical frame and acquire a link layer frame through related processing.

The link layer parser D55040 may acquire link layer signaling from the link layer frame or perform related operations to acquire an IP/UDP datagram or an MPEG-2 TS. The link layer parser D55040 may output at least one IP/UDP datagram or the like.

The IP/UDP datagram filter D55050 may filter a specific IP/UDP datagram from at least one received IP/UDP datagram or the like. That is, the IP/UDP datagram filter D55050 may selectively filter an IP/UDP datagram selected by the ATSC 3.0 DTV control engine D55060 among the at least one IP/UDP datagram output from the link layer parser D55040. The IP/UDP datagram filter D55050 may output an application layer transport protocol packet such as ALC/LCT+.

The ATSC 3.0 DTV control engine D55060 may serve as an interface between modules included in each hybrid broadcast receiver. The ATSC 3.0 DTV control engine D55060 may also provide necessary parameters for each module, thereby controlling the operation of each module. In the present invention, the ATSC 3.0 DTV control engine D55060 may deliver a media presentation description (MPD) and/or an MPD URL to the DASH client D55100. In the present invention, the ATSC 3.0 digital television control engine D55060 may also deliver a delivery mode and/or a transport session identifier (TSI) to the ALC/LCT+ client D55070. Here, TSI may represent the identifier of a session for transmitting a transport packet including a signaling message such as MPD or MPD URL related signaling, for example, the identifier of a FLUTE session or an ALC/LCT+ session, which is an application layer transmission protocol. The TSI may correspond to the Asset id of MMT.

The ALC/LCT+ client D55070 may process application layer transport protocol packets such as ALC/LCT+, and collect and process a plurality of packets to create one or more ISO Base Media File Format (ISOBMFF) objects. The application layer transport protocol packets may include ALC/LCT packets, ALC/LCT+ packets, ROUTE packets, and/or MMTP packets.

The timing control D55080 may process a packet including system time information to control the system clock.

The signaling parser D55090 may acquire and parse DTV broadcast service related signaling, and generate and manage a channel map and the like based on the parsed signaling. In the present invention, the signaling parser may parse the extended MPD or MPD related information from the signaling information.

The DASH client D55100 may perform operations related to real-time streaming or adaptive streaming. The DASH client D55100 may receive DASH content from the HTTP server through the HTTP access client D55110. The DASH client D55100 may process the received DASH segment and output an ISO Base Media File Format object. In the present invention, the DASH client D55100 may deliver a Fully Qualified Representation ID or a segment URL to the ATSC 3.0 DTV control engine D55060. Here, the Fully Qualified Representation ID may refer to an ID that combines, for example, the MPD URL, period@id, and representation@id. The DASH client D55100 may also receive the MPD or MPD URL from the ATSC 3.0 DTV control engine D55060. The DASH client D55100 may receive a desired media stream or DASH segment from the HTTP server using the received MPD or MPD URL. In this specification, the DASH client D55100 may be referred to as a processor.

The HTTP access client D55110 may make a request for specific information to the HTTP server, and may receive and process a response from the HTTP server. Here, the HTTP server may process the request received from the HTTP access client and provide a response thereto.

The ISO BMFF parser D55120 may extract audio/video data from the ISO Base Media File Format object.

The media decoder D55130 may decode the received audio and/or video data and perform processing to present the decoded audio/video data.

The hybrid broadcast receiver of the present invention is required to extend or modify the MPD in order to provide the hybrid broadcast service through operative connection between the terrestrial broadcast network and the broadband. The terrestrial broadcast system may transmit the extended or modified MPD, and the hybrid broadcast receiver may receive the broadcast or broadband content using the extended or modified MPD. That is, the hybrid broadcast receiver may receive the extended or modified MPD through terrestrial broadcasting and receive content via terrestrial broadcasting or broadband based on MPD. The following describes elements and attributes that should be additionally included in the extended or modified MPD compared to the existing MPD. In the following description, the extended or modified MPD may be referred to as an MPD.

The MPD may be extended or modified to represent ATSC 3.0 services. An extended or modified MPD may additionally include MPD@anchorPresentationTime, Common@presentable, Common.Targeting, Common.TargetDevice and/or Common@associatedTo.

MPD@anchorPresentationTime may represent the presentation time anchor of segments included in the MPD, that is, a base time. Hereinafter, MPD@anchorPresentationTime may be used as an effective time of the MPD. MPD@anchorPresentationTime may represent the earliest playback point in time among the segments included in the MPD.

The MPD may further include common attributes and elements. The common attributes and elements may be applied to the AdaptionSet, Representation, SubRepresentation, and the like in the MPD. Common@presentable may indicate that the media described by MPD is a presentable component.

Common.Targeting may indicate the targeting properties and/or personalization properties of the media described by the MPD.

Common.TargetDevice may represent a target device or target devices of the media described by the MPD.

Common@associatedTo may represent an adaptationSet and/or representation associated with the media described by the MPD.

In addition, the MPD@id, Period@id, and AdaptationSet@id included in the MPD may be required to specify the media content described by the MPD. In other words, the DASH client may specify the content to be received as MPD@id, Period@id, and AdaptationSet@id based on the MPD and deliver the same to the ATSC 3.0 DTV control engine. The ATSC 3.0 DTV control engine may receive the content and deliver the same to the DASH client.

Figure 6:
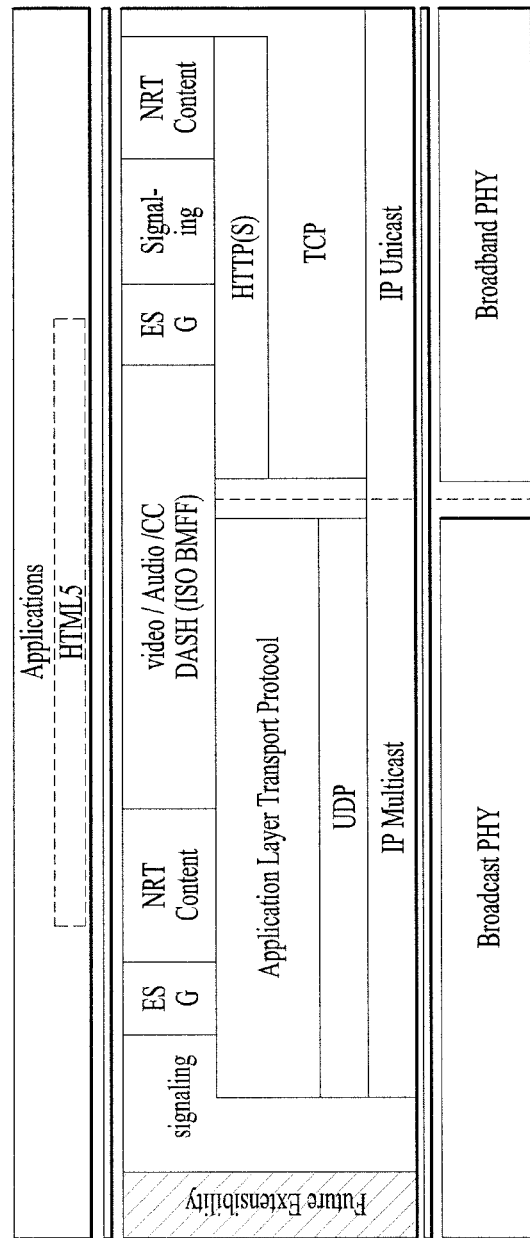
FIG. 6 shows a protocol stack of a next generation hybrid broadcast system according to an embodiment of the present invention.

FIG. 6 shows a protocol stack of a next generation hybrid broadcast system according to an embodiment of the present invention. As shown in the figure, a next generation broadcast system supporting IP-based hybrid broadcasting may encapsulate audio or video data of a broadcast service in an ISO Base Media File Format (hereinafter referred to as ISO BMFF). Here, the encapsulation may be in the form of a DASH segment or an MPU (Media Processing Unit) of MMT. In addition, the next generation broadcast system may transmit encapsulated data over the broadcast network and the Internet network equally or differently according to the properties of each transmission network. The next generation broadcast system may also transmit the encapsulated data using at least one of broadcast or broadband. In case of broadcast network, the broadcast system may transmit data encapsulated in ISO Base Media File (ISO BMFF) through an application layer transport protocol packet supporting real time object transmission. For example, the broadcast system may encapsulate the data with Real-Time Object Delivery over Unidirectional Transport (ROUTE) or MMTP transport packet. Then, the broadcast system may generate an IP/UDP datagram from the encapsulated data, and transmit the same through a broadcast signal. When broadband is used, the broadcast system may transmit the encapsulated data to the receiving side based on a streaming technique such as DASH.

In addition, the broadcast system may transmit the signaling information of the broadcast service in the following manner. In the case of a broadcast network using broadcasting, the broadcast system may transmit signaling information through the physical layer of the next generation broadcast transmission system and the broadcast network according to the attribute of the signaling. Here, the broadcast system may transmit signaling information through a specific data pipe (DP) of a transport frame included in the broadcast signal. The broadcast signaling may be encapsulated in a bit stream or an IP/UDP datagram. When using broadband, the broadcast system may return signaling data in response to the request of the receiver.

In addition, the broadcast system may transmit the ESG or NRT content of the broadcast service in the following manner. In the case of a broadcast network, the broadcast system may encapsulate ESG or NRT content in an application layer transport protocol packet, for example, Real-Time Object Delivery over Unidirectional Transport (ROUTE), MMTP transport packet, or the like. Then, the broadcast system may generate an IP/UDP datagram from the encapsulated ESG or NRT content and transmit the same through a broadcast signal. When using broadband, the broadcast system may return the ESG or NRT content in response to the request of the receiver.

The broadcast system may transmit broadcast service related information through a separate channel, for example, a Quick Information Channel (FIC), in order to enable the receiver to quickly scan the broadcast service and content within the frequency. The broadcast system may transmit information for scan and acquiring broadcast services in a transport frame. Herein, the area including the information for scan and acquisition of broadcast services may be referred to as FIC. The receiver may acquire information on the broadcast service generated and transmitted by one or more broadcast stations through the FIC, thereby making it possible to easily and quickly perform scan of the broadcast services available on the receiver.

In addition, a specific DP included in the transport frame may operate as a base DP for quickly and robustly transmitting signaling of a broadcast service and content transmitted in the corresponding transport frame. Link layer signaling or IP datagrams may be encapsulated in a specific type of generic packet and then transmitted through the DP. Here, the generic packet may include signaling data. Link (low) layer signaling may include signaling related to quick service scan/acquisition, context information of IP header compression, emergency alert, and the like.

Figure 7:
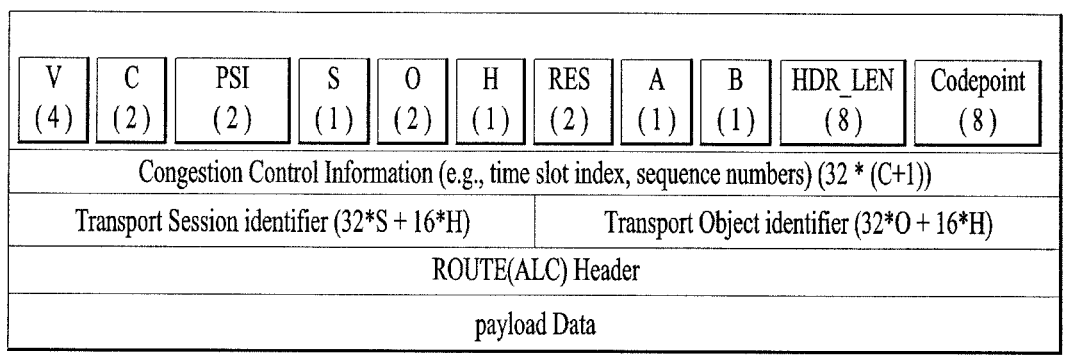
FIG. 7 is a diagram illustrating a transport packet of an application layer transmission protocol according to an embodiment of the present invention.

FIG. 7 is a diagram illustrating a transport packet of an application layer transmission protocol according to an embodiment of the present invention. The application layer transport session may be configured by a combination of an IP address and a port number. If the application layer transport protocol is Real-Time Object Delivery over Unidirectional Transport (ROUTE), the ROUTE session may consist of one or more Layered Coding Transport (LCT) sessions. For example, when one media component (e.g., a DASH Representation or the like) is transmitted through one LCT transport session, one or more media components may be multiplexed and transmitted through one application transport session. Further, one or more transport objects may be delivered through one LCT transport session, and each transport object may be a DASH segment associated with a DASH representation delivered through the transport session.

For example, if the application layer transport protocol is an LCT-based protocol, transport packets may be configured as follows. The transport packet may include an LCT header, a ROUTE header, and payload data, and a plurality of fields may be included in the transport packet.

The LCT header may include the following fields. The V (version) field may indicate the version information of the corresponding transport protocol packet. The C field may indicate a flag associated with the length of the Congestion Control Information field described below. The PSI field is protocol-specific information and may indicate information specified for the protocol. The S field may indicate a flag associated with the length of the transport session identifier (TSI) field. The O field may indicate a flag associated with the length of the transport object identifier (TOI) field. The H field may indicate whether a half-word (16 bits) is added to the length of the TSI and TOI fields. A (Close Session flag) field may indicate that the session is terminated or that termination is imminent. The B (Close Object flag) field may indicate that the object being transmitted is ending or that the end is imminent. The Code point field may indicate information related to encoding or decoding the payload of a packet. For example, the payload type may correspond to this information. The Congestion Control Information field may contain information associated with congestion control.

For example, the information associated with congestion control may be the current time slot index (CTSI), the channel number, or the packet sequence number within the channel. The Transport Session Identifier field may indicate the identifier of the transport session. The Transport Object Identifier field may represent an identifier of an object transmitted through the transport session.

The ROUTE (ALC) header may include transmission of additional information of the preceding LCT header, such as the payload identifier associated with the forward error correction scheme.

The payload data may represent the substantial data portion of the payload of the packet.

FIG. 8 illustrates a method of transmitting signaling data in a next generation broadcast system according to an embodiment of the present invention. The signaling data of the next generation broadcast system may be transmitted as shown in the figure. In order to support quick service/content scan and acquisition by the receiver, the next generation broadcast transmission system may deliver signaling data for a broadcast service delivered by a corresponding physical layer frame through a Fast Information Channel (FIC). In the present specification, FIC may mean information on a service list. If there is no separate FIC, the signaling data may be transmitted through the path along which the link layer signaling is delivered. In other words, signaling information including a service and information on components (audio, video, etc.) in the service may be encapsulated and transmitted in IP/UDP datagrams through one or more DPs in the physical layer frame. According to an embodiment, the signaling information on a service and service components may be encapsulated and transmitted in an application layer transport packet (e.g., ROUTE packet or MMTP packet).

The upper part of FIG. 8 shows an embodiment in which the above-described signaling data is transmitted via FIC and one or more DPs. Signaling data for supporting rapid service scan/acquisition may be transmitted through FIC, and signaling data including detailed information about services and the like may be encapsulated in an IP datagram and transmitted through a specific DP. In the present specification, the signaling data including detailed information on services and the like may be referred to as service layer signaling.

The middle part of FIG. 8 shows an embodiment in which the above-described signaling data is transmitted through the FIC and one or more DPs. Signaling data for supporting rapid service scan/acquisition may be transmitted through FIC, and signaling data including detailed information about services and the like may be encapsulated in an IP datagram and transmitted through a specific DP. In addition, a portion of the signaling data, including information about a specific component included in the service may be transmitted through one or more transport sessions in the application layer transmission protocol. For example, a portion of the signaling data may be delivered over one or more transport sessions within a ROUTE session.

The lower part of FIG. 8 shows an embodiment in which the above-described signaling data is transmitted through the FIC and one or more DPs. Signaling data for supporting rapid service scan/acquisition may be transmitted through FIC, and signaling data containing detailed information about the service may be transmitted through one or more transport sessions in the ROUTE session.

FIG. 9 shows signaling data transmitted by a next generation broadcast system according to an embodiment of the present invention for rapid broadcast service scan of a receiver. The present specification proposes signaling information used for a next generation broadcast reception device to scan and acquire a broadcast service. In the next generation broadcast system, broadcast services and content generated by one or more broadcast stations within a specific frequency may be transmitted. The receiver may use the above-described signaling information to rapidly and easily scan broadcast stations existing within the frequency and the service/content of the corresponding broadcast stations. This may be represented by syntax as shown in the figure or may be represented in other formats such as XML.

Signaling information for rapid service scan and acquisition may be delivered over a rapid information channel (FIC), which is a separate channel in the physical layer transport frame. In addition, the signaling information may be transmitted through a common DP, which may transmit information that may be shared among the data pipes of the physical layer. Also, In addition, the signaling information may be transmitted through a path along which the signaling of the link layer is transmitted. The above-described signaling information may be encapsulated in an IP datagram and transmitted through a specific DP. The signaling information may be transmitted through a service signaling channel through which service signaling is delivered, or a transport session of the application layer.

The signaling information (FIC information) for rapid service scan and acquisition may include at least one of the following fields. Herein, the FIC information may be referred to as service acquisition information. The FIC_protocol_version field may indicate the protocol version of the FIC signaling information (version of the structure of FIC). The TSID field may indicate an identifier of the overall broadcast stream. The FIC_data_version field may indicate the data version of the FIC instance. The FIC_data_version field may be incremented if there is a change in the content of the FIC. The num_partitions field may represent the number of partitions in the broadcast stream. It is assumed that each broadcast stream can be transmitted in one or more partitions in order for the num_partitions field to be used. Each partition may contain a plurality of DPs by one broadcaster. Each partition may represent a portion of the broadcast stream used by one broadcaster. The partition_protocol_version field may indicate the version of the partition structure described above. The base_DP_ID field may indicate an identifier for the base DP of the partition. The base DP may include a service signaling table. The service signaling table may include a list of all services in the partition. That is, the service signaling table may list the services to be transmitted. Default properties for each service may also be defined. The base DP may be a robust DP within the partition and may contain other signaling tables for the partition. The base_DP_version field may indicate version information indicating a change in data transmitted through the base DP. For example, in transmitting service signaling or the like through the base DP, the base_DP_version field may be incremented by 1 when a change in service signaling occurs. The num_services field may indicate the number of at least one service belonging to the partition. The service_id field may indicate an identifier for the service. The channel_number field may indicate the channel number associated with the service. The service_category field may indicate a category of the corresponding service and may indicate, for example, A/V, audio, ESG, CoD, or the like. The short_service_name_length field may indicate the length of the name representing the service. The short_Service_name field may indicate a name representing the service. The service_status field may indicate the status of the service and may indicate an active or suspended, hidden or shown attribute depending on the value thereof. The service_distribution field may have attributes similar to the "multi-ensemble" flag of the ATSC M/H document. For example, the service_distribution field may indicate information about whether the service is included in the partition, whether the service is partially included in the partition but is presentable with the partition, whether another partition is required for presentation, or whether another broadcast stream is required for presentation. The sp_indicator field is a service protection flag that may indicate whether one or more components needed for the presentation are protected.

FIG. 10 shows signaling data transmitted by a next generation broadcast system according to an embodiment of the present invention for rapid broadcast service scan of a receiver. FIC information (service acquisition information) to support rapid broadcast service scan and service/component acquisition may include information about an application layer transport session carrying service and component data. As shown in the figure, the FIC information may be expressed in binary format, but may be represented in other formats such as XML according to an embodiment. The FIC information may include the fields as shown in the figure. Description of fields which have been explained is omitted. The contents described with reference to FIG. 9 can be applied to the present description within a compatible range. The partition_id field may indicate the identifier of the partition. The partition_protocol_version field may indicate the version of the partition structure described above. The num_services field may indicate the number of at least one component belonging to the partition. The service_id field may indicate an identifier for the service. The service_data_version field may indicate a change in service loop data in the FIC or a change in service signaling data associated with the service. The service_data_version field may be incremented by 1 each time a change occurs in the included service data. The receiver may use the service_data_version field to detect a change in the service loop data of the FIC or a change in the signaling associated with the service. The channel_number field may indicate the channel number associated with the service. The service_category field may indicate a category of the corresponding service and may indicate, for example, A/V, audio, ESG, CoD, or the like. The short_service_name_length field may indicate the length of the name representing the service. The short_service_name field may indicate a name representing the service. The service_status field may indicate the status of the service and may indicate an active or suspended, hidden or shown attribute depending on the value thereof. The service_distribution field may have attributes similar to the "multi-ensemble" flag of the ATSC M/H document. The IP_version_flag field may indicate the format of the IP address that follows. If the value of the field is 0, it indicates that IPv4 format is used, and if 1, it indicates that IPv6 address format is used. The source_IP_address_flag field may indicate whether source_IP_addr is included. If the value of this field is 1, it indicates that source_IP_addr exists. The num_transport_session field may indicate the number of transport sessions (for example, ROUTE or MMTP sessions) for transmitting component data of the corresponding service in the broadcast stream. The source_IP_addr field may indicate the source IP address of the IP datagram including the component data of the corresponding service when the value of the source_IP_address_flag is 1. The dest_IP_addr field may indicate the destination IP address of the IP datagram including the component data of the corresponding service. The dest_UDP_port field may indicate the UDP port number of the UDP datagram that contains the component data of the corresponding service. The LSID_DP field may represent a data pipe identifier of the physical layer carrying signaling including detailed information about the transport session. Here, the signaling including the detailed information about the transport session may be, for example, an LCT session instance description including information on the detailed LCT transport session of each ROUTE session in the case of ROUTE. The service_signaling_flag field may indicate whether the transport session transmits service signaling. When the value of service_signaling_flag is 1, it may indicate that the data transmitted through the corresponding transport session (for example, ROUTE or MMTP session) includes service signaling. The Transport session descriptors field may contain descriptors at the transport session level. Each descriptor is extensible, and each descriptor may include a num_descriptors field. Each descriptor may include as many descriptor loops as the value indicated by the num_descriptors field. The Transport session descriptors field may contain descriptors at the transport session level. The service descriptors field may include service level descriptors. The Partition descriptors field may include a partition level descriptor, and one partition may indicate a part of a broadcast stream used by one broadcaster or the like. The FIC session descriptors field may contain FIC level descriptors. According to an embodiment, each of the fields included in the FIC described above may be included in a table other than the FIC and transmitted together with a broadcast signal.

Figure 11:
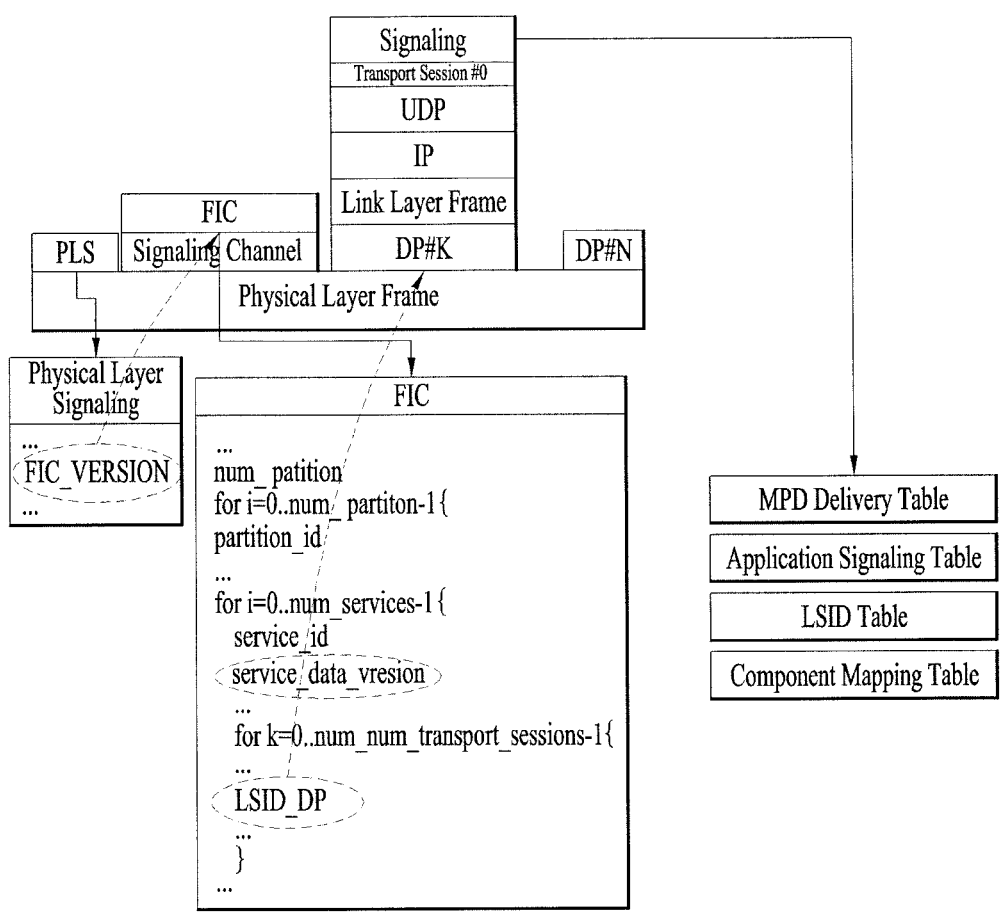
FIG. 11 illustrates a method of signaling a location of service layer signaling through FIC as signaling for rapid service scan and acquisition to acquire service layer signaling from the corresponding location according to an embodiment of the present invention.

FIG. 11 illustrates a method for transmitting FIC-based signaling according to an embodiment of the present invention. The above-mentioned FIC-based signaling may be delivered as shown in the figure. The FIC-based signaling may be referred to as service acquisition information or service acquisition signaling. As shown in the figure, the physical layer signaling may include a field for service acquisition information. The field for the service acquisition information may inform the receiver of whether the service acquisition information (FIC) is parsed. The receiver may parse the service acquisition information and check whether the data of the service signaling is changed through the service_data_version information. When the service signaling data is changed, the broadcast signal receiver may check the data pipe identifier of the physical layer that carries signaling including detailed information on the transport session, using the LSID DP field. The broadcast receiver may verify the details of the transport session by parsing the DP indicated by the corresponding DP identifier. That is, the signaling method of the next generation broadcast system includes a procedure of signaling whether the physical layer signaling parses the service acquisition information, and the service acquisition information signals the location of the detailed information about the transport session to check the detailed information about the transport session. Here, the detailed information about the transport session may include an MPD transport table, an application signaling table, a transport session descriptor (LSID), and/or a component mapping table (CMT).

FIG. 12 shows signaling data transmitted by a next generation broadcast system according to an embodiment of the present invention for rapid broadcast service scan of a receiver. FIC information (service acquisition information) to support rapid broadcast service scan and service/component acquisition may include information about an application layer transport session carrying service and component data. As shown in the figure, the FIC information may be expressed in binary format, but may be represented in other formats such as XML according to an embodiment. The FIC information may include the fields as shown in the figure. Description of fields which have been explained is omitted. The contents described with reference to FIG. 9 or FIG. 10 can be applied to the present description within a compatible range. The service_signaling_flag field may indicate whether the transport session transmits service signaling. If the value of the service_signaling_flag value is 1, it may indicate that there is a DP including service signaling. The signaling_data_version field may indicate a change in the associated service signaling data. Each time the service signaling data changes, the field may be incremented by 1. The receiver may use the signaling_data_version field to detect changes in the signaling associated with the service. The signaling_DP field may indicate the data pipe identifier of the physical layer carrying the service signaling. The Transport session descriptors field may contain descriptors at the transport session level. Each descriptor is extensible, and each descriptor may include a num_descriptors field. Each descriptor may include as many descriptor loops as the value indicated by the num_descriptors field. The Transport session descriptors field may contain descriptors at the transport session level. The service descriptors field may include service level descriptors. The Partition descriptors field may include a partition level descriptor, and one partition may indicate a part of a broadcast stream used by one broadcaster or the like. The FIC session descriptors field may contain FIC level descriptors. According to an embodiment, each of the fields included in the FIC described above may be included in a table other than the FIC and transmitted together with a broadcast signal.

Figure 13:
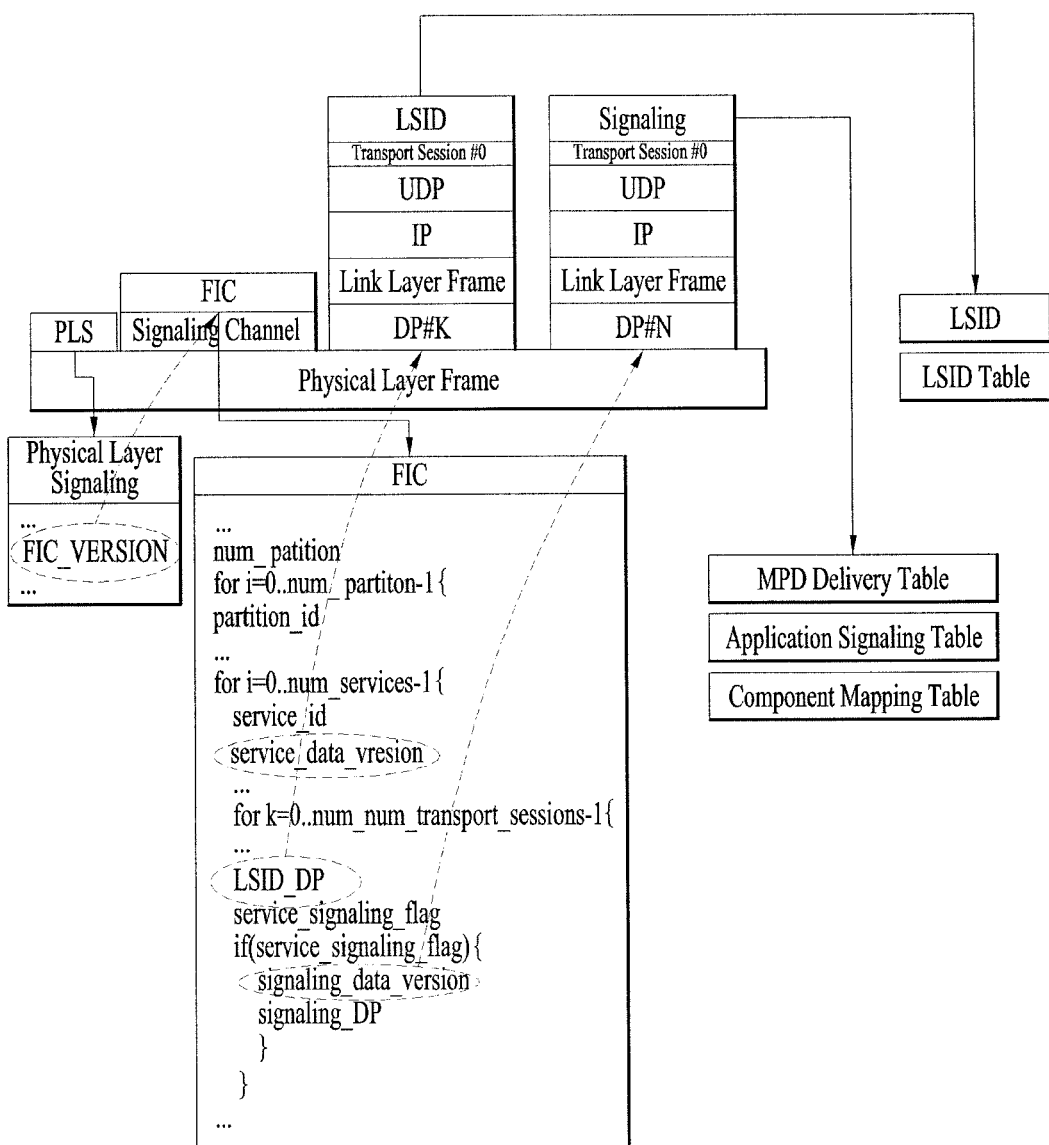
FIG. 13 illustrates a method of signaling a location of service layer signaling through FIC as signaling for rapid service scan and acquisition to acquire service layer signaling from the corresponding location according to another embodiment of the present invention.

FIG. 13 illustrates a method for transmitting FIC-based signaling according to another embodiment of the present invention. The above-mentioned FIC-based signaling may be delivered as shown in the figure. The FIC-based signaling may be referred to as service acquisition information or service acquisition signaling. As shown in the figure, the physical layer signaling may include a field for service acquisition information. The field for the service acquisition information may inform the receiver of whether the service acquisition information (FIC) is parsed. The receiver parses the service acquisition information and may check whether the data of the service signaling is changed through the service_data_version information. When the service signaling data is changed, the broadcast signal receiver may acquire the LSID or LSID Table including detailed information on the transport session using the LSID_DP field through the DP identified from the LSID_DP field. In addition, the receiver may recognize change of the signaling data using information such as service_signaling_flag, signaling_data_version, signaling_DP, etc., and acquire the signaling data through the DP identified from the signaling_DP.

That is, the signaling method of the next generation broadcast system includes a procedure of signaling whether the physical layer signaling parses the service acquisition information, and the service acquisition information signals the location of the detailed information about the transport session to check the detailed information about the transport session. Here, the detailed information about the transport session may include an MPD transport table, an application signaling table, a transport session descriptor (LSID), and/or a component mapping table (CMT), and each detail of the transmission session may be delivered by different examples.

FIG. 14 shows a description of a transmission session instance of a next generation broadcast system according to an embodiment of the present invention. When the application layer transmission method is Real-Time Object Delivery over Unidirectional Transport (ROUTE), a ROUTE session may include one or more Layered Coding Transport (LCT) sessions. The details of one or more transport sessions may be signaled through a transport session instance description. The transport session instance descriptor may be referred to as LCT Session Instance Description (LSID) if it is ROUTE. In particular, the transport session instance description may define what is delivered by each LCT transport session constituting the ROUTE session. Each transport session may be uniquely identified by the Transport Session Identifier (TSI). The transport session identifier may be included in the LCT header. The transport session instance description may describe all transport sessions that are transmitted through the session. For example, the LSID may describe a mode LCT session carried by a ROUTE session. The transport session instance description may be delivered through the same ROUTE session as the transport sessions, or may be delivered through different ROUTE sessions or unicast.

When delivered in the same ROUTE session, the transport session instance description may be transmitted in the transport session with a specified transport session identifier (TSI) 0. Other objects referenced in the transport session instance description may also be delivered with TSI=0, but may have a TOI value different from the transport session instance description. Alternatively, it may be delivered in a separate session with TSI≠0. The transport session instance description may be updated using at least one of the version number, validity information, and expiration information. The transport session instance description may be represented in a bitstream or the like in addition to the illustrated format.

The transport session instance description may include a version attribute, a validFrom attribute, an expiration attribute, and may include TSI attributes and SourceFlow and RepairFlow information for each transport session. The version attribute may indicate the version information about the corresponding transport session instance description, and the version information may be incremented each time the content is updated. The transfer session instance description with the highest version number may indicate the most recent valid version. The validFrom attribute may indicate when the transfer session instance description begins to be valid. The validFrom attribute may not be included in the transport session instance description according to an embodiment. This indicates that the transport session instance description is valid immediately upon receiving the description. The expiration attribute may indicate when the transfer session instance description expires. The expiration attribute may not be included in the transport session instance description according to the embodiment. This indicates that the transport session instance description is continuously valid. If a transport session instance description with an expiration attribute is received, expiration may conform to the expiration attribute. The TSI attribute may indicate a transport session identifier, and the SourceFlow element provides information about the source flow to be transmitted to the TSI, the details of which will be described below. The RepairFlow element may provide information about the repair flow sent to the corresponding TSI.

FIG. 15 shows a SourceFlow element of a next generation broadcast system according to an embodiment of the present invention. The source flow element may include an EFDT element, an idRef attribute, a realtime attribute, a minBufferSize attribute, an Application Identifier element, and a PayloadFormat element. The EFDT element may include detailed information of the file delivery data. An EFDT may indicate an extended File Delivery Table (FDT) instance, described in more detail below. The idRef attribute may indicate the identifier of the EFDT and may be represented as a URI by the corresponding transport session. The realtime attribute may indicate that the corresponding LCT packets include an extension header. The extension header may include a timestamp indicating the presentation time of the delivery object. The minBufferSize attribute may define the maximum amount of data needed to be stored in the receiver. The Application Identifier element may provide additional information that may be mapped to an application carried by that transport session. For example, the Representation ID of the DASH content or the Adaptation Set parameter of the DASH representation for selecting a transport session for rendering may be provided as additional information. The PayloadFormat element may define the payload format of a ROUTE packet carrying an object of the source flow. The PayloadFormat element may include a codePoint attribute, a deliveryObjectFormat attribute, a fragmentation attribute, a deliveryOrder attribute, a sourceFecPayloadID attribute, and/or a FECParameters element. The codePoint attribute may define the structure of the packet with the code point value used in the payload. This may indicate the value of the CP field in the LCT header. The deliveryObjectFormat attribute may indicate the payload format of the delivery object. The fragmentation attribute may define fragmentation rules when an object to be transmitted is divided into one or more transport packets. The deliveryOrder attribute may indicate the order of transmission of the content of each transport packet carrying one transport object. The sourceFecPayloadID attribute may define the format of the source FEC payload identifier. The FECParameters element may define FEC parameters. This may include FEC encoding id and instance id.

FIG. 16 shows an EFDT of a next generation broadcast system according to an embodiment of the present invention. The EFDT may include detailed information of the file delivery data. The EFDT may include an idRef attribute, a version attribute, a maxExpiresDelta attribute, a maxTransportSize attribute, and a FileTemplate element. The idRef attribute may indicate the identifier of the EFDT. The version attribute may indicate the version of the EFDT instance descriptor. This attribute may be incremented by 1 when EFDT is updated. It may indicate that the EFDT having the highest version number among the received EFDTs is the currently valid version. The maxExpiresDelta attribute may indicate the maximum expiry time of the object after the first packet associated with the object is sent. The maxTransportSize attribute may indicate the maximum transmission size of the object described by the EFDT. For the FileTemplate element, the file URL or file template of the body part may be specified.

The transport session instance descriptor (LSID) element may be transmitted by the Transport Session Instance Descriptor Table (LSID Table) at the bottom of the figure. The LSID table may be transmitted by the above-described signaling message, which may be divided into a signaling message header and a signaling message data part. The signaling message data part may include a transport session instance descriptor (LSID) or a part thereof. The signaling message data may include a Transport Session Instance Descriptor (LSID) Table and may include the following fields. The Signaling_id field may indicate identifier information indicating that the signaling table includes a transport session instance descriptor (LSID). The protocol_version field may indicate a protocol version of the signaling, such as a signaling syntax that includes a transport session instance descriptor (LSID). The Signaling_version field may indicate a change in signaling data, including a transport session instance descriptor (LSID). In addition, the transport session instance descriptor table may further include the content of the LSID element described above.

Figure 17:
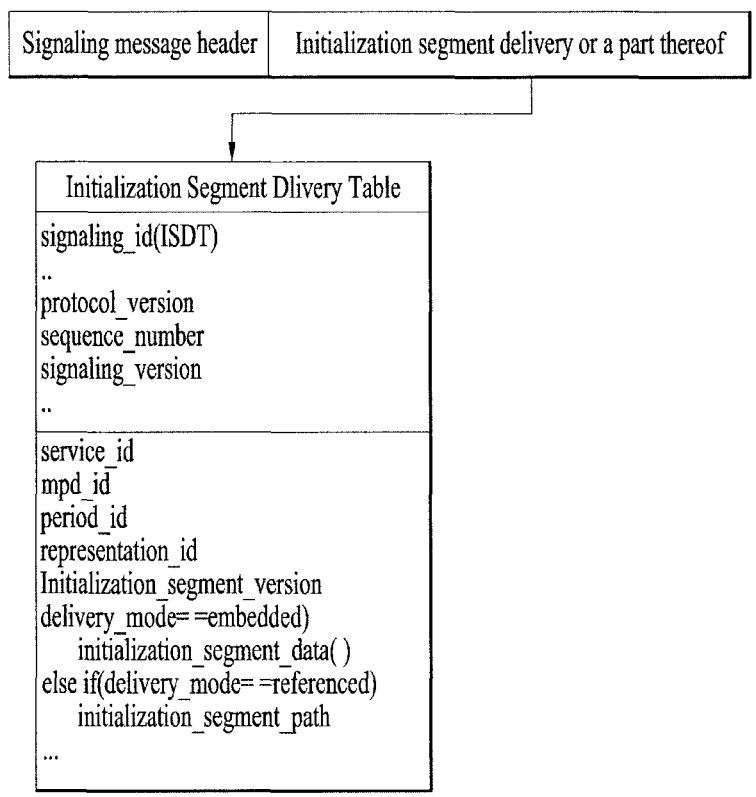
FIG. 17 shows a method for transmitting an ISDT used by a next generation broadcast system according to an embodiment of the present invention.

FIG. 17 shows a method for transmitting an ISDT used by a next generation broadcast system according to an embodiment of the present invention. The next generation broadcast system may transmit signaling information for the initialization segment of the DASH Representation associated with the component in the broadcast service by transmitting the Initialization Segment Delivery Table (ISDT). A signaling message for the initialization segment of a DASH Representation associated with a component in a broadcast service may include a header and data. The signaling message header may conform to the above-described format, and the signaling message data may include initialization segment delivery information or a part thereof. The initialization segment delivery information may include the following information. The Signaling_id information may identify the initialization segment or a signaling message including path information. The protocol_version information may indicate the protocol version of the initialization segment delivery table, such as the syntax of the corresponding signaling message. The Sequence_number information may indicate the identifier for an instance of the initialization segment delivery table. The Signaling_version information may indicate a change in the signaling data of the initialization segment delivery table. The Service_id information may identify the service associated with the component. The Mpd_id information may indicate an associated DASH MPD identifier associated with the component. The period_id information may indicate an associated DASH Period identifier associated with the component. The representation_id information may indicate a DASH representation identifier associated with the component. The initialization_segment_version information may be version information indicating a change of the corresponding MPD or the like. The Delivery_mode information may indicate information about whether the initialization segment is included or is transmitted through another route. Initialization_segment_data( ) information may contain the initialization segment data itself. The initialization segment path information may include information on a path for acquiring an initialization segment, such as a URL for an initialization segment. Through the ISDT, the receiver may receive information about the Initialization segment of the DASH Representation associated with the component.

FIG. 18 shows a delivery structure of a signaling message of a next generation broadcast system according to an embodiment of the present invention. The above signaling data may be communicated as shown in the figure if it is sent based on an application layer transport, for example, ROUTE. That is, a part signaling may be transmitted through a fast information channel in order to support rapid service scan. And a part of the signaling may be transmitted over a specific transport session and may also be delivered mixed with the component data.

The signaling information for supporting the rapid service scan and acquisition may be received on a channel separate from the transport session. Here, the separate channel may mean a separate data pipe (DP). Further, detailed information about the service may be received through a separately designated transport session. The transport session may have a value of TSI=0. The information delivered through the transport session designated herein may include an MPD delivery table, an application signaling table, a transport session instance description table, and/or a component mapping table. In addition, a part of signaling information may be delivered in the transport session along with the component data. For example, an initialization segment delivery table may be delivered with the component data.

The lower part of the figure shows an embodiment of acquiring a broadcast service in a next generation broadcast network. The receiver may tune the broadcast and acquire and parse information for rapid service scanning and acquisition when the service is selected. The location of the service layer signaling or transport session instance description (e.g., LSID) is then determined from the information for rapid service scan and acquisition to acquire and parse the description. In addition, the receiver may identify the transport session including the signaling, from which it may acquire and parse the signaling table, and determine a desired component. Through this process, the desired component may be presented. That is, the broadcast service may be provided to the user by acquiring information about the transport session from the information for rapid service scan and acquisition, checking the position of the desired component from the information about the transport session, and reproducing the component.

FIG. 19 illustrates signaling data transmitted for rapidly scanning a broadcast service of a receiver of a next-generation broadcast system according to an embodiment of the present invention. FIC information (service acquisition information) for supporting rapid broadcast service scan and service/component acquisition may include information on an application layer transport session for transferring service and component data. As illustrated in the drawing, the FTC information may be represented in a binary format but, in some embodiments, may be represented in a different format such as XML. The FIC information may include the fields as shown in the figure. Description of fields which have been explained is omitted. The contents described with reference to FIG. 9, FIG. 10 or FIG. 12 can be applied to the present description within a compatible range. An LSID_tsi field may indicate an identifier of a transfer session for transmitting a transfer session instance description as signaling including detailed information on a transfer session. Here, the session instance description may be LSID in the case of an LCT transfer session. Service signaling associated with a corresponding service may be transmitted through a transfer session for transmitting transfer session instance description. A service_signaling_flag field may indicate whether the transfer session transmits service signaling. When a value of the service_signaling_flag is 1, this may indicate that a DP including service signaling is present. A signaling_data_version field may indicate change in the associated service signaling data. Whenever service signaling data is changed, a corresponding field may be incremented by 1. The receiver may detect change in signaling associated with a corresponding service using the signaling_data_version field. A signaling DP field may indicate an identifier of a data pipe of a physical layer for transmitting service signaling. A signaling_tsi field may indicate an identifier of a transfer session for transmitting service signaling. A Transport session descriptors field may indicate a transfer session level of descriptors. Each descriptor is capable of being extended and may include a num_descriptors field. Each descriptor may include descriptor loops, the number of which corresponds to the number indicated by the num_descriptors field. A transport session descriptors field may include a transfer session level of descriptors. A service descriptors field may include a service level of descriptors, A partition descriptors field may include a partition level of descriptor and one partition may indicate a portion of a broadcast stream used by one broadcaster or the like. An FIC session descriptors field may include an FIC level of descriptors. In some embodiments, each field included in the aforementioned FIC may be included in another table other than the FIC and transmitted along with a broadcast signal.

FIG. 20 illustrates signaling data transmitted for rapidly scanning a broadcast service of a receiver of a next-generation broadcast system according to an embodiment of the present invention. FTC information (service acquisition information) for supporting rapid broadcast service scan and service/component acquisition may include information on an application layer transport session for transferring service and component data. As illustrated in the drawing, the FIC information may be represented in a binary format but, in some embodiments, may be represented in a different format such as XML. The FIC information may include the fields as shown in the figure. Description of fields which have been explained is omitted. The contents described with reference to FIG. 9, FIG. 10, FIG. 12 or FIG. 19 can be applied to the present description within a compatible range. A num_services field may indicate the number of at least one component belonging to a corresponding partition. Each service may include a plurality of signaling tables. For example, each service may include DASH MPD including information on components and segments thereof, CMT including an identifier of components included in a broadband stream and other broadcast streams, AST as an application signaling table, and a URL signaling table (UST) including at least one URL among MPD, CMT, and AST. These signaling tables may be included in a signaling channel of a corresponding service. A service_id field may indicate an identifier of a service. A service_data_version field may indicate change in service loop data in FIC. A service_data_version field may be incremented by 1 whenever included service data is changed. For example, whenever FIC, MPD, CMT, AST, or UST is changed, the field may be incremented by 1. The receiver may detect change in data of a service loop of FIC or change in signaling associated with a corresponding service using the service_data_version field. A component_signaling_flag field may indicate whether the transfer session transmits service signaling. When a value of the component_signaling_flag is 1, this may indicate that the field includes service signaling (e.g., DASH media presentation description (MPD) or CMT) of data transmitted through a corresponding transfer session. Here, the CMT may be a component mapping table and may include an identifier of components transmitted through a broadband and also include information on a component included in a broadcast stream. Each service may include a service signaling channel and the service signaling channel may include MPD, CMT, AST, and/or UST. A service signaling channel may be one signaling channel of a plurality of ROUTE sessions for a service and whether the service signaling channel is present may be indicated through a component signaling flag. When a plurality of transfer sessions (ROUTE or MMTP session) transmits signaling and service components, the aforementioned service signaling tables may be transmitted in one transfer session.

A ROUTE session descriptors field may include a transfer session level of descriptors. Each descriptor is capable of being extended and may include a num_descriptors field. Each descriptor may include descriptor loops, the number of which corresponds to the number indicated by the num_descriptors field. A transport session descriptors field may include a transfer session level of descriptors. A service descriptors field may include a service level of descriptors. A partition descriptors field may include a partition level of a descriptor and one partition may indicate a portion of a broadcast stream used by one broadcaster or the like. An FIC descriptors field may include an FIC level of descriptors.

In some embodiments, each field included in the aforementioned FIC may be included in another table other than FIC and transmitted along with a broadcast signal.

FIG. 21 illustrates a component mapping table description according to an embodiment of the present invention. The component mapping table description may signal information on a transmission path of a component included in a broadcast service in a next-generation broadcast system. This may be represented in XML format, binary bitstream, or the like. The component mapping table description may include the following elements and attributes. A service_id attribute may indicate an identifier of a service associated with a component. A BroadcastComp may indicate one or more components transmitted through the same broadcast stream. The BroadcastComp may include at least one of mpdID, perID, reptnID, baseURL, and/or datapipeID. The mpdID attribute may indicate a DASH MPD identifier associated with BroadcastComp. The perID attribute may indicate an associated period identifier in a corresponding MPD. The reptnID attribute may indicate an identifier of a DASH Representation associated with a corresponding component. The baseURL attribute may indicate Base URI, of Segments constituting a DASH Representation associated with a corresponding component. The datapipeID attribute may indicate an identifier of a data pipe for transmitting corresponding component data in a broadcast stream.

The BBComp may indicate one or more components transmitted through a broadband network. The BBComp may include at least of mpdID, reptnID, and/or baseURL. The mpdID attribute may indicate an identifier of DASH MPD associated with the BBComp. The perID attribute may indicate an associated period identifier in a corresponding MPD. The reptnID attribute may indicate an identifier of a DASH Representation associated with a corresponding component. The baseURL attribute may indicate Base URL of segments constituting a DASH Representation associated with a corresponding component.

The ForeignComp may indicate one or more components transmitted through another broadcast stream. The ForeignComp may include at least one of mpdID, perID, reptnID, baseURL, transportStreamID, sourceIPAddr, destIPAddr, destUDPPort, and/or datapipeID. The mpdID attribute may indicate an identifier of DASH MPD associated with the ForeignComp. The perID attribute may indicate an associated period identifier in a corresponding MPD. The reptnID attribute may indicate an identifier of a DASH Representation associated with a corresponding component. The baseURL attribute may indicate a Base URL of segments constituting a DASH Representation associated with a corresponding component. The transportStreamID attribute may indicate an identifier of a broadcast stream including corresponding component data. The sourceIPAddr attribute may indicate a source IP address of an IP datagram including corresponding component data. The destIPAddr attribute may indicate a destination IP address of an IP datagram including corresponding component data. The destUDPPort attribute may indicate a destination UDP port number of an IP datagram including corresponding component data. The datapipeID attribute may indicate an identifier of a data pipe for transmitting corresponding component data in a corresponding broadcast stream. The aforementioned sourceIPAddrattribute, destIPAddr attribute, destUDPPort attribute, and datapipeID attribute may be optional attributes and may be selectively included in CMT in some embodiments. The above Component Mapping Description may be encapsulated and transmitted in one XML file or the above proposed signaling message format. As illustrated in the lower part, the signaling message header may follow the aforementioned form and include component mapping description or a part thereof in a service message part. The CMT may define components associated with each service and a location or a path for receiving information related to corresponding components may be signaled to the receiver through the above information.

FIG. 22 illustrates component mapping table description according to an embodiment of the present invention. The component mapping table description may signal information on a transmission path of a component included in a broadcast service in a next-generation broadcast system. This may be represented as a bitstream such as an XML or binary form. The component mapping table description may include the following element and attribute. A service_id attribute may indicate an identifier of a service associated with a component. A BroadcastComp may indicate one or more components transmitted through the same broadcast stream. The BroadcastComp may include at least one of mpdID, perID, reptnID, baseURL, tsi, and/or datapipeID. The mpdID attribute may indicate an identifier of DASH MPD associated with BroadcastComp. The perID attribute may indicate an associated period identifier in a corresponding MPD. The reptnID attribute may indicate an identifier of a DASH Representation associated with a corresponding component. The baseURL attribute may indicate a Base URL of segments included in a DASH Representation associated with a corresponding component. A tsi attribute may indicate an identifier of a transfer session for transmitting corresponding component data in a broadcast stream. A datapipeID attribute may indicate an identifier of a data pipe for transmitting corresponding component data in a broadcast stream.

The BBComp may indicate one or more components transmitted through a broadband network. The BBComp may include at least one of mpdID, reptnID, and/or baseURL. The mpdID attribute may indicate an identifier of DASH MPD associated with the BBComp. The perID attribute may indicate an associated period identifier in a corresponding MPD. The reptnID attribute may indicate an identifier of a DASH Representation associated with a corresponding component. The baseURL attribute may indicate a Base URL of segments included in a DASH Representation associated with a corresponding component.

ForeignComp may indicate one or more components transmitted through different broadcast streams. The ForeignComp may indicate may include at least one of mpdID, perID, reptnID, baseURL, transportStreamID, sourceIPAddr, destIPAddr, destUDPPort, tsi, and/or datapipeID. The mpdID attribute may indicate an identifier of DASH MPD associated with the ForeignComp. The perID attribute may indicate an associated period identifier in a corresponding MPD. The reptnID attribute may indicate an identifier of a DASH Representation associated with a corresponding component. The baseURL attribute may indicate a Base URL of segments included in a DASH Representation associated with a corresponding component. The transportStreamID attribute may indicate an identifier of a broadcast stream including corresponding component data. The sourceIPAddr attribute may indicate a source IP address of an IP datagram including corresponding component data.

The destIPAddr attribute may indicate a destination IP address of an IP datagram including corresponding component data. The destUDPPort attribute may indicate may indicate a destination UDP port number of an IP datagram including corresponding component data. The tsi attribute may indicate an identifier of a transfer session for transmitting corresponding component data in a broadcast stream. The datapipeID attribute may indicate an identifier of a data pipe for transmitting corresponding component data in a corresponding broadcast stream. The aforementioned sourceIPAddrattribute, destIPAddr attribute, destUDPPort attribute, and datapipeID attribute may be optional attributes and may be selectively included in CMT some embodiments. The above Component Mapping Description may be may be encapsulated and transmitted in one XML file or the above proposed signaling message format. As illustrated in the lower part, the signaling message header may follow the aforementioned form and include component mapping description or a part thereof in a service message part. The CMT may define components associated with each service and a location or a path for receiving information related to corresponding components may be signaled to the receiver through the above information.

FIGS. 23 and 24 illustrate component mapping table description according to an embodiment of the present invention. The component mapping table description may signal information on a transmission path of a component included in a broadcast service in a next-generation broadcast system. This may be represented in XML format, binary bitstream, or the like. The component mapping table may include a delivery parameter element and a payload format element which are transmitted along with a DASH related identifier.

The component mapping table description may include the following element and attribute. A service_id attribute may indicate an identifier of a service associated with a component. A component element may indicate a component in a corresponding broadcast service. The component element may include at least one of an mpdID attribute, a perID attribute, a reptnID attribute, a baseURL attribute, a DeliveryParameter element, and/or a PayloadFormat element. The mpdID attribute may indicate an identifier of DASH MPD associated with a component. The perID attribute may indicate an associated period identifier in a corresponding MPD. The reptnID attribute may indicate an identifier of a DASH Representation associated with corresponding component. The baseURL attribute may indicate a Base URL of segments included in a DASH Representation associated with the corresponding component.

The DeliveryParameter element may include detailed information on a path and the like for transmitting a corresponding component. The DeliveryParameter element may include at least one of transportStreamID, sourceIPAddr, destIPAddr, destUDPPort, tsi, datapipeID, and/or URL. The transportStrearmID attribute may indicate an identifier of a broadcast stream including corresponding component data. The sourceIPAddr attribute may indicate a source IP address of an IP datagram including corresponding component data. The destIPAddr attribute may indicate a destination IP data of an IP datagram including corresponding component data. The destUDPPort attribute may indicate a destination UDP port number of an IP datagram including corresponding component data. The tsi attribute may indicate an identifier of a transfer session for transmitting corresponding component data in a corresponding broadcast stream. The datapipeID attribute may indicate an identifier of a physical layer data pipe for transmitting corresponding component data in a corresponding broadcast stream. The URL attribute may indicate URL information for acquiring corresponding component data through the Internet and so on. The aforementioned sourceIPAddrattribute, destIPAddr attribute, destUDPPort attribute, datapipeID attribute, and/or URL attribute may be optional attributes and may be selectively included in the DeliveryParameter element in some embodiments.

The PayloadFormat element may include detailed information on a payload form of a packet for transmitting corresponding component data. The PayloadFormat element may include a codePoint attribute, a deliveryObjectFormat attribute, a fragmentation attribute, a deliveryOrder attribute, a sourceFecPayloadID attribute, and/or an FECParameters element. The codePoint attribute may define a codepoint used in a corresponding payload. This may indicate a value of a CP field of an LCT header. This may be an index of a set of values of a subsequent deliveryObjectFormat attribute, a fragmentation attribute, a deliveryOrder attribute, and a sourceFecPayloadID attribute. The deliveryObjectformat attribute may indicate a payload format of a corresponding delivery object. The fragmentation attribute may define a type of fragmentation. The deliveryOrder attribute may indicate a delivery order of an object. The sourceFecPayloadID attribute may define the format of an identifier of a source FEC payload. The FECParameters element may define FEC parameters. This may include FEC encoding id, instance id, and so on.

FIG. 25 illustrates a component mapping table description according to an embodiment of the present invention. The component mapping table description may signal information on a transmission path of a component included in a broadcast service in a next-generation broadcast system. This may be represented as a bitstream such as an XML or binary form. The component mapping table description may include a service_id attribute, an mpd_id attribute, a per_id attribute, a BroadcastComp element, a BBComp element, and a ForeignComp element. The component mapping table description may include the following element and attribute. The service_id attribute may indicate an identifier of a service associated with a component. CMT description may include the mpdID attribute and the perID attribute at the same level as the service_id attribute. That is, the CMT description may describe mpd_ID attribute and perID attribute that are commonly applied to the BroadcastComp element, the BBComp element, and the ForeignComp element at the same level as the service_id attribute without redundantly describing these. The mpdID attribute may indicate an identifier of DASH MPD associated with a corresponding service. The peril) attribute may indicate an associated period identifier in a corresponding MPD.

The BroadcastComp may indicate one or more components transmitted through the same broadcast stream. The BroadcastComp may include at least one of reptnID, baseURL, tsi, and/or datapipeID. The reptnID attribute may indicate an identifier of a DASH Representation associated with a corresponding component. The baseURL attribute may indicate a Base URL of segments included in a DASH Representation associated with a corresponding component. The tsi attribute may indicate an identifier of a transfer session for transmitting corresponding component data in a broadcast stream. The datapipeID attribute may indicate an identifier of a data pipe for transmitting corresponding component data in a broadcast stream.

The BBComp element may indicate one or more components transmitted through a broadband network. The BBComp may include at least one of reptnID and/or baseURL. The reptnID attribute may indicate an identifier of a DASH Representation associated with a corresponding component. The baseURL attribute may indicate a Base URL of components included in a DASH Representation associated with a corresponding component.

The ForeignComp may indicate one or more components transmitted through different broadcast streams. The ForeignComp may include at least one of reptnID, baseURL, transportStreamID, sourceIPAddr, destIPAddr, destUDPPort, tsi, and/or datapipeID. The reptnID attribute may indicate an identifier of a DASH Representation associated with a corresponding component. The baseURL attribute may indicate a Base URL of segments included in a DASH Representation associated with a corresponding component. The transportStreamID attribute may indicate an identifier of a broadcast stream including corresponding component data. The sourceIPAddr attribute may indicate a source IP address of an IP datagram including corresponding component data. The destIPAddr attribute may indicate a destination IP address of an IP datagram including corresponding component data. The destUDPPort attribute may indicate a destination UDP port number of an IP datagram including corresponding component data. The tsi attribute may indicate an identifier of a transfer session for transmitting corresponding component data in a corresponding broadcast stream. The datapipeID attribute may indicate an identifier of a data pipe for transmitting corresponding component data in a corresponding broadcast stream. The aforementioned sourceIPAddrattribute, destIPAddr attribute, destUDPPort attribute, tsi attribute, and datapipeID attribute may be optional attributes and may be selectively included in CMT in some embodiments. The above Component Mapping Description may be may be encapsulated and transmitted in one XML file or the above proposed signaling message format. The CMT may define components associated with each service and a location or a path for receiving information related to corresponding components may be signaled to the receiver through the above information.

FIG. 26 is a diagram illustrating common attributes and elements of MPD according to an embodiment of the present invention. A next-generation broadcast system may provide a DASH-based hybrid broadcast service. The next-generation broadcast system may indicate that segments associated with representation and so on in DASH MPD are transmitted through different distribution paths. The common attributes and elements of the MPD may be commonly presented in adaptation sets, representations, and sub-representation elements and, as illustrated in the drawings, may include location information on an associated representation. The next-generation broadcast system may allow a DASH client to know a location of an associated representation or segment using location information on the associated representation included in the common attributes and elements of the MPD. The common attributes and elements of the MPD may include the following attributes and elements. The @profiles attribute may indicate a profile of associated representation as a profile attribute. The @width attribute may indicate a video media type of a horizontal visual presentation size for display. The @height attribute may indicate a video media type of a vertical visual presentation size for display. The @sar attribute may indicate a video media component type of sample aspect ratio. The @frameRate attribute may indicate an output frame rate of a representation. The @audioSamplingRate attribute may indicate an audio media component type of sampling rate. The @mimeType attribute may indicate a MIME type of concatenation of an initialization segment. The @segmentProfiles attribute may indicate profiles of segments required to process a corresponding representation. The @codecs attribute may indicate codec used in a corresponding representation. The @maximumSAPPeriod attribute may indicate a maximum stream access point (SAP) of an included media stream. The @startWithSAP attribute may indicate the number of media segments started along with SAP. The @maxPlayoutRate attribute may indicate a maximum playout rate. The @codingDependency attribute may indicate whether there is at least one access unit dependent upon one or more other access units for decoding. The @scanType attribute may indicate a scan type of video media component type of source material. The FramePacking element may indicate a video media component type of frame-packing information. The AudioChannelConfiguration element may indicate an audio media component type of audio channel setting. The ContentProtection element may indicate information on a content protection scheme used in an associated representation. The EssentialProperty element may indicate information on an element that is necessarily considered in processing. The SupplementalProperty element may include additional information used to optimize processing. The InbandEventStream element may indicate whether an inband event stream is present in an associated representation. The Location element may include location information for acquisition of an associated representation. The Location element may include information on a broadcast stream or a physical layer data pipe for delivery of an associated representation. A DASH client or a next-generation broadcast receiving apparatus may acquire an associated representation using a location element. That is, the next-generation broadcast system receiving apparatus may acquire information on a location of an associated representation using location information included in common attributes and elements and acquire an associated representation based on the information on the location even if the receiving apparatus does not use the aforementioned CMT. The aforementioned representation may be described as a component in some embodiments.

According to another embodiment of the present invention, a next-generation broadcast system may allocate information on a transmission path such as associated representation and so on to an @servicelocation attribute of a Base URL element in DASH MPD. The next-generation broadcast system may allow a DASH client to know information on a transmission path of segments associated with a corresponding representation using the @servicelocation attribute.

FIG. 27 is a diagram illustrating a transfer session instance description according to an embodiment of the present invention. When an application layer transmission method is real-time object delivery over unidirectional transport thereinafter, ROUTE), a ROUTE session may include one or more layered coding transport (LCT) sessions. Detailed information on one or more transfer sessions may be signaled through the transfer session instance description. The transfer session instance descriptor may be referred to as LCT Session Instance Description (LSID) in the case of ROUTE. In particular, the transfer session instance description may define what is transmitted by each LCT transfer session included in the ROUTE session. Each transfer session may be uniquely identified by a transfer session identifier (TSI). The transfer session identifier may be included an LCT header. The transfer session instance description may describe all transfer sessions transmitted through a corresponding session. For example, the LSID may describe a mode LCT session transmitted through the ROUTE session. The transfer session instance description may be transmitted through the same ROUTE session as the transfer sessions or through different ROUTE sessions or be unicast.

When transmitted through the same ROUTE session, the transfer session instance description may be transmitted through a transfer session with a predetermined transfer session identifier (TSI) of 0. Another object referred to by the transfer session instance description may also be transmitted with TSI=0 but may have a different TOI value from the transfer session instance description. Alternatively, another object may be transmitted through a divided transfer session with TSI≠0. The transfer session instance description may be updated using at least one of a version number, validity information, and expiration information. The transfer session instance description may be represented in a bitstream other than the illustrated form.

The transfer session instance description may include a version attribute, a validFrom attribute, and an expiration attribute and include a TSI attribute, SourceFlow element, RepairFlow element, and TransportSessionProperty element with respect to each transfer session. The version attribute may indicate version information on the corresponding transfer session instance description and version information may be increased whenever content thereof is updated. This may indicate that the transfer session instance description with the highest version number is the most recent version. The validFrom attribute may indicate a time point when a corresponding transfer session instance description is valid. In some embodiments, the validFrom attribute may not be included in the transfer session instance description and, in this case, the validFrom attribute may indicate that a corresponding transfer session instance description is valid upon being immediately received. The expiration attribute may indicate a time point when a corresponding transfer session instance description expires. In some embodiments, the expiration attribute may not be included in the transfer session instance description and, in this case, the expiration attribute may indicate that the corresponding transfer session instance description is continuously valid. Upon receiving a transfer session instance description with an expiration attribute, a corresponding expiration attribute may be followed. The TSI attribute may indicate a transfer session identifier, the SourceFlow element may provide information on source flow transmitted to a corresponding TSI, and detailed description thereof will be given below. The RepairFlow element may provide information on a repair flow transmitted to a corresponding TSI. The TransportSessionProperty element may include additional attribute information on a corresponding transfer session. The transfer session instance description may include additional attribute information on a transfer session in the TransportSessionProperty element and, for example, the additional information may include service signaling information on a transfer session.

FIG. 28 illustrates SourceFlow element of another next-generation broadcast system according to an embodiment of the present invention. The SourceFlow element may include an EFDT element, an idRef attribute, a realtime attribute, a minBufferSize attribute, an Application an Identifier element, a PayloadFormat element, and/or a SourceFlowProperty element. The EFDT element may include detailed information on file delivery data. The EFDT may indicate an extended File Delivery Table (EDT) instance and a detailed description thereof will be described below. The idRef attribute may indicate an identifier of the EFDT and may be represented according to a URI by a corresponding transfer session. The realtime attribute may indicate that corresponding LCT packets include an extension header. The extension header may include a timestamp indicating a presentation time of a delivery object. The minBufferSize attribute may define a maximum amount of data required to store the data in a receiver. The Application Identifier element may provide additional information to be mapped to an application delivered by a corresponding transfer session. For example, an Adaptation Set parameter of a DASH representation or Representation ID of DASH content for selecting a transfer session for rendering may be provided as additional information. The PayloadFormat element may define a payload format of a ROUTE packet for delivery of an object of source flow. The PayloadFormat element may include a codePoint attribute, a deliveryObjectFormat attribute, a fragmentation attribute, a deliveryOrder attribute, a sourceFecPayloadID attribute, and/or a FECParameters element. The codePoint attribute may define a code point used in a corresponding payload. This may indicate a value of a CP field of an LCT header. The deliveryObjectFormat attribute may indicate a payload format of a corresponding delivery object. The fragmentation attribute may define the type of fragmentation. The deliveryOrder attribute may indicate a delivery order of an object. The sourceFecPayloadID attribute may define a format of an identifier of a source FEC payload. The FECParameters element may define FEC parameters. This may include FEC encoding id, instance id, and so on. The SourceFlowProperty element may provide attribute information on corresponding source flow. For example, the attribute information may include location information on broadcast for delivery of corresponding source flow data. Here, the location information on the broadcast may include information on a data pipe or a physical layer pipe (PLP) in a broadcast stream. In addition, when source flow data is transmitted through another broadcast stream, the source flow data may include information on a broadcast stream identifier, and a data pipe or a physical layer pipe (PLP) in a corresponding stream.

FIG. 29 illustrates signaling data transmitted to rapidly scan a broadcast service by a receiver in a next-generation broadcast system according to another embodiment of the present invention. The illustrated service acquisition information may further add information on link layer signaling of the aforementioned service acquisition information. The information on the link layer signaling may include flag information indicating whether link layer signaling is present, version information on link layer signaling data, and information on a PLP or a data pipe for transmitting link layer signaling. FIC information (service acquisition information) for supporting rapid broadcast service scan and service/component acquisition may include information on an application layer transport session for transmitting service and component data. As illustrated in the drawing, system acquisition information may be represented in a binary format or, in some embodiments, represented in another format such as XML.

The system acquisition information may include the field as shown in the figure. Description of fields which have been explained is omitted. The contents described with reference to FIG. 9, FIG. 10, FIG. 12, FIG. 19 or FIG. 20 can be applied to the present description within a compatible range. A link_layer_signaling_flag may indicate whether service acquisition information transmits link layer (or low layer) signaling. A link_layer_signaling_data_version may indicate change in associated link layer (or low layer) signaling data. The corresponding field may be incremented by 1 whenever link layer signaling data is changed. The receiver may detect change in link layer (or low layer) signaling using the field. A link_layer_signaling_DP may indicate an identifier of a data pipe of a physical layer for transmitting link layer (or low layer) signaling used in an L2 layer. A Transport session descriptors field may include transfer session level of descriptors. Each descriptor is capable of being extended and each descriptor may include a num_descriptors field. Each descriptor may include a descriptor loop, the number of which corresponds to a value indicated by the num_descriptors field. The Transport session descriptors field may include transfer session level of descriptors. The service descriptors field may include service level of descriptors. A Partition descriptors field may include a partition level of descriptor and one partition may indicate a portion of a broadcast stream used by one broadcaster. An FIC session descriptors field may include FIC level of descriptors. In some embodiments, each field included in the aforementioned FIC may be included in another table other than FTC and may be transmitted along with a broadcast signal.

FIG. 30 illustrates signaling data transmitted for rapid scan of a broadcast service of a receiver by a next-generation broadcast system according to another embodiment of the present invention. FIC information (service acquisition information) for supporting rapid broadcast service scan and service/component acquisition may include information on an application layer transport session for transmitting service and component data. In addition, the service acquisition information may further include information on link layer signaling. As illustrated in the drawing, the service acquisition information may be represented in a binary format but, in some embodiments, may be represented in a different format such as XML.

The service acquisition information may include the field as shown in the figure. Description of fields which have been explained is omitted. The contents described with reference to FIG. 9, FIG. 10, FIG. 12, FIG. 19, FIG. 20 or FIG. 29 can be applied to the present description within a compatible range, A num_services field may indicate the number of at least one component belonging to a corresponding partition. Each service may include a plurality of signaling tables. For example, each service may include DASH MPD including information on components and segments thereof, CMT including an identifier of components included in a broadband stream and other broadcast streams, AST as an application signaling table, and a URL signaling table (UST) including at least one URL among MPD, CMT, and AST. These signaling tables may be included in a signaling channel of a corresponding service. A service_id field may indicate an identifier of a service. A service_data_version_field may indicate change in service loop data in FIC. A service_data_version field may be incremented by 1 whenever included service data is changed. For example, whenever FIC, MPD, CMT, AST, or UST is changed, the field may be incremented by 1. The receiver may detect change in data of a service loop of FIC or change in signaling associated with a corresponding service using the service_data_version field. A component_signaling_flag field may indicate whether the transfer session transmits service signaling. When a value of the component_signaling_flag is 1, this may indicate that the field includes service signaling (e.g., DASH media presentation description (MPD) or CMT) of data transmitted through a corresponding transfer session. Here, the CMT may be a component mapping table and may include an identifier of components transmitted through a broadband and also include information on a component included in a broadcast stream. Each service may include a service signaling channel and the service signaling channel may include MPD, CMT, AST, and/or UST. A service signaling channel may be one signaling channel of a plurality of ROUTE sessions for a service and whether the service signaling channel is present may be indicated through a component signaling flag. When a plurality of transfer sessions (ROUTE or MMTP session) transmits signaling and service components, the aforementioned service signaling tables may be transmitted in one transfer session. A link_layer_signaling_flag may indicate whether service acquisition information transmits link layer (or low layer) signaling. A link_layer_signaling_data_version may indicate change in associated link layer (or low layer) signaling data. The corresponding field may be incremented by 1 whenever link layer signaling data is changed. The receiver may detect change in link layer (or low layer) signaling using the field. A link_layer_signaling_DP may indicate a Data pipe identifier of a physical layer for transmitting link layer (or low layer) signaling used in an L2 layer.

A ROUTE session descriptors field may include a transfer session level of descriptors. Each descriptor is capable of being extended and each descriptor may include a num_descriptors field. Each descriptor may include a descriptor loop, the number of which corresponds to a value indicated by the num_descriptors field. The Transport session descriptors field may include transfer session level of descriptors. The service descriptors field may include service level of descriptors. A Partition descriptors field may include a partition level of descriptor and one partition may indicate a portion of a broadcast stream used by one broadcaster. An FTC session descriptors field may include FTC level of descriptors.

In some embodiments, each field included in the aforementioned service acquisition information may be included in a broadcast signal and may be transmitted along with other information other than service acquisition information.

FIG. 31 is a diagram illustrating a syntax of a header of a signaling message according to another embodiment of the present invention.

The signaling message according to another embodiment of the present invention may be represented in XML. Here, signaling information included in the signaling message in XML may correspond to signaling information described above or signaling information described below.

The header of the signaling message according to another embodiment of the present invention may include signaling_id information, signaling_length information, signaling_id_extension information, version_number information, current_next_indicator information, indicator_flags information, fragmentation_indicator information, payload_format_indicator information, expiration_indicator information, validfrom_indicator information, fragment_number information, last_fragment_number information, payload_format information, validfrom information and/or expiration information.

Description of signaling information identical to the signaling information included in the header of the aforementioned signaling message or having the same name as the signaling information from among signaling information included in the header of the signaling message according to the present embodiment is replaced by the above description.

The validfrom_indicator information can indicate whether the header of the signaling message includes a validfrom information value. For example, when the validfrom_indicator information is "1", this can indicate that the header of the signaling message includes the validfrom information.

The validfrom information can indicate an availability start time of a signaling message included in a payload. A receiver can recognize the availability start time of signaling included in the payload using the validfrom information and use data included in the payload as signaling information from the availability start time.

Here, the payload can refer to a region in a broadcast signal including data (broadcast service data) of a broadcast service or broadcast content. In general, it is desirable that signaling information be transmitted through a region physically or logically separated from broadcast service data in a broadcast signal. However, according to the present invention, the signaling information can be transmitted through a payload region in a broadcast signal when the payload region includes a reserved region or when signaling information that exceeds the size of a region allocated for signaling information transmission needs to be transmitted.

Figure 32:
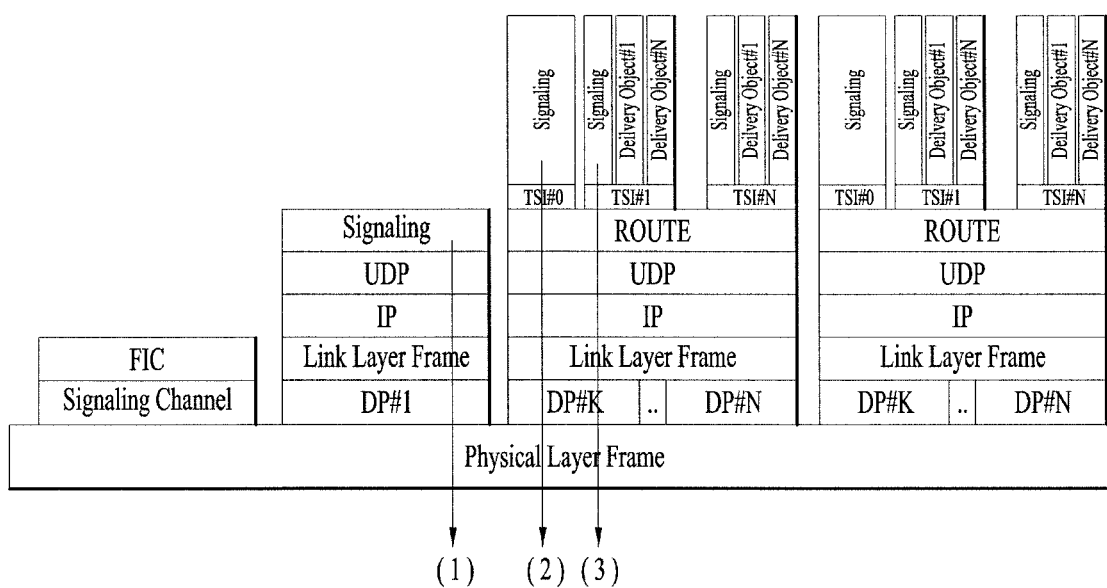
FIG. 32 is a diagram illustrating a protocol stack that processes a DASH initialization segment according to an embodiment of the present invention.

FIG. 32 is a diagram illustrating a protocol stack that processes a DASH initialization segment according to an embodiment of the present invention.

The DASH initialization segment can be transmitted in the form of the aforementioned initialization segment delivery table or in XML.

The initialization segment (DASH initialization segment) includes metadata (signaling information) necessary to present a media stream (broadcast signal) encapsulated in a plurality of segments. Here, a segment is a data unit associated with HTTP-URL The segment includes data for a broadcast service or broadcast content. Representation is a data unit including one or more media streams in a transport format. Representation can include one or more segments.

The DASH initialization segment can be processed according to the illustrated protocol stack in a transmitter or a receiver. The DASH initialization segment can be delivered through one or more paths in the protocol stack.

Referring to the protocol stack, signaling information or broadcast service data can be processed according to protocols of multiple layers. In the figure, "signaling channel and data pipe (D)" may correspond to a first layer, "FIC and link layer frame" may correspond to a second layer. Internet protocol (IP) may correspond to a third layer, user datagram protocol (UDP) may correspond to a fourth layer and ROUTE may correspond to a fifth layer. Here, the link layer frame may include the link layer packet described in the specification.

According to the protocol stack for DASH initialization segment processing, when signaling data such as the initialization segment is directly delivered on IP/UDP, as represented by the illustrated path (1), the signaling data may be delivered as information in the form of the aforementioned initialization segment delivery table or the initialization segment may be delivered in the form of an IP datagram through processing of the protocol stack. The above-described information for service signaling and/or component signaling may be delivered together through the illustrated path (1).

According to an embodiment of the present invention, the DASH initialization segment may be delivered along with media data in a specific session for delivering signaling data as represented by path (2) or a session for delivering component data as represented by path (3). For example, an application transport protocol can use ROUTE (Real-time Object delivery over Unidirectional Transport). A ROUTE session may include a session for delivering signaling information and a session for delivering data about broadcast media. A broadcast system fixes the TSI of the session for delivering the signaling information to a specific value such that a receiver can recognize that data delivered through the session having the corresponding TSI value is signaling information.

When signaling information (data) such as the initialization segment is delivered as represented by the illustrated paths (2) and/or (3), information indicating the positions of data in the aforementioned signaling message format and the initialization segment in a transport stream or a transport object and/or information for discriminating the signaling message format data or the initialization segment from data delivered along therewith may be provided in the form of a field in a transport protocol packet or additional signaling.

FIG. 33 is a diagram illustrating part of a layered coding transport session instance description (LSID) according to an embodiment of the present invention.

The LSID according to an embodiment to the present invention can provide information indicating positions of signaling message format data and an initialization segment in a broadcast signal and/or information for discriminating the signaling message format data or the initialization segment from data delivered along therewith.

The LSID may include a PayloadFormat element. The PayloadFormat element may include @codePoint information, @deliveryObjectFormat information, @fragmentation information, @deliveryOrder information and/or @sourceFecPayloadID information.

Each element can be used to provide information illustrated in the figure.

According to an embodiment, a broadcast receiver or a broadcast transmitter may use the @deliveryObjectFormat information (or field) of the PayloadFormat element in a SourceFlow element of the LSID in order to identify a ROUTE packet including the initialization segment.

In an embodiment, the @deliveryObjectFormat information can indicate that the corresponding ROUTE packet includes a signaling message format when having a value of "0". When the @deliveryObjectFormat information is "0", a ROUTE packet including a code point (CP), which has the same value as the @codePoint information allocated to the PayloadFormat element, in an LCT packet header can indicate delivery of data in the aforementioned signaling message format. The initialization segment may be included and transmitted in the signaling message format, and other signaling data such as service signaling and component signaling may be included in the signaling message format and transmitted through a ROUTE packet in the same manner.

The @deliveryObjectFormat field can indicate that the corresponding ROUTE packet includes metadata (signaling information) including an initialization segment when having a value of "4". When the 169 deliveryObjectFormat field is "4", the @deliveryObjectFormat information can indicate that a metadata format including the initialization segment is delivered through the ROUTE packet or the initialization segment is directly transmitted through the ROUTE packet.

According to an embodiment of the present invention, a broadcast system (broadcast receiver and/or broadcast transmitter) can signal direct delivery of signaling data such as service signaling (service level signaling information) and/or component signaling (component level signaling) through a ROUTE packet by allocating a new value (e.g., a value equal to or greater than "5") to the @deliveryObjectFormat information.

According to another embodiment of the present invention, the broadcast system may identify a ROUTE packet carrying signaling data such as the initialization segment through other fields in the LSID or a new additional field in addition to the method using the @deliveryObjectFormat information described in the present embodiment.

FIG. 34 is a diagram illustrating a signaling object description (SOD) providing information for filtering a service signaling message according to an embodiment of the present invention.

The SOD according to an embodiment of the present invention may include @protocolVersion information, @dataVersion information, @validFrom information, @expiration information, a signaling object element, @toi information, @type information, @version information, @instance Id information, @validFrom information, @expiration information and/or @payloadFormat information.

The @protocolVersion information indicates a version of the SOD.

The @dataVersion information indicates a version of an instance of the SOD. When the contents of the SOD are changed, the @dataVersion information can be changed.

The @validFrom information can indicate an availability start time of the instance of the SOD. A receiver can recognize the availability start time of the SOD using the @validFrom information and use information included in the SOD from the corresponding time.

The @expiration information can indicate an expiration time of availability of the instance of the SOD. The receiver can recognize the availability expiration time of the SOD and manage information of the SOD using the @expiration information.

The signaling object element indicates an object including signaling information. The SOD can include signaling information about one or more signaling objects.

The @toi information indicates a transmission object identifier (TOI) allocated to a signaling object. The @toi information can be used to identify a packet related to the signaling object. The receiver may identify the following information such as the type and/or version of a signaling message transmitted through each object by mapping the @toi information to a TOI of an LCT packet.

The @type information specifies a type of a signaling message included in an object. For example, the type information can indicate that an LCT session instance description (LSID) is delivered as a signaling message in an object when it is "0", indicate that a component mapping description (CMD) is delivered as a signaling message in an object when it is "1", indicate that an application signaling description (ASD) is delivered as a signaling message in an object when it is "2", indicate that a media presentation description (MPD) is delivered as a signaling message in an object when it is "3", indicate that a URL signaling description (USD) is delivered as a signaling message in an object when it is "4" and indicate that an initialization segment (IS) is delivered as a signaling message in an object when it is "5".

The @version information indicates a version of a signaling message. The receiver can recognize change of the signaling message through variation in this field value.

The @instanceId information identifies an instance of a signaling message. This information can be used for the receiver to identify instances of signaling messages that may be present in a single service, such as the initialization segment.

The @validFrom information can indicate an availability start time of a sign message included in an object. The receiver can recognize the availability start time of signaling included in the object and use the signaling included in the object from the time using the @validFrom information.

The @expiration information can indicate a validity time of a signaling message included in an object. The receiver can recognize an availability expiration time of signaling included in the object and manage a signaling message using the @expiration information.

The @payloadFormat information can indicate a format of signaling message data included in an object. For example, a signaling message can be provided in a binary or XML format which is represented by the @payloadFormat information.

When signaling messages are delivered according to an LCT based protocol such as ROUTE, each signaling message may be set to an object and processed. Since an object can be identified by a unique TOI in the above protocol, a signaling message can be filtered by mapping signaling message related information such as version and type to each TOI. The above-described SOD provides filtering information of signaling objects corresponding to one transport session. The SOD can be delivered through an internal or external means of a session carrying signaling. When the SOD is delivered through the internal means, the receiver can identify the SOD with a unique TOI value (e.g., 0 or 0xFFFF) and analyze the SOD prior to other signaling messages transmitted along therewith. When the SOD is delivered through the external means, the SOD is delivered through a means such as a fast information channel (FIC), a service list table (SLT), an additional IP datagram or other ROUTE sessions prior to other objects delivered in the corresponding session such that the receiver can acquire signaling message information in advance.

FIG. 35 is a diagram illustrating an object including a signaling message according to an embodiment of the present invention.

When signaling messages are delivered according to an LCT based protocol such as ROUTE, each signaling message may be set to an object and processed. An object can be identified by a unit TOI in the aforementioned protocol. The receiver can filter a signaling message by mapping signaling message related information such as version and/or type to each TOI. Objects containing different contents may be assigned different TOIs. In this case, all objects can be uniquely identified in a broadcast system and thus signaling messages can be processed through a method compatible with existing object processing methods.

The illustrated figure shows an embodiment in which part of the TOI field is used for description of signaling message related information having a fixed length. In the present embodiment, a 32-bit TOI is used and the type and version of signaling data delivered through an object can be identified through a 16-bit type field and a 16-bit version field. In the same manner, additional information of the aforementioned sequence number information, validFrom information, expiration information and/or payloadFormat information may be delivered by allocating parts of the TOI field such as Type and Version in the present embodiment to fields having a fixed length.

An object according to an embodiment of the present invention may include a v element, a c element, a PSI element, an S element, an O element, an H element, an A element, a B element, an HDR_LEN element, a Codepoint element, a Congestion Control Information element, a Transport Session Identifier (TSI) element, a Transport Object Identifier (TOI) element, a Header Extensions element, an FEC payload ID element, and/or an Encoding Symbols element. Here, an element may be called information or a field.

The PSI element may include an X element and/or a Y element.

The TOI element may include a Type element and/or a Version element.

The v element indicates a version number of a packet. The v element can indicate a version of ALC/LCT. The v element can represent delivery of a packet conforming to ALC/LCT+ through the object.

The c element corresponds to a congestion control flag. The c element can indicate the length of congestion control information (CCI). For example, the c element can indicate 32-bit CCI when it is 0, indicate 64-bit CCI when it is 1, indicate 96-bit CCI when it is 2 and indicate 128-bit CCI when it is 3.

The PSI element corresponds to protocol-specific indication (PSI). The PSI element can be used as an indicator of a specific purpose with respect to a higher protocol of ALC/LCT+. The PSI element can indicate whether the current packet corresponds to a source packet or an FEC repair packet.

The X element may correspond to information indicating a source packet. When different FEC payload ID formats are used for source and repair data, the X element indicates the FEC payload ID format for the source data when it is "1" and indicates the FEC payload ID format for the repair data when it is "0". When the X element is set to "0" in a transmitter, a receiver may ignore this element or packet and may not process the element or packet.

The S element may correspond to a transport session identifier flag. The S element indicates the length of the transport session identifier element.

The O element may correspond to a transport object identifier flag. The O element can indicate the length of the transport object identifier element. An object may refer to a file and the TOI is identification information of each object. A file having a TOI of 0 may include signaling information related to the file.

The H element may correspond to a half-word flag. The H element indicates whether a half word (16 bits) is added to the lengths of the TSI and TOI.

The A element may correspond to a close session flag. The A element can indicate that a session is closed or closing of the session is imminent.

The B element may correspond to a close object flag. The B element can indicate that an object being delivered is closed or closing of the object is imminent.

The HDR_LEN element indicates the length of a packet header.

The Codepoint element indicates a type of a payload delivered by the corresponding packet. An additional payload header can be inserted into a prefix of payload data depending on payload type.

The congestion control information (CCI) element may include congestion control information such as layer numbers, logical channel numbers and sequence numbers. The CCI element may include necessary congestion control related information.

The TSI element is a unique identifier of a session. The TSI element indicates any of all sessions from a specific sender. The TSI element identifies a transport session. The value of the TSI element can be used for one track.

The TOI element is a unique identifier of an object. The TOI element indicates which object is included in the corresponding packet. The value of the TOI element can be used for one piece of ISO BMFF object data. The TOI element may include the ID of an ISO BMFF file and the ID of a chunk. The TOI element may have a combination of the ID of the ISO BMFF file and the ID of the chunk as a value thereof.

The type element can identify the type of data delivered through the corresponding object. For example, the type element can indicate that the data delivered through the corresponding object is a signaling message.

The version element specifies a version of data delivered through the corresponding object. For example, the version element may include information specifying whether the structure and/or contents of data identified through the type object have been changed.

The header extensions element may include additional header information.

The FEC payload ID element is an FEC payload identifier. The FEC payload ID element includes identification information of a transmission block or an encoding symbol. The FEC payload ID indicates an identifier when the aforementioned file has been FEC encoded. For example, when the aforementioned FLUTE protocol file has been FEC encoded, the FEC payload ID can be allocated to allow a broadcaster or a broadcast server to recognize the FEC encoded file.

The encoding symbols element may include data of a transmission block or an encoding symbol.

FIG. 36 is a diagram illustrating a TOI configuration description (TCD) according to an embodiment of the present invention.

As described above, part of the TOI field can be used to describe variable length signaling message related information. To describe signaling message related information in a variable length TOI field, configuration information of the TOI field can be separately transmitted. In an embodiment, the TCD shown in the illustrated table may be transmitted and/or received to provide information about a TOI field configuration. In the present embodiment, the TCD provides TOI field configuration information of transport packets corresponding to one transport session. The TCD may be transmitted through an internal means and/or an external means of a session delivering signaling. When the TCD is delivered inside of the session delivering signaling, the TCD can be identified by a unique TOI value, for example, a value such as 0 or 0xFFFF and analyzed prior to other signaling messages delivered along therewith. When the TCD is delivered outside of the session delivering signaling, the TCD can be delivered through a means such as an FIC, a separate IP datagram and/or other ROUTE sessions prior to an object delivered through the corresponding session to process configuration information of a TOI field included in each packet such that a receiver can recognize the configuration information in advance. Fields below the @typeBits field represent the lengths of fields in the TOI field and indicate that field information corresponding to the lengths is sequentially described from the TOI start bit.

The TCD according to an embodiment of the present invention may include @protocolVersion information, @dataVersion information, @validFrom information, @expiration information, @typeBits information, @versionBits information, @instanceIdBits information, @validFrombits information, @expirationBits information and/or @payloadFormatBits information.

The @protocolVersion information specifies a version of the TCD. When the protocol or structure of the TCD has been changed, the @protocolVersion information specifies such change.

The @dataVersion information specifies a version of an instance of the TCD. When the contents of the TCD have been changed, the @dataVersion information specifies such change.

The @validFrom information can indicate an availability start time of the instance of the TCD. A receiver can recognize the availability start time of the TCD using the @validFrom information and use information of the TCD from the start time.

The @expiration information can indicate availability expiration time of the instance of the TCD. The receiver can recognize the availability expiration time of the TCD and finish use of the information of the TCD using the @expiration information. The receiver can manage the TCD information using the @expiration information.

The @typeBits information indicates the length of the type field in the TOI field. The @typeBits information can represent the length of the type field as bits.

The @versionBits information indicates the length of the version field in the TOI field. The @typeBits information can represent the length of the type field as bits.

The @instanceIdBits information can represent the length of the instanceID field in the TOI field as a bit number.

The @validFromBits information can represent the length of the validFrom field in the TOI field as a bit number.

The @expirationBits information can represent the length of the expiration field in the TOI field as a bit number.

The @payloadFormatBits information can represent the length of the payloadFormat field in the TOI field as a bit number.

FIG. 37 is a diagram illustrating a payload format element of a transport packet according to an embodiment of the present invention.

According to an embodiment of the present invention, a signaling message can be delivered through a payload of a transport packet. To this end, the transport packet can include the payload format element as illustrated. The transport packet corresponds to a packet delivering an object including broadcast data. The name of the transport packet of the present invention may be changed depending on the protocol through which the packet is processed. For example, when a packet is processed through ROUTE, the packet can be called a ROUTE packet.

The payload format element can be included in the LSID as described above.

The payload format element of the transport packet of the present invention may include @codePoint information, @deliveryObjectFormat information, @fragmentation information, @deliveryOrder information, @sourceFecPayloadID information and/or TOI configuration instance description (TCID).

The @codePoint information defines what CodePoint is used for this payload. This information can play the same role as the aforementioned CP element or have the same value as the CP element.

The @deliveryObjectFormat information specifies a format of a payload of an object for data delivery. For example, this information can indicate that the object delivers a signaling message, a file, an entity, a package or metadata including an initialization segment.

The @fragmentation information specifies a type of fragmentation.

The @deliveryOrder information specifies a delivery order of objects. For example, this information can be used to specify the order of objects delivered through the current payload.

The @sourceFecPayloadID information can define a format of a source FEC payload ID.

The TCID can include TOI field configuration information when part of the TOI field is used to describe variable length signaling message related information.

FIG. 38 is a diagram illustrating a TCID according to an embodiment of the present invention.

Part of the TOI field is used to describe variable length signaling message related information, and the configuration of the TOI field may be dynamically changed in one TOI field.

To describe signaling message related information in a variable length TOI field, TOI field configuration information may be separately transmitted in the illustrated form.

In the present embodiment, the TCID provides TOI field configuration information of transport packets corresponding to a group of packets mapped to one codepoint value. The TCID can be included and transmitted in PayloadFormat in SourceFlow of the LSID. Internal fields of the TCID may be the same as those of the above-described TCD and can indicate a TOI configuration of packets having the same CP value as @codePoint included along therewith in PayloadFormat. A TOI configuration method may be the same as the aforementioned method with respect to the TCID.

The TCID according to an embodiment of the present invention may include @typeBits information, @versionBits information, @instanceIdBits information, @validFromBits information, @expirationBits information and/or @payloadFromatBits information. Description of such information is replaced by description of the aforementioned information having the same names.

Figure 39:
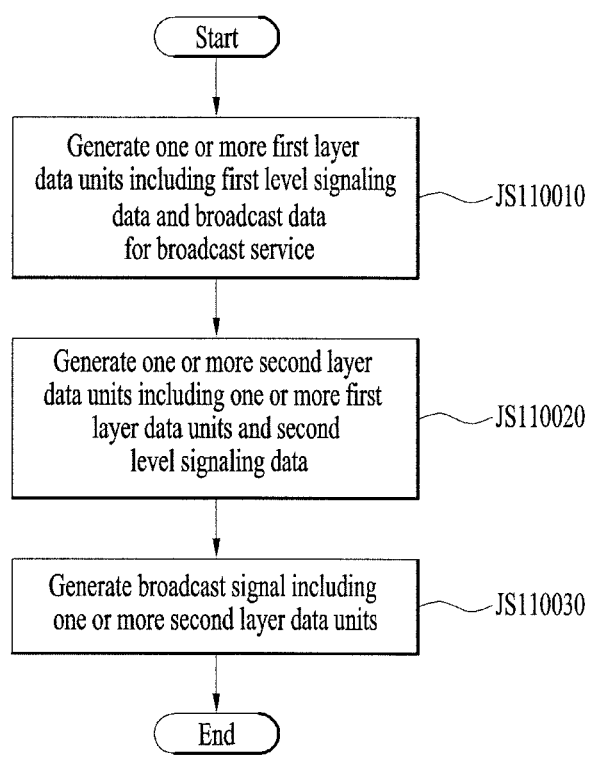
FIG. 39 is a diagram illustrating a syntax of a payload of FIC (Fast Information Channel) according to an embodiment of the present invention.

FIG. 39 is a diagram illustrating a syntax of a payload of an FIC (Fast Information Channel) according to an embodiment of the present invention.

While signaling data including information for service scan or acquisition is called FIC in the present invention, the term is not limited thereto. Signaling data providing information for acquiring broadcast services more effectively in a lower layer of the service layer (or level) will be described. For example, such signaling data may be called a service list table, a service list element or the like.

Furthermore, although the structure of the signaling data is represented as a binary table for convenience of description in the present invention, identical or similar information included in the table may be realized in XML.

The FIC according to an embodiment of the present invention may include FIC_protocol_version information, transport_stream_id information, num_partitions information, partition_id information, partition_protocol_version information, num_services information, service_id information, service_data_version information, service_channel_number information, service_category information, short_service_name_length information, short_service_name information, service_status information, service_distribution information, sp_indicator information, IP_version_flag information, SSC_source_IP_address_flag information, SSC_source_IP_address information, SSC_destination_IP_address information, SSC_destination_UDP_port information, SSC_TSI information, SSC_DP_ID information, num_partition_level_description information, a partition_level_descriptor( ) element, num_FIC_level_description information and/or an FIC_level_descriptor( ) element.

The FIC_protocol_version information identifies the version of the structure of the FIC.

The transport_stream_id information identifies broadcast streams. This may correspond to information identifying all broadcast streams.

The num_partitions information indicates the number of partitions in a broadcast stream. One broadcast stream can be divided into one or more partitions and each partition can include one or more data pipes used by one broadcaster (or broadcast source).

The partition_id information identifies a partition.

The partition_protocol_version information identifies the version of a partition structure.

The num_services information indicates the number of broadcast services one or more components of which are delivered through a partition.

The service_id information identifies a service (or broadcast service).

The service_data_version information identifies a change in service entry for a service signaled by the FIC. Otherwise, the service_data_version information identifies a change in a signaling table for a service included in a service signaling channel (or service level signaling). The service_data_version information can indicate a corresponding change by increasing the value thereof for every change.

The service_channel_number information indicates a channel number for a service.

The service_category information indicates the category of a service. For example, the service_category information can indicate that a broadcast service is an A/V service, an audio service, an ESG (Electronic Service Guide), an App based service and/or a CoD (Content on Demand).

The short_service_name_length information indicates the length of the short_service_name information. The short_service_name_length information can have a value of "0" when the short_service_name information is not present.

The short_service_name information indicates the short name of the service. Each character indicated by the short_service_name information can be encoded per UTF-8. When there is an odd number of bytes in the short name, the second byte of the last of the byte pair per the pair count indicated by the short_service_name_length field may contain 0x00.

The service_status information indicates the state of the service. The service_status information can indicate that a broadcast service is in active, inactive, suspended, hidden and/or shown states.

The service_distribution information specifies whether representation of a broadcast service or broadcast content is possible only using current partitions, is impossible only using current partitions but requires the current partitions, or requires other broadcast streams.

The sp_indicator information indicates whether service protection has been applied. The sp_indicator information specifies whether one or more components of a broadcast service necessary for significant representation have been protected.

The IP_version_flag information specifies whether IP addresses indicated by the SSC_source_IP_address information and/or SSC_destination_IP_address information are IPv4 addresses or IPv6 addresses.

The SSC_source_IP_address_flag information specifies presence of the SSC_source_IP_address information for the service.

The SSC_source_IP_address information is present when the SSC_source_IP_address_flag information is set to "1" and is not present when the SSC_source_IP_address_flag information is set to "0". The SSC_source_IP_address information indicates a source IP address of an IP datagram (or data unit) carrying signaling information for the service. The SSC_source_IP_address information can have 128 bits when an IPv6 address is used.

The SSC_destination_IP_address information indicates a destination IP address of the IP datagram (or data unit) carrying the signaling information for the service. The SSC_destination_IP_address information can have 128 bits when an IPv6 address is used.

The SSC_destination_UDP_port_information indicates a destination UDP port number for UDP/IP streams carrying the signaling information for the service.

The SSC_TSI information indicates a TSI (Transport Session Identifier) of an LCT channel carrying signaling information (or a signaling table) for the service.

The SSC_DP_ID information identifies a data pipe (DP) including signaling information (or a signaling table) for the service. A data pipe carrying signaling information may correspond to a most robust data pipe in a current partition or broadcast stream.

The num_partition_level_descriptors information indicates the number of partition level descriptors defined for a partition.

The partition_level_descriptor( ) element includes one or more partition level descriptors. A partition level descriptor may include information necessary for a receiver to access, acquire or use partitions.

The num_FIC_level_descriptors information indicates the number of FIC level descriptors defined for the FIC.

The FIC_level_descriptor( ) element includes one or more FIC level descriptors. An FIC level descriptor may include additional signaling information for the FIC.

FIG. 40 is a diagram illustrating a syntax of a payload of an FIC according to another embodiment of the present invention.

The payload of the FIC according to another embodiment of the present invention may include SSC_delivery_type information, SSC_URL_length information and/or SSC_URL_data information in addition to the payload of the FIC in the above-described embodiments.

The SSC_delivery_type information specifies a path through which signaling information (e.g., a service signaling channel or a service level signaling) related to the service is delivered. The SSC_delivery_type information can specify whether data of service level signaling is delivered through broadband (Internet). For example, the SSC_delivery_type information can indicate that service level signaling is delivered through a broadcast network when having a value of 0x01. The SSC_delivery_type information can indicate that service level signaling is delivered through the Internet when having a value of 0x02.

The SSC_URL_length information indicates the length of SSC_URL_data information.

The SSC_URL_data information indicates the URL of a server or position providing signaling information related to the service.

Description of information that is not described in the present embodiment is replaced by the above description.

FIG. 41 is a diagram illustrating a syntax of service level signaling according to another embodiment of the present invention.

Information necessary for a receiver to receive a broadcast service and/or broadcast content that a viewer desires may be called service level signaling. The service level signaling includes information describing attributes of a broadcast service and components included in the broadcast service.

Service level signaling data according to another embodiment of the present invention may include a signaling message header and/or a service signaling message.

The service level signaling data according to another embodiment of the present invention may include @service_id information, @service_category information, @service_name information, @channel_number information, @service_status information, @service_distribution information, @SP_indicator information, a ROUTE session element, @sourceIPAddr information, @destIPAddr information, @destUDPPort information, @LSID_DP information, a targeting element, a content advisory element, a right issuer service element, a current program element, an original service identification element, a content labeling element, a genre element, a caption element and/or a protection element.

The @service_id information identifies a broadcast service.

The @service_category information identifies the category of the broadcast service. For example, the service_category information can identify the broadcast service as an audio service, a real-time broadcast service, a non-real-time broadcast service, a linear broadcast service, an app-based broadcast service or a service guide.

The @service_name information indicates the name of the broadcast service.

The @channel_number information indicates the channel number carrying the broadcast service. The channel number may correspond to a logical/physical channel number. The channel number can be used as information for identifying a logical transport path or a transport unit through which data of service level signaling is transmitted as necessary.

The @service_status information indicates the state of the broadcast service. The @service_status information may include information indicating whether the broadcast service is active or inactive. The @service_status information may include information indicating whether the broadcast service is hidden.

The @service_distribution information indicates how data or components for the broadcast service are distributed and delivered.

The @SP_indicator information indicates whether service protection has been applied to the broadcast service or at least one component included in the broadcast service. The @SP_indicator information may correspond to information indicating whether service protection has been applied to data or components for significant representation of the broadcast service.

The ROUTE session element includes information about a ROUTE session delivering the broadcast service or components included in the broadcast service.

@sourceIPAddr information indicates a source IP address of an IP datagram (or data unit) carrying a ROUTE packet.

The @destIPAddr information indicates a destination IP address of the IP datagram (or data unit) carrying the ROUTE packet.

@destUDPPort information indicates a destination UDP port number of the IP datagram (or data unit) carrying a ROUTE packet.

@LSID_DP information specifies a data pipe delivering information (e.g., LSID) that describes transmission parameters related to a ROUTE session and/or a lower session in the ROUTE session.

The targeting element includes information for provision of a personalized broadcast service (targeting broadcast). This element can be included in service level signaling in separate signaling information. In this case, this element can include link information about the service level signaling.

The content advisory element includes information about audience rating of the broadcast service. This element may be included in service level signaling in a separate signaling structure. In this case, this element can include link information about the corresponding service level signaling. The right issuer service element includes information related to rights to appropriately consume the broadcast service. This element may be included in service level signaling in a separate signaling structure. In this case, this element can include link information about the corresponding service level signaling.

The current program element includes information about the current broadcast program. This element may be included in service level signaling in a separate signaling structure. In this case, this element can include link information about the corresponding service level signaling.

The original service identification element includes information about identification of the original service related to the current broadcast service. This element may be included in service level signaling in a separate signaling structure. In this case, this element can include link information about the corresponding service level signaling.

The content labeling element includes information related to content labeling. This element may be included in service level signaling in a separate signaling structure. In this case, this element can include link information about the corresponding service level signaling. The genre element includes information for classifying genres of the broadcast service. This element may be included in service level signaling in a separate signaling structure. In this case, this element can include link information about the corresponding service level signaling.

The caption element includes information about closed captioning/subtitles of the broadcast service. This element may be included in service level signaling in a separate signaling structure. In this case, this element can include link information about the corresponding service level signaling.

The protection element includes information related to protection of the broadcast service. When the aforementioned @SP_indicator information indicates that protection has been applied to the broadcast service or broadcast components, the protection element can provide detailed information about protection. This element may be included in service level signaling in a separate signaling structure. In this case, this element can include link information about the corresponding service level signaling.

FIG. 42 is a diagram illustrating component mapping description according to another embodiment of the present invention.

The component mapping description according to another embodiment of the present invention may further include @partitionID information in addition to the information or elements included in the component mapping description according to the aforementioned embodiment.

The @partitionID information identifies a partition indicating a broadcaster in a broadcast stream. The @partitionID information can be used as information for identifying a source that transmits broadcast components.

Description of other information or elements included in the component mapping description is replaced by the above description about the information or elements having the same names.

FIG. 43 is a diagram illustrating a syntax of URL signaling description according to another embodiment of the present invention.

As described above, signaling information that describes a broadcast service can be delivered through a broadband network as well as a broadcast network. When the signaling information that describes a broadcast service is delivered through a broadband network, a receiver can acquire the signaling information through URL signaling description.

The URL signaling description according to another embodiment of the present invention may include @service_id information, @smtURL information, @mpdURL information, @cmtURL information, @astURL information, @gatURL information and/or @eatURL information.

The service_id information identifies a service.

The @smtURL information indicates the URL of a server or position providing an SMT (Service Map Table) when the SMT is delivered over broadband.

The @mpdURL information indicates the URL of a server or position providing an MPD when the MPD is delivered over broadband.

The @cmtURL information indicates the URL of a server or position providing a CMT (Component Mapping Table) when the CMT is delivered over broadband.

The @astURL information indicates the URL of a server or position providing an AST (Application Signaling Table) when the AST is delivered over broadband.

The @gatURL information indicates the URL of a server or position providing a GAT (Guide Access Table) when the GAT is delivered over broadband. The GAT can correspond to a signaling message including information for bootstrap of an ESG (Electronic Service Guide). That is, the GAT can correspond to a signaling message including information necessary for a receiver to access the ESG.

The @eatURL information indicates the URL of a service or position providing an EAT (Emergency Alert Table) when the EAT is delivered over broadband.

FIG. 44 is a diagram illustrating a SourceFlow element according to another embodiment of the present invention.

Broadcast service data can be delivered object by object through a ROUTE session. Each object can be individually restored. Within a single session, a source protocol can be defined to deliver objects and the SourceFlow element including information related to delivery of a source (object) can be defined.

The SourceFlow element according to another embodiment of the present invention may further include @location information in addition to the aforementioned information/attributes/elements included in the SourceFlow element.

The @location information indicates a location or a data unit for delivery of data of a source flow. The @location information identifies a data pipe in a broadcast stream and the receiver can recognize delivery of the data of the source flow through the data pipe.

Description of other information or elements included in the SourceFlow element is replaced by the above description of the SourceFlow element.

Figure 45:
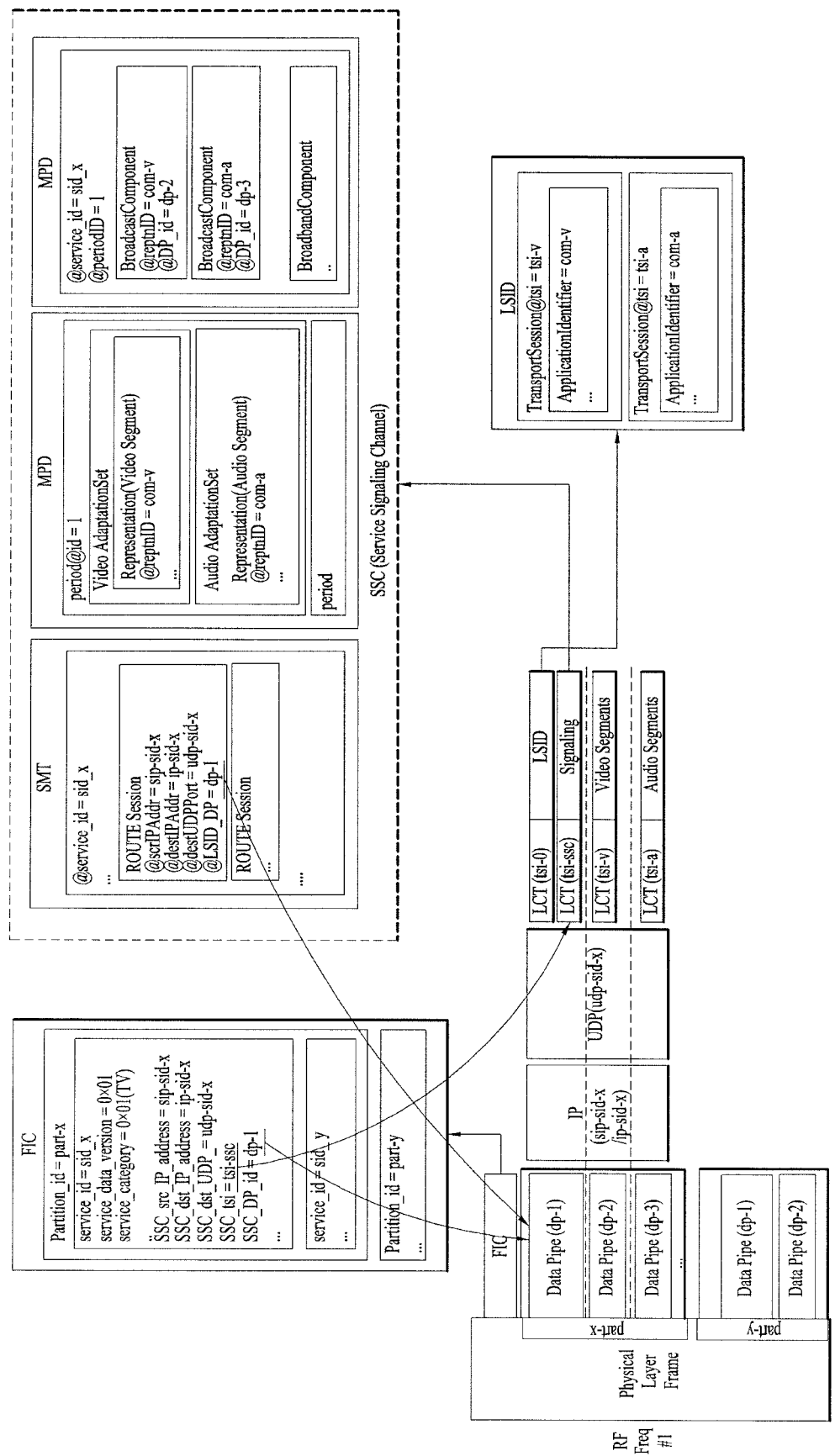
FIG. 45 is a diagram illustrating a process of acquiring signaling information through a broadcast network according to another embodiment of the present invention.

FIG. 45 is a diagram illustrating a process of acquiring signaling information through a broadcast network according to another embodiment of the present invention.

A receiver may access a location in which data of a service signaling channel related to a desired broadcast service is transmitted using information identifying services included in an FIC.

The receiver acquires, from the FIC, information about a source IP address, a destination IP address and/or a UDP port number of an IP datagram carrying the data of the service signaling channel.

The receiver acquires, from the FIC, information identifying a data pipe including the data of the service signaling channel. The receiver can access the data pipe through which the data of the service signaling channel is delivered using the information.

The receiver can access an LCT session using information which is included in the FIC and identifies the LCT session delivering the data of the service signaling channel. The LCT session delivering the data of the service signaling channel may be fixed to an LCT session having a specific TSI. In this case, the receiver can access the LCT session having the specific TSI to obtain the data of the service signaling channel. The receiver can acquire the data of the service signaling channel by accessing the corresponding location.

The receiver may access an LCT session delivering the aforementioned LSID. In this case, the TSI of the LCT session delivering the LSID may be fixed and the receiver can acquire the LSID by accessing the LCT session having the TSI. The receiver can acquire components included in the broadcast service using information of the LSID.

Figure 46:
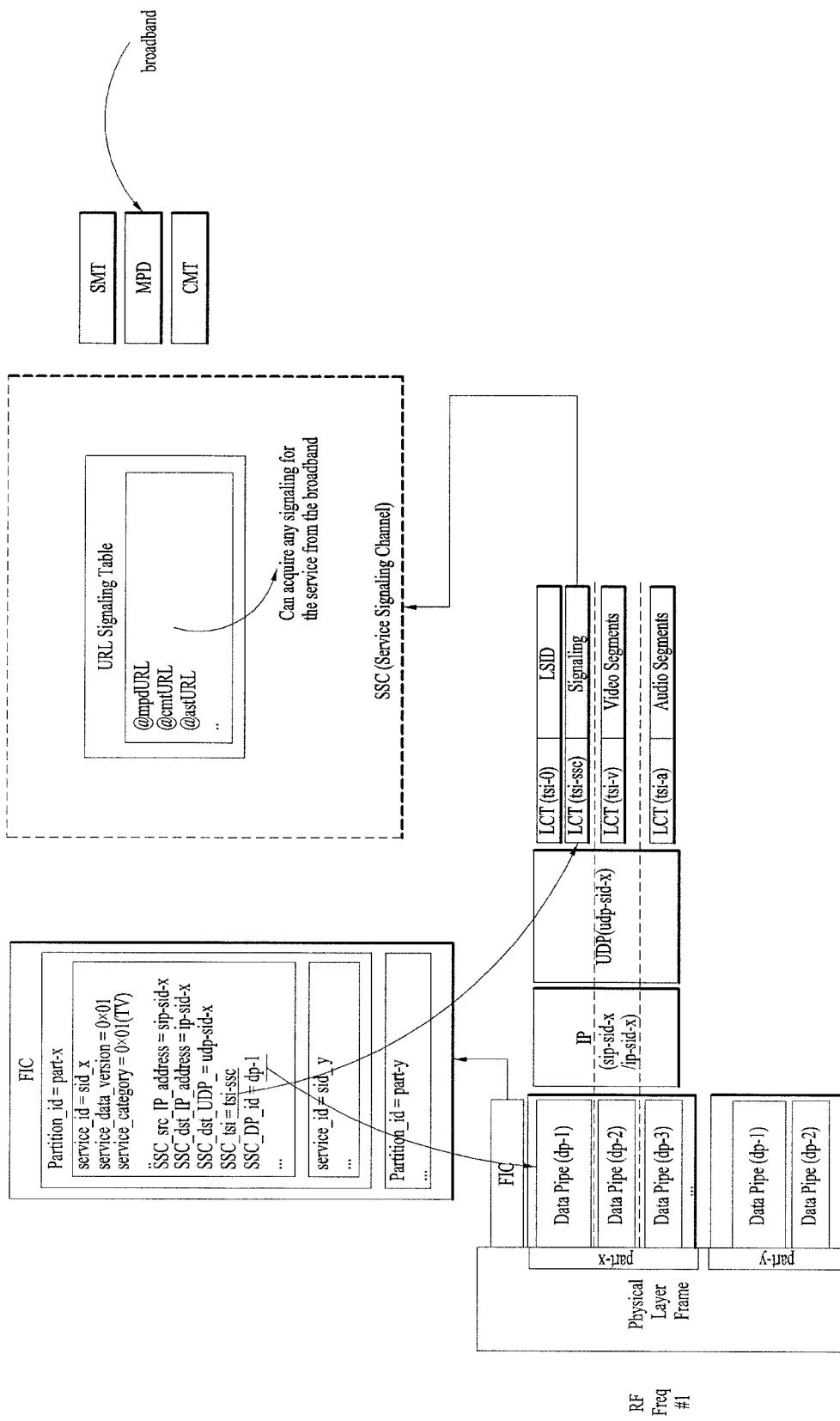
FIG. 46 is a diagram illustrating a process of acquiring signaling information through a broadcast network and a broadband network according to another embodiment of the present invention.

FIG. 46 is a diagram illustrating a process of acquiring signaling information through a broadcast network and a broadband network according to another embodiment of the present invention.

A receiver may access a location in which data of a service signaling channel related to a desired broadcast service is transmitted using information identifying services included in an FIC.

The receiver acquires, from the FIC, information about a source IP address, a destination IP address and/or a UDP port number of an IP datagram carrying the data of the service signaling channel.

The receiver acquires, from the FIC, information identifying a data pipe including the data of the service signaling channel. The receiver can access the data pipe through which the data of the service signaling channel is delivered using the information.

The receiver acquires the aforementioned URL signaling table or URL signaling description by accessing the data of the service signaling channel. The receiver can access a server or location providing service level signaling using information included in the URL signaling table to acquire the service level signaling through a broadband network.

Figure 47:
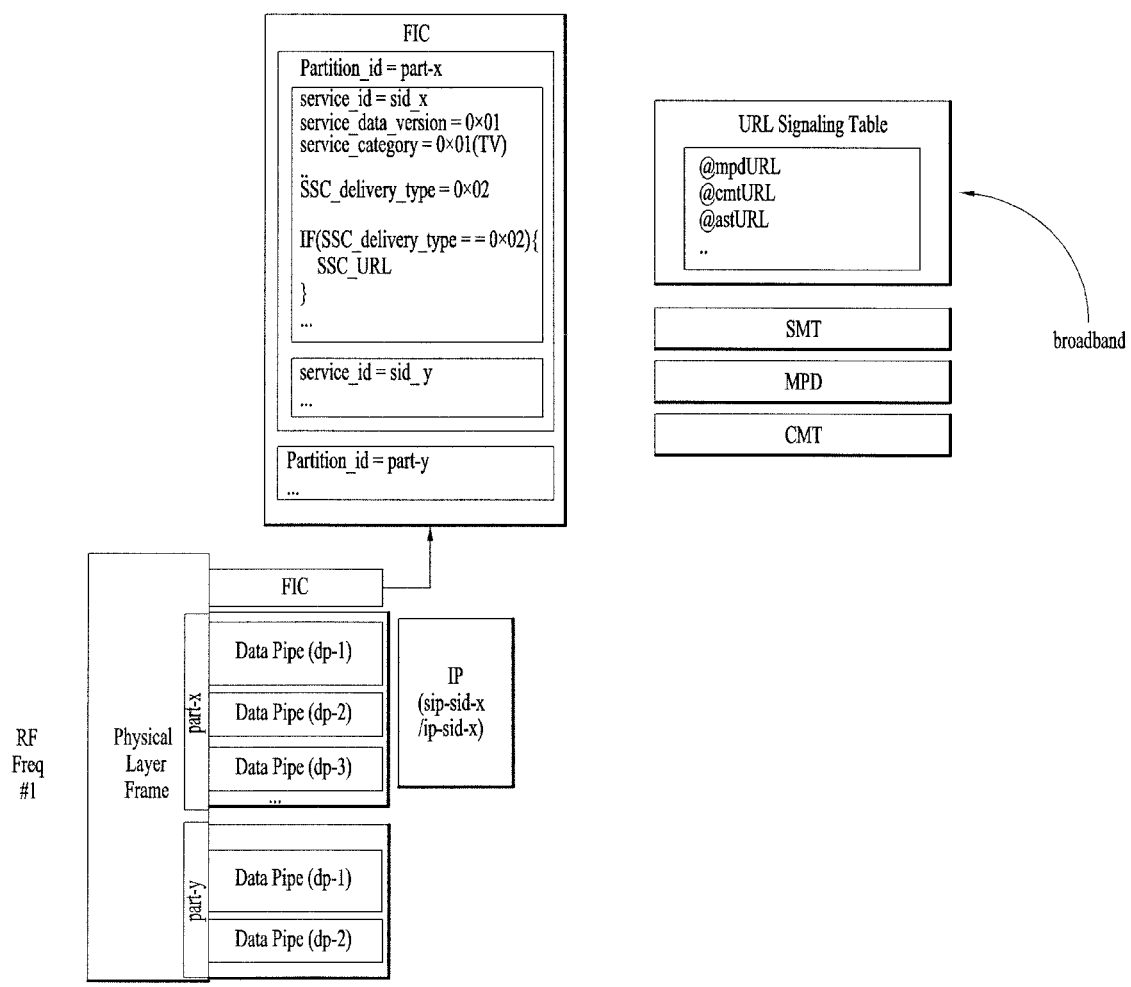
FIG. 47 is a diagram illustrating a process of acquiring signaling information through a broadband network according to another embodiment of the present invention.

FIG. 47 is a diagram illustrating a process of acquiring signaling information through a broadband network according to another embodiment of the present invention.

When information that identifies the transport type of a service signaling channel included in an FIC indicates that data of the service signaling channel is delivered through a broadband network, a receiver acquires URL information about a server or location providing data of the service signaling channel from the FIC. In this case, the URL information can indicate the URL of a single server or location providing all data of the service signaling channel or can indicate the URL of each sever or location providing each signaling structure (SMR, MPD, CMT or the like) that can be included in the service signaling channel.

The receiver acquires the data of the service signaling channel through the broadband network by accessing the server or location indicated by the corresponding URL information.

Figure 48:
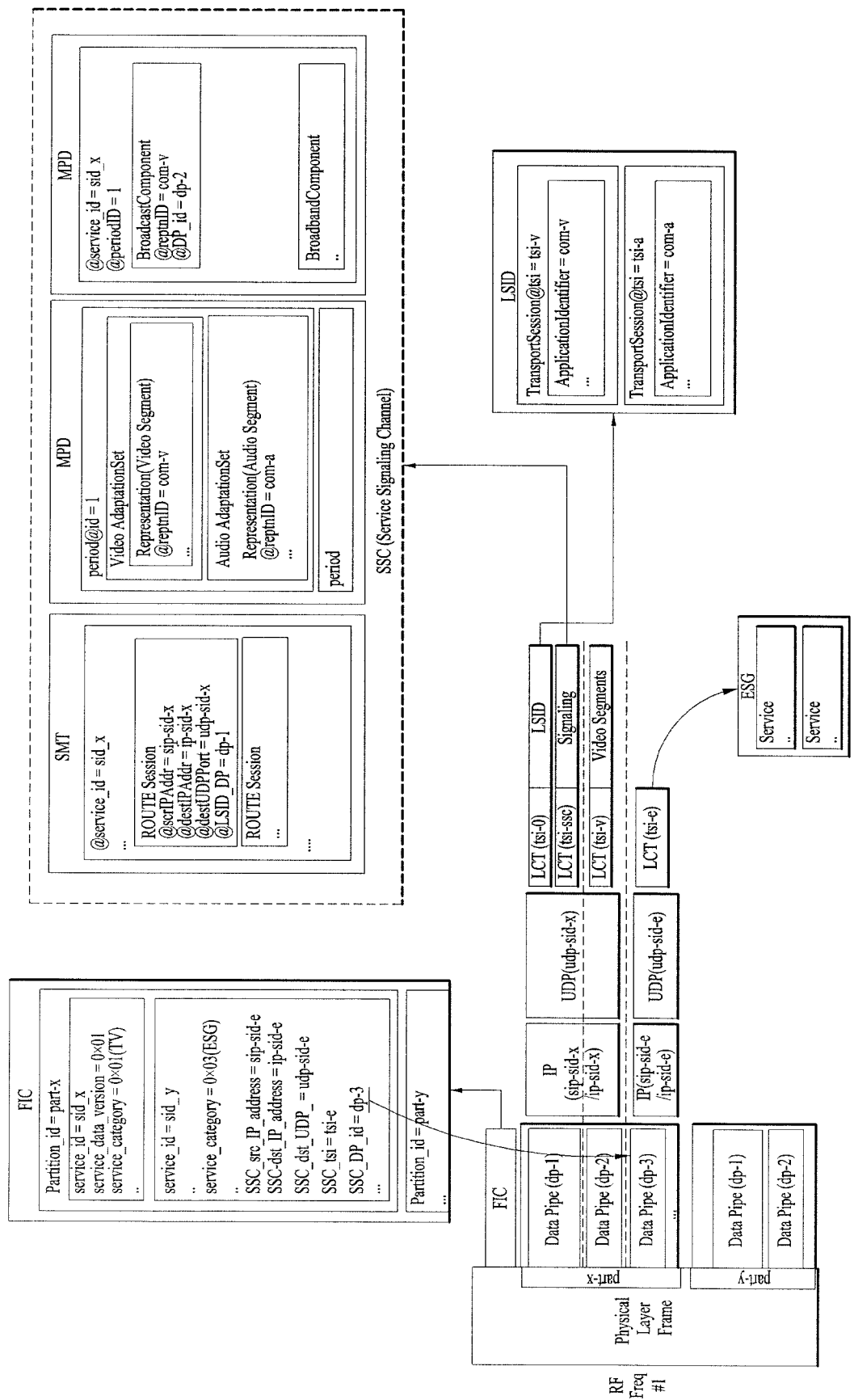
FIG. 48 is a diagram illustrating a process of acquiring an ESG (Electronic Service Guide) through a broadcast network according to another embodiment of the present invention.

FIG. 48 is a diagram illustrating a process of acquiring an ESG (Electronic Service Guide) through a broadcast network according to another embodiment of the present invention.

A receiver can recognize that a broadcast service correspond to an ESG from information specifying the category of the service included in an FIC and acquire information identifying a data pipe through which data of a service signaling channel with respect to the corresponding service is delivered.

The receiver can access the identified data pipe to acquire data of the ESG delivered through the data pipe.

Through this process, the ESG can be acquired more efficiently because it is not necessary to analyze a complicated signaling structure in order to access a normal broadcast service although the ESG is processed as a broadcast service.

Figure 49:
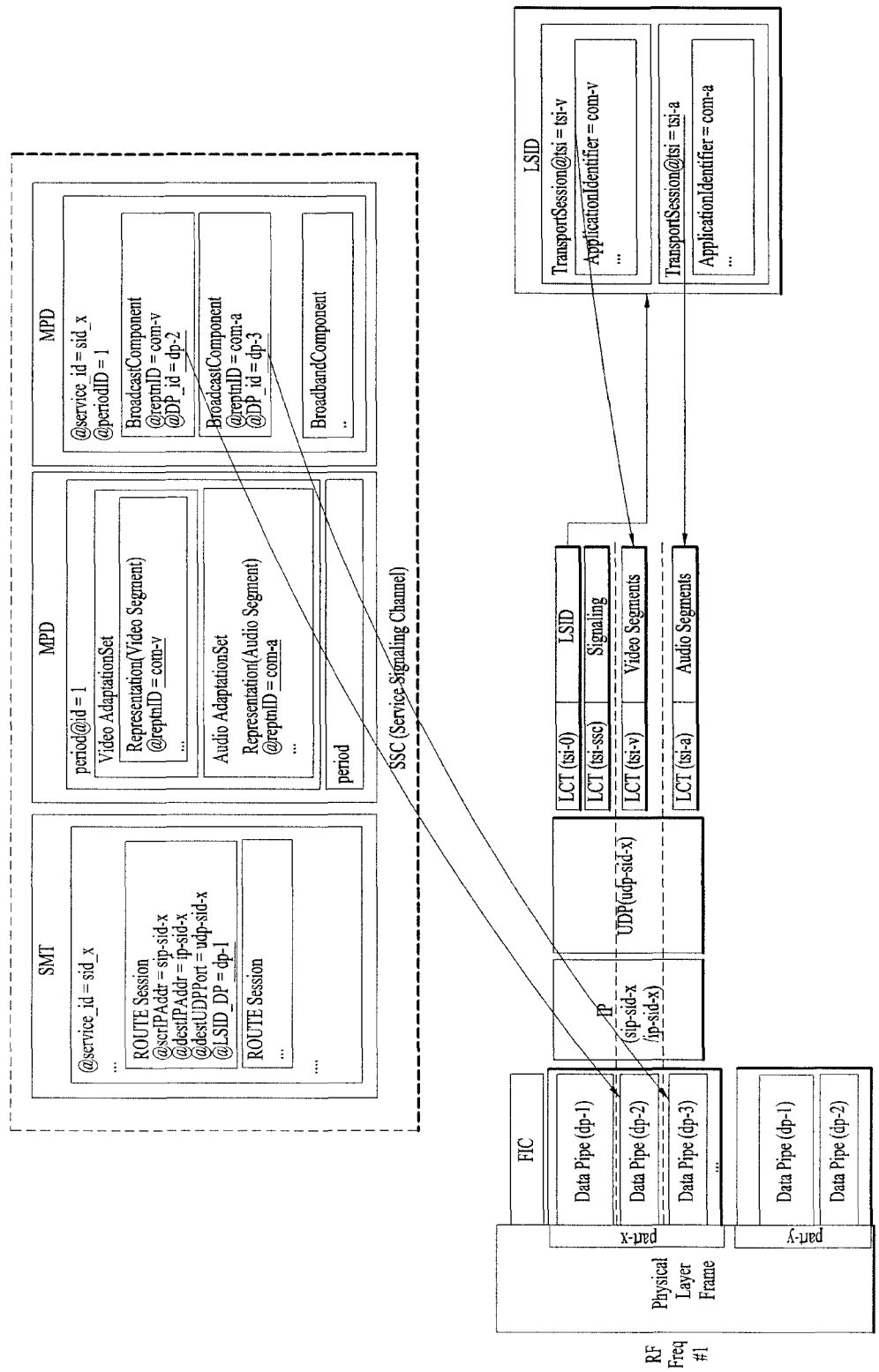
FIG. 49 is a diagram illustrating a process of acquiring video segments and audio segments of a broadcast service through a broadcast network according to another embodiment of the present invention.

FIG. 49 is a diagram illustrating a process of acquiring video segments and audio segments of a broadcast service according to another embodiment of the present invention.

A receiver acquires data of a service signaling channel and obtains a signaling structure (e.g., CMT) including information that describes components of a broadcast service included in the data of the service signaling channel.

The receiver acquires information identifying a data pipe delivering video components of the broadcast service from the signaling structure and accesses the data pipe using the information. The receiver acquires a signaling structure (e.g., LSID) describing an LCT session in a ROUTE session delivering the data pipe.

The receiver accesses the LCT session delivering the video components of the broadcast service to acquire the video components from the signaling structure describing the LCT session.

The receiver acquires information identifying a data pipe delivering audio components of the broadcast service from the signaling structure and accesses the data pipe using the information. The receiver acquires a signaling structure (e.g., LSID) describing an LCT session in a ROUTE session delivering the data pipe.

The receiver accesses the LCT session delivering the audio components of the broadcast service to acquire the audio components from the signaling structure describing the LCT session.

According to the present invention, it is possible to efficiently detect and acquire components included in a broadcast service through the aforementioned signaling structures even when the components are delivered through respective transport paths. Furthermore, a transmitting side can freely transmit components of a broadcast service through a spare region and thus efficiently transmit a larger amount of broadcast data.

Figure 50:
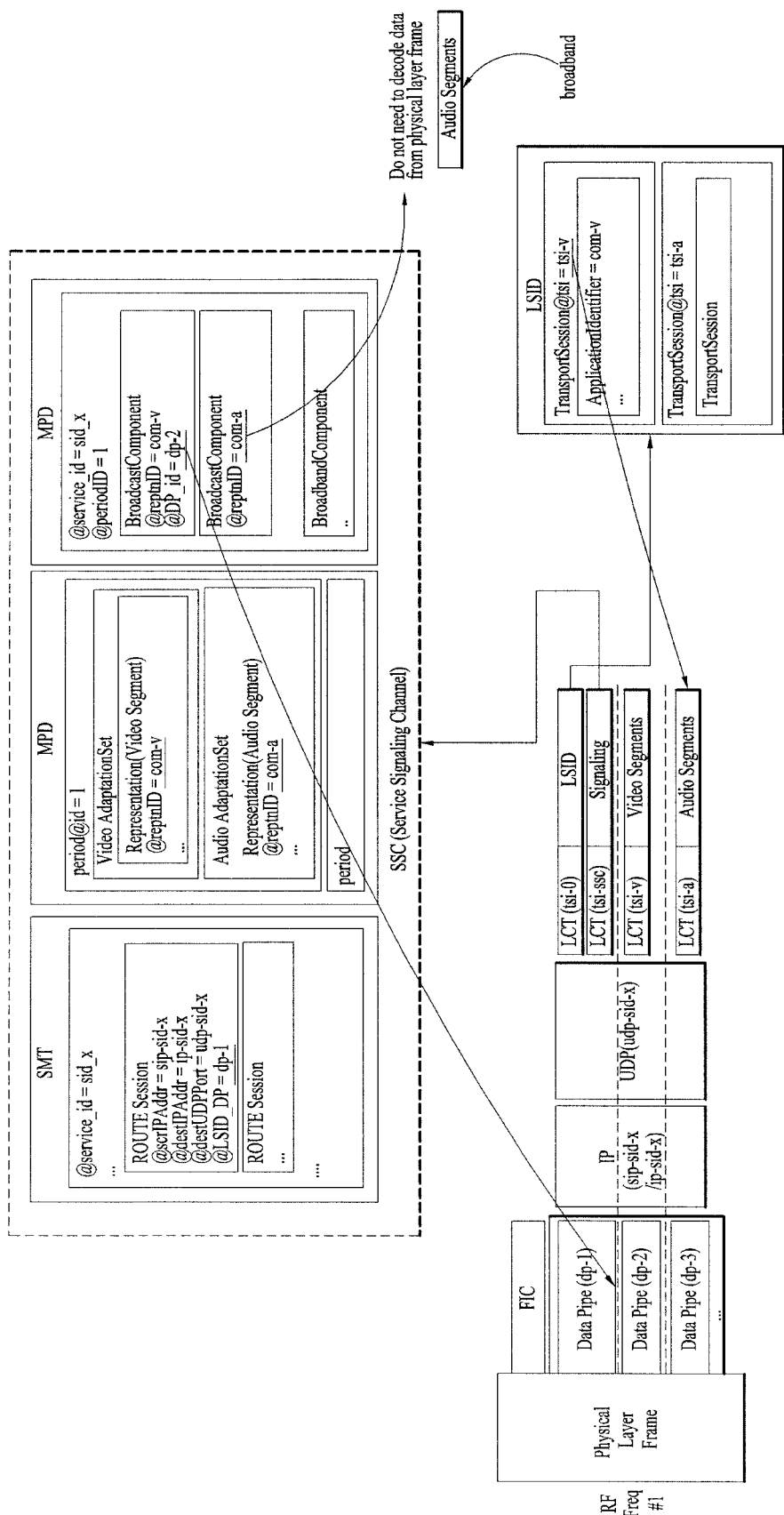
FIG. 50 is a diagram illustrating a process of acquiring video segments of a broadcast service through a broadcast network and acquiring audio segments of the broadcast service through a broadband network according to another embodiment of the present invention.

FIG. 50 is a diagram illustrating a process of acquiring video segments of a broadcast service through a broadcast network and acquiring audio segments of the broadcast service through a broadband network according to another embodiment of the present invention.

A receiver acquires data of a service signaling channel and obtains a signaling structure (e.g., CMT) including information that describes components of a broadcast service included in the data of the service signaling channel.

The receiver acquires information identifying a data pipe delivering video components of the broadcast service from the signaling structure and accesses the data pipe using the information. The receiver acquires a signaling structure (e.g., LSID) describing an LCT session in a ROUTE session delivering the data pipe.

The receiver accesses the LCT session delivering the video components of the broadcast service to acquire the video components from the signaling structure describing the LCT session.

The receiver recognizes that the audio components are delivered through a broadband network from a signaling structure including information that describes components of the broadcast service and acquires the address of a server or location transmitting the audio components. The receiver acquires an address providing segments of the audio components using MPD and acquires the segments of the audio components from the address.

According to the present invention, it is possible to efficiently access components for a broadcast service through the aforementioned signaling structure even when components of the broadcast service are respectively delivered through a heterogeneous network.

Figure 51:
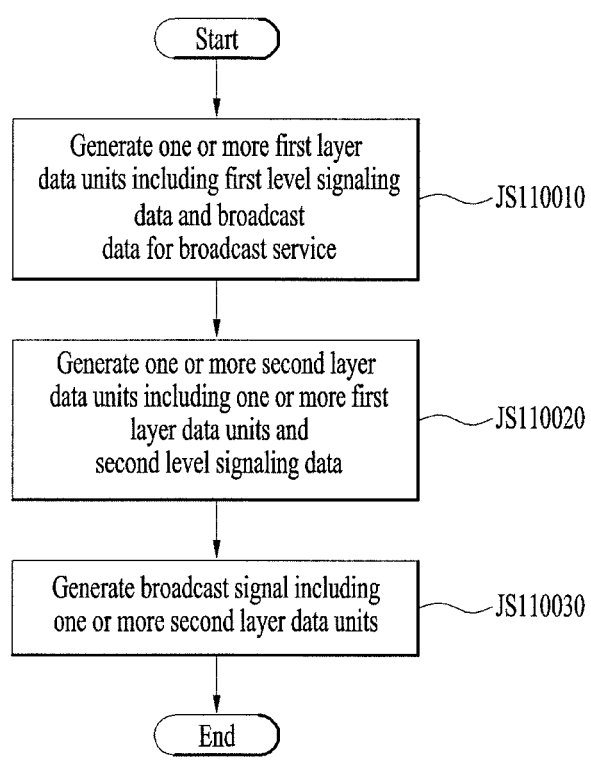
FIG. 51 is a flowchart illustrating a broadcast signal transmission process according to an embodiment of the present invention.

FIG. 51 is a flowchart illustrating a broadcast signal transmission process according to an embodiment of the present invention.

A broadcast signal transmission processing device generates one or more first layer data units including first level signaling data and broadcast data for a broadcast service (JS110010).

The broadcast signal transmission processing device generates one or more second layer data units including the one or more first layer data units and second level signaling data (JS110020).

The broadcast signal transmission processing device generates a broadcast signal including the one or more second layer data units (JS11030).

Figure 52:
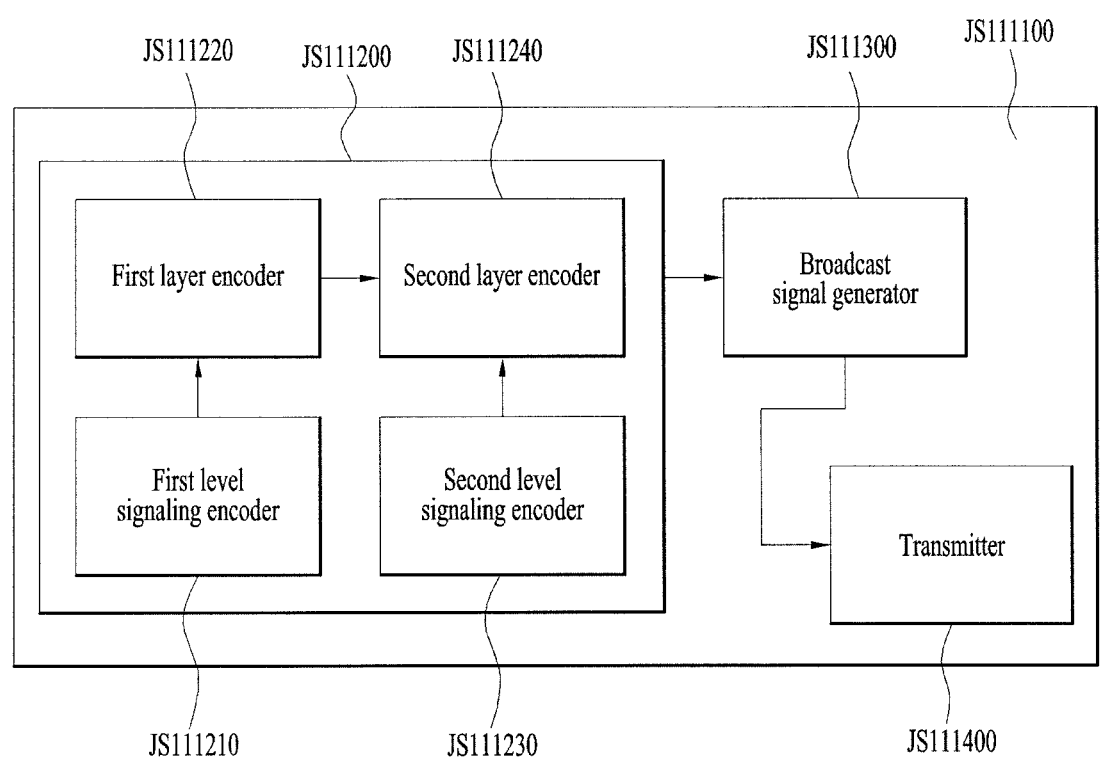
FIG. 52 is a diagram illustrating a broadcast signal processing device according to an embodiment of the present invention.

FIG. 52 is a diagram illustrating a broadcast signal processing device according to an embodiment of the present invention.

The broadcast signal processing device J111100 according to an embodiment of the present invention may include a protocol processor J111200, a broadcast signal generator J111300 and/or a transmitter J111400.

The protocol processor J111200 includes a first level signaling encoder J111210, a first layer encoder J111220, a second level signaling encoder J111230 and/or a second layer encoder J111240.

The protocol processor J111200 performs processing according to a protocol of the broadcast system on broadcast data or signaling data.

The broadcast signal generator J111300 performs processing for transmit data processed by the protocol processor. The broadcast signal generator J111300 may correspond to the aforementioned broadcast signal encoder/processor in the physical layer.

The transmitter J111400 transmits a broadcast signal.

The first level signaling encoder J111210 generates first level signaling data. The first level signaling data may correspond to signaling information of a higher layer that provides information describing a broadcast service.

The first layer encoder J111220 generates broadcast data according to a first layer protocol. The first layer protocol may correspond to MPEG-DASH, NRT and/or MMT.

The second level signaling encoder J111230 generates second level signaling data. The second level signaling data may include information for acquiring information about the first level signaling data in a layer lower than the layer in which the first level signaling data is processed. The second level signaling data may include information necessary to scan broadcast services to generate a map of the broadcast services in a layer lower than the layer in which the first level signaling data is processed.

The second layer encoder J111240 processes the data processed in the first layer according to a second layer protocol. The second layer protocol may correspond to MMTP (MPEG Media Transport Protocol), ROUTE (ALC/LCT) and/or HTT.

According to the present invention, it is possible to rapidly acquire signaling information provided in each layer after physical layer processing.

According to the present invention, processing of signaling information and/or broadcast data of a higher layer in each layer is provided through signaling information such that a receiver can rapidly acquire and process a broadcast service.

The module or unit may be one or more processors designed to execute a series of execution steps stored in the memory (or the storage unit). Each step described in the above-mentioned embodiments may be implemented by hardware and/or processors. Each module, each block, and/or each unit described in the above-mentioned embodiments may be realized by hardware or processor. In addition, the above-mentioned methods of the present invention may be realized by codes written in recoding media configured to be read by a processor so that the codes may be read by the processor supplied from the apparatus.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description may be configured in a manner of being selectively combined with one another entirely or in part to enable various modifications.

In addition, a method according to the present invention may be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes may be saved and executed according to a distributive system.

It will be appreciated by those skilled in the art that various modifications and variations may be made in the present invention without departing from the spirit or scope of the inventions. Thus, it is intended that the present invention covers the modifications and variations of this invention provided they come within the scope of the appended claims and their equivalents.

Both the product invention and the process invention are described in the specification and the description of both inventions may be supplementarily applied as needed.

It will be appreciated by those skilled in the art that various modifications and variations may be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The embodiments of the present invention are available in a series of broadcast signal provision fields.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method of processing data in a receiving apparatus, the method comprising:

receiving a broadcast signal including low level signaling data, wherein the low level signaling data is carried via a specific data pipe (DP), wherein the low level signaling data is used to support a rapid channel scan which allows the receiving apparatus to build a list of at least one service, wherein the low level signaling data is further used to provide bootstrap information that allows the receiving apparatus to discover at least one service layer signaling information, wherein the bootstrap information includes URL data for a first service layer signaling information when the first service layer signaling information is transmitted via a broadband network, and wherein the bootstrap information includes a destination user datagram protocol (UDP) port number and a destination internet protocol (IP) address for a second service layer signaling information when the second service layer signaling information is transmitted via a broadcast network; and parsing the low level signaling data included in the broadcast signal, wherein the low level signaling data is parsed, and then the first service layer signaling information or the second service layer signaling information is processed, wherein the low level signaling data further includes service category information and access information for an electronic service guide (ESG), and wherein the service category information is used to represent that the at least one service relates to the ESG.

2. The method of claim 1, wherein the low level signaling data further includes data pipe identification information for identifying a data pipe carrying the first or second service layer signaling information.

3. The method of claim 2, wherein the low level signaling data further includes service identification information for identifying each of the at least one service and hidden information for indicating whether the each of the at least one service is hidden.

4. A receiving apparatus of processing data, the receiving apparatus comprising:

a receiving module configured to receive a broadcast signal including low level signaling data,
wherein the low level signaling data is carried via a specific data pipe (DP),
wherein the low level signaling data is used to support a rapid channel scan which allows the receiving apparatus to build a list of at least one service,
wherein the low level signaling data is further used to provide bootstrap information that allows the receiving apparatus to discover at least one service layer signaling information,
wherein the bootstrap information includes URL data for a first service layer signaling information when the first service layer signaling information is transmitted via a broadband network, and
wherein the bootstrap information includes a destination user datagram protocol (UDP) port number and a destination internet protocol (IP) address for a second service layer signaling information when the second service layer signaling information is transmitted via a broadcast network; and a processor configured to:
parse the low level signaling data included in the broadcast signal,
wherein the low level signaling data is processed, and then the first service layer signaling information or the second service layer signaling information is processed,
wherein the low level signaling data further includes service category information and access information for an electronic service guide (ESG), and
wherein the service category information is used to represent that the at least one service relates to the ESG.

5. The receiving apparatus of claim 4, wherein the low level signaling data further includes data pipe identification information for identifying a data pipe carrying the first or second service layer signaling information.

6. The receiving apparatus of claim 5, wherein the low level signaling data further includes service identification information for identifying each of the at least one service and hidden information for indicating whether the each of the at least one service is hidden.

* * * * *